(12) United States Patent
Ishikawa et al.

(10) Patent No.: US 6,792,806 B2
(45) Date of Patent: Sep. 21, 2004

(54) ACCELERATION SENSOR DEVICE

(75) Inventors: Hiroshi Ishikawa, Kawasaki (JP); Hiroshi Tanaka, Yokohama (JP)

(73) Assignees: Fujitsu Limited, Kawasaki (JP); Fujitsu Media Devices Limited, Nagano (JP)

( * ) Notice: Subject to any disclaimer, the term of this patent is extended or adjusted under 35 U.S.C. 154(b) by 0 days.

(21) Appl. No.: 10/406,252

(22) Filed: Apr. 4, 2003

(65) Prior Publication Data

US 2003/0200805 A1 Oct. 30, 2003

Related U.S. Application Data

(62) Division of application No. 09/722,716, filed on Nov. 28, 2000, now Pat. No. 6,578,421.

(30) Foreign Application Priority Data

| Dec. 28, 1999 | (JP) | 11-375813 |
| Apr. 6, 2000 | (JP) | 2000-105426 |
| Apr. 28, 2000 | (JP) | 2000-131714 |

(51) Int. Cl.⁷ .............................................. G01P 15/09
(52) U.S. Cl. .................................................. 73/514.34
(58) Field of Search ........................... 73/514.29, 514.34, 73/514.35, 514.36, 514.37, 514.01, 514.02

(56) References Cited

U.S. PATENT DOCUMENTS 5,517,845 A    5/1996   Yamashita et al. ............ 73/1 D
5,824,904 A   10/1998   Kouhei et al. ............ 73/514.34

FOREIGN PATENT DOCUMENTS

| JP | 6-273439   | 9/1994  |
| JP | 7-209071   | 8/1995  |
| JP | 9-318650   | 12/1997 |
| JP | 10-206456  | 8/1998  |
| JP | 11-211748  | 8/1999  |
| JP | 11-230980  | 8/1999  |
| JP | 2000-97707 | 4/2000  |

*Primary Examiner*—John E. Chapman
(74) *Attorney, Agent, or Firm*—Armstrong, Kratz, Quintos, Hanson & Brooks, LLP

(57) ABSTRACT

Providing a small-sized acceleration sensor including a vibrator formed of a piezoelectric single crystal, and a weight section connected to the vibrator and supported at a position different from the position of the center of gravity of an assembly of the vibrator and weight section. Two divided electrodes used for detecting an electrical signal are formed on the vibrator and connected to two wiring patterns of the weight section which also functions as a signal detecting substrate, with an anisotropic conductive adhesive. When an acceleration in one direction is applied, an angular moment exerted in the weight section is detected as sliding vibration by the vibrator, and an electrical signal corresponding to the acceleration is output from the electrodes through the wiring patterns.

7 Claims, 59 Drawing Sheets

(FOR DETECTION)

ACCELERATION SENSOR DEVICE

This application is a divisional of prior application Ser. No. 09/722,716 filed Nov. 28, 2000 now U.S. Pat. No. 6,578,421.

BACKGROUND OF THE INVENTION

The present invention relates to an acceleration sensor for detecting an acceleration, and more particularly to an acceleration sensor for detecting an acceleration by sliding vibration, which is exerted when an acceleration is applied, and to an acceleration sensor device constructed by storing this acceleration sensor in a package.

An acceleration sensor is installed in equipment to monitor an abnormal condition of the equipment by detecting an acceleration and vibration of the equipment. For example, the acceleration sensor is used to prevent errors in reading and writing data resulting from vibration and shock in a hard disk drive, to prevent hand shaking in a video camera, to actuate an air bag in a vehicle, etc.

With a reduction in size and an increase in the performance of equipment in which an acceleration sensor is to be installed, there has been a demand for the development of a small-sized, high-performance acceleration sensor capable of being mounted on a surface of the equipment. As such a small-sized acceleration sensor, an acceleration sensor using a piezoelectric element has been conventionally put into practice. Disclosed examples of such an acceleration sensor include an acceleration sensor which detects an acceleration by using a deflection of a piezoelectric single crystal (Japanese Patent Application Laid-Open Nos. 10-206456/1998 and 11-211748/1999) and an acceleration sensor which detects an acceleration by using a deflection of piezoelectric ceramic (Japanese Patent Application Laid-Open No. 6-273439/1994).

Acceleration sensors using the deflection of a piezoelectric single crystal or the deflection of piezoelectric ceramic as mentioned above can improve the detection sensitivity by increasing the deflection to increase the stress. Thus, in order to improve the detection sensitivity for high performance, the mass needs to be increased to produce a larger deflection, causing a problem that the acceleration sensor becomes heavier and larger in size. On the other hand, when the piezoelectric element is made thicker, it does not easily deflect and causes a problem that the detection sensitivity is lowered. Then, in order to improve the detection sensitivity, there have been proposals to make the piezoelectric element thinner, to stick two pieces of extremely thin piezoelectric elements together, etc. However, such proposals are associated with problems that the fabrication process is complicated and the cost is increased.

Therefore, the applicant of the present invention proposed an acceleration sensor capable of detecting an acceleration with good sensitivity by a small-sized structure (Japanese Patent Application Laid-Open No. 2000-97707). This acceleration sensor comprises a vibrator and a weight section which is connected and supported at a position different from the position of the center of gravity of an assembly of the vibrator and weight section, and obtains the magnitude of an applied acceleration by detecting the amount of characteristic (sliding vibration) of the vibrator corresponding to an angular moment exerted in the weight section when the acceleration is applied. The present inventors are pursuing the development and improvement of such an acceleration sensor that has a small-sized structure and a high detection sensitivity without increasing the size of the vibrator to achieve high performance because it detects sliding vibration instead of deflective vibration.

BRIEF SUMMARY OF THE INVENTION

The present invention has been achieved in view of the above-mentioned circumstance, and its object is to provide an acceleration sensor which is an improvement of the acceleration sensor proposed in Japanese Patent Application Laid-Open No. 2000-97707 and capable of realizing a further reduction in size and cost while maintaining high performance.

Another object of the present invention is to provide an acceleration sensor which does not limit sliding vibration (or, shearing strain) of a vibrator for the purpose of preventing a lowering of the detection performance.

Still another object of the present invention is to provide an acceleration sensor capable of improving the connectivity between a vibrator and a weight section.

Yet another object of the present invention is to provide an acceleration sensor device having a package structure capable of storing such an acceleration sensor efficiently without deteriorating its detection performance.

An acceleration sensor of the first aspect of the present invention comprises a vibrator provided with an electrode and subject to a sliding vibration; and a weight section connected to the vibrator and supported at a position different from the position of the center of gravity of an assembly of the vibrator and weight section, wherein the weight section is provided with a wiring pattern connected to the electrode, the vibrator detects an angular moment about the support point as sliding vibration, which is exerted in the weight section when an acceleration is applied, and an electrical signal corresponding to the applied acceleration is output from the electrode through the wiring pattern. In this structure, the weight section is provided with the wiring pattern for drawing an electrical signal corresponding to an acceleration to be detected, and also functions as a signal detecting substrate. Therefore, it is not necessary to newly provide a signal detecting substrate, resulting in a simplified structure and a reduction in the cost.

In an acceleration sensor of the second aspect of the present invention, a detection portion for sliding vibration of the vibrator is divided by electrodes which are a plurality of divided electrode parts. Since the detection portion for sliding vibration of the vibrator is divided into a plurality of parts by the electrodes, the detection section of the vibrator can be divided simply, thereby achieving a reduction in the cost.

In an acceleration sensor of the third aspect of the present invention, the detection portion for sliding vibration of the vibrator is divided by the electrodes which are a plurality of divided electrode parts and by a groove connected to the electrodes. Since the detection portion for sliding vibration of the vibrator is divided into a plurality of parts by the formation of the groove, the detection portion of the vibrator is certainly divided and a number of acceleration sensors are readily manufactured, thereby achieving a reduction in the cost.

In an acceleration sensor of the fourth aspect of the present invention, the vibrator has substantially a rectangular parallelepiped shape, and the groove has a depth of not less than 10% of the thickness of the vibrator. Since the groove is formed to have a depth of not less than 10% of the thickness of the vibrator in the process of dividing the detection portion of the vibrator into a plurality of parts by the formation of the groove, it is possible to achieve not only a reduction in the cost, but also an improvement in the detection sensitivity.

In an acceleration sensor of the fifth aspect of the present invention, a position where the detection portion is divided is a position where a charge distribution by the sliding vibration is substantially zero. Since the detection portion of the vibrator is divided at a position where the angular moment of the weight section is substantially zero, i.e., a position where the charge distribution by the sliding vibration of the vibrator is substantially zero, it is possible to achieve not only a reduction in the cost, but also an improvement in the detection sensitivity.

In an acceleration sensor of the sixth aspect of the present invention, the vibrator and weight section have substantially a rectangular parallelepiped shape, and a length (width) of the vibrator in an acceleration detecting direction is not more than a length (width) of the weight section in the acceleration detecting direction. It is therefore possible to reduce an error signal (crosstalk) generated when an acceleration in a direction different from that of an acceleration to be detected is applied, and to improve the S/N ratio.

In an acceleration sensor of the seventh aspect of the present invention, the weight section has substantially a rectangular parallelepiped shape, and has greater thickness and/or length (width) in an acceleration detecting direction in its portion on one side opposite to the other side connected to the vibrator than in its portion on the other side. In the weight section, since the thickness and/or the width of the portion on the side opposite to the vibrator side including the support position is made greater, it is possible to increase the angular moment of the weight section and improve the detection sensitivity.

In an acceleration sensor of the eighth aspect of the present invention, the weight section is constituted by a plurality of members of different materials. It is therefore possible to select the constituent materials of the weight section so as to increase the angular moment of the weight section and improve the detection sensitivity.

In an acceleration sensor of the ninth aspect of the present invention, the weight section has a higher density in its portion on one side opposite to the other side connected to the vibrator than in its portion on the other side. Since the weight section is constructed by using a high-dense material for the portion on the side opposite to the vibrator side, the angular moment of the weight section is increased, thereby improving the detection sensitivity.

In an acceleration sensor of the tenth aspect of the present invention, the vibrator is bonded to the weight section with an anisotropic conductive adhesive. Since the vibrator and the weight section are bonded together with the anisotropic conductive adhesive, it is possible to prevent a short circuit between the divided electrodes, provide a satisfactory connection between the vibrator and weight section, and achieve conductivity only in a desired direction.

In an acceleration sensor of the eleventh aspect of the present invention, the electrical signal is drawn from one of the divided electrodes of the vibrator, which is closer to the position of the center of gravity. Since an acceleration is not detected by a differential output of both the divided electrodes of the vibrator (a differential electrical signal of both the electrodes), but is detected by only the output (electrical signal) of one of the divided electrodes, which is closer to the position of the center of gravity, the number of patterns to be formed in the detection circuit is reduced, thereby achieving a reduction in the cost.

In an acceleration sensor of the twelfth aspect of the present invention, the thinnest portion of the weight section having a substantially rectangular parallelepiped shape is not located on one side of the position of the vibrator, including the position of the center of gravity. Since the thinnest portion of the weight section is placed on the vibrator or on a position extended from the vibrator in a direction opposite to a direction toward the position of the center of gravity, it is possible to reduce crosstalk and improve the S/N ratio.

If some object is placed in the groove of the vibrator, when an acceleration is applied, reciprocal sliding vibration of the vibrator is limited and the detection performance deteriorates. Therefore, the inside of the groove should be kept in a hollow state. Hence, in an acceleration sensor of the thirteenth aspect of the present invention, the inside of the groove is kept in a hollow state by bonding the vibrator and weight section with an anisotropic conductive film. Besides, in an acceleration sensor of the fourteenth aspect of the present invention, a protruding portion with a width of not less than the width of the groove is formed on the weight section, at a position facing the groove, and the groove is covered with the protruding portion, thereby keeping the inside of the groove in a hollow state. According to the thirteenth and fourteenth aspects, there is no possibility that an adhesive for connecting the vibrator and weight section runs into the groove, thereby easily maintaining the inside of the groove in a hollow state. As a result, reciprocal sliding vibration of the vibrator is not limited and high detection performance is obtained.

In an acceleration sensor of the fifteenth aspect of the present invention, the vibrator and weight section are bonded together with an adhesive, and the groove is filled with a filler whose Young's modulus is smaller than that of the adhesive. If the inside of the groove is in a hollow state, certainly sliding vibration is not limited. However, the process of producing the hollow state is not easy by any means, and it is also hard to say that the process of connecting the vibrator and weight section with an adhesive while maintaining the hollow state is easy. Even when the groove is filled with some filler, if the hardness of the filler is low, sliding vibration is hardly limited. Therefore, the groove is filled with a filler whose Young's modulus is smaller than that of an adhesive used for connecting the vibrator and weight section. In this case, it is possible to minimize the deterioration of the detection performance and readily perform the process of connecting the vibrator and weight section with an adhesive.

In an acceleration sensor of the sixteenth aspect of the present invention, the groove has a width greater than the widths of the divided detection portions of the vibrator. Since the width of the groove of the vibrator is made greater than the widths of the respective portions where the electrodes are formed, the bonded area other than the electrodes is increased, thereby improving the resistance to shock.

In an acceleration sensor of the seventeenth aspect of the present invention, the vibrator and the weight section are bonded together with an adhesive, and the area of this bonded face is greater than the area of the electrode and/or the wiring pattern. Since the area of the electrode and/or the wiring pattern is made smaller than the bonded area between the vibrator and weight section, even when the electrode and/or the wiring pattern do not easily stick to the adhesive, the vibrator and weight section can be bonded at portions other than the electrode and wiring pattern, thereby achieving a high bonding strength.

In an acceleration sensor of the eighteenth aspect of the present invention, the weight section has a cavity for storing a part of the vibrator. Since a region of the weight section connected to the vibrator has a cavity structure, even when its portion connected to the vibrator is made thinner so as to improve the detection sensitivity, the weight section is not twisted by an applied acceleration, thereby limiting an increase of crosstalk and improving the resistance to shock.

In an acceleration sensor of the nineteenth aspect of the present invention, the vibrator is a single crystal piezoelectric element. Since a single crystal piezoelectric element is used for the vibrator, it is possible to reduce crosstalk and improve the S/N ratio.

In an acceleration sensor of the twentieth aspect of the present invention, the single crystal piezoelectric element is an X-cut plate of lithium niobate ($LiNbO_3$). Since the X-cut plate of $LiNbO_3$ which does not have an electromechanical bonding in a thickness direction is used as the vibrator, it is possible to reduce crosstalk and improve the S/N ratio.

An acceleration sensor device of the twenty first aspect of the present invention comprises an acceleration sensor as described above; and a package, including a base provided with a wiring pattern and a cap covering the base, for storing the acceleration sensor therein. Since the acceleration sensor is stored in the package including the base provided with the wiring pattern and the cap, it is possible to readily perform the process of storing the acceleration sensor and to easily construct a circuit for drawing an electrical signal.

An acceleration sensor device of the twenty second aspect of the present invention includes in a package a detection circuit for detecting an acceleration based on an output electrical signal. Since the detection circuit is stored in the package together with an acceleration sensor, it is possible to improve the S/N ratio.

In an acceleration sensor device of the twenty third aspect of the present invention, a part of the weight section is sandwiched by package. It is therefore possible to readily provide an electrical connection between the weight section and package and to reduce the size of the device.

In an acceleration sensor device of the twenty fourth aspect of the present invention, a part of the weight section and a part of the vibrator are sandwiched by the package. It is therefore possible to readily provide an electrical connection between the weight section and package and to reduce the size of the device.

In an acceleration sensor device of the twenty fifth aspect of the present invention, the part of the weight section sandwiched by the package is a portion located on one side of the position of the vibrator opposite to the other side including the position of the center of gravity. Since the vibrator and the portion of the weight section located on one side of the position of the vibrator opposite to the other side, including the position of the center of gravity are sandwiched by the package, even though they are sandwiched by the package, the sandwiched portions are apart from the position of the center of gravity on which an acceleration applies. Therefore, the detection sensitivity is not lowered.

In an acceleration sensor device of the twenty sixth aspect of the present invention, the length of the part of the weight section sandwiched by the package is not more than the length of the vibrator. It is therefore possible to improve the detection sensitivity.

In an acceleration sensor device of the twenty seventh aspect of the present invention, the vibrator has a package-side electrode, the package is provided with a wiring pattern connected to the electrode, the vibrator and package are bonded together with an adhesive, and the area of the bonded face is larger than the area of the electrode and/or the wiring pattern. Therefore, even when the electrode and/or the wiring pattern do not easily stick to the adhesive, the vibrator and package are bonded together at portions other than the electrode and wiring pattern, thereby achieving a high bonding strength.

A method of fabricating an acceleration sensor of the twenty eighth aspect of the present invention comprises the steps of forming a groove in a vibrator; applying a material produced by dissolving a powder in a volatile solvent to the groove; evaporating the volatile solvent; and connecting the vibrator and a weight section with an adhesive. The powder layer functions as a cap to prevent the adhesive from entering the groove, thereby maintaining the inside of the groove in a hollow state.

A method of fabricating an acceleration sensor of the twenty ninth aspect of the present invention comprises the steps of forming a groove in a vibrator; inserting a structural body into the groove; connecting the vibrator and weight section with an adhesive; and removing the structural body. This method can prevent the adhesive from entering the groove and maintain the groove in a hollow state.

The above and further objects and features of the invention will more fully be apparent from the following detailed description with accompanying drawings.

The sliding vibration can be exemplified as a shearing strain, that is, a pair of forces equal and opposite which cause a shearing force inside a detector. This is explained below.

DETAILED DESCRIPTION OF THE INVENTION

The following description will explain the present invention with reference to the drawings illustrating embodiments thereof.

Figure 1:
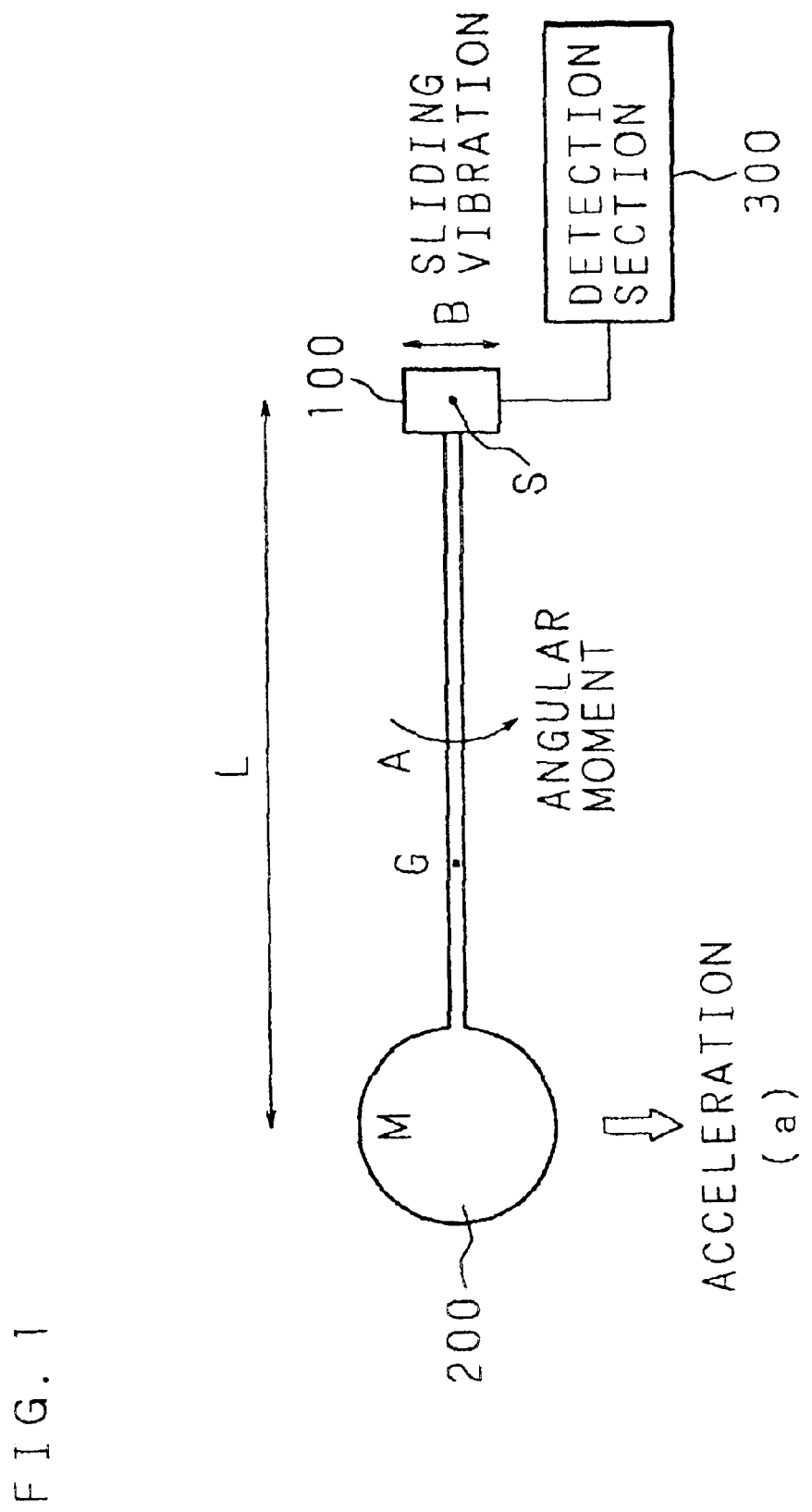
FIG. 1 is an explanatory view showing the detection principle of an acceleration sensor of the present invention.

First, the detection principle of an acceleration sensor of the present invention will be explained. FIG. 1 is an explanatory view illustrating the detection principle. An acceleration sensor of the present invention includes a vibrator 100, a weight section 200 and detection section 300 respectively connected to the vibrator 100. The weight section 200 is supported at a support point S, and the position of this support point S is different from the position of the center of gravity G of an assembly of the vibrator 100 and weight section 200. When an acceleration in one direction (the direction of a void arrow in FIG. 1) is applied to such an acceleration sensor, an angular moment about the support point S (arrow A, size MLa in FIG. 1 (where M is the mass of the weight section 200, L is the length from the support point S to the center of gravity of the weight section 200, and a is the applied acceleration)) is exerted. This angular moment causes sliding vibration of the vibrator 100 (arrow B in FIG. 1). The detection section 300 detects a signal resulting from sliding vibration corresponding to such an angular moment. Since the size of the angular moment is proportional to the size of an acceleration to be detected, it is possible to detect the acceleration by detecting this signal.

Next, embodiments of the acceleration sensor of the present invention will be explained.

(First Embodiment)

Figure 2:
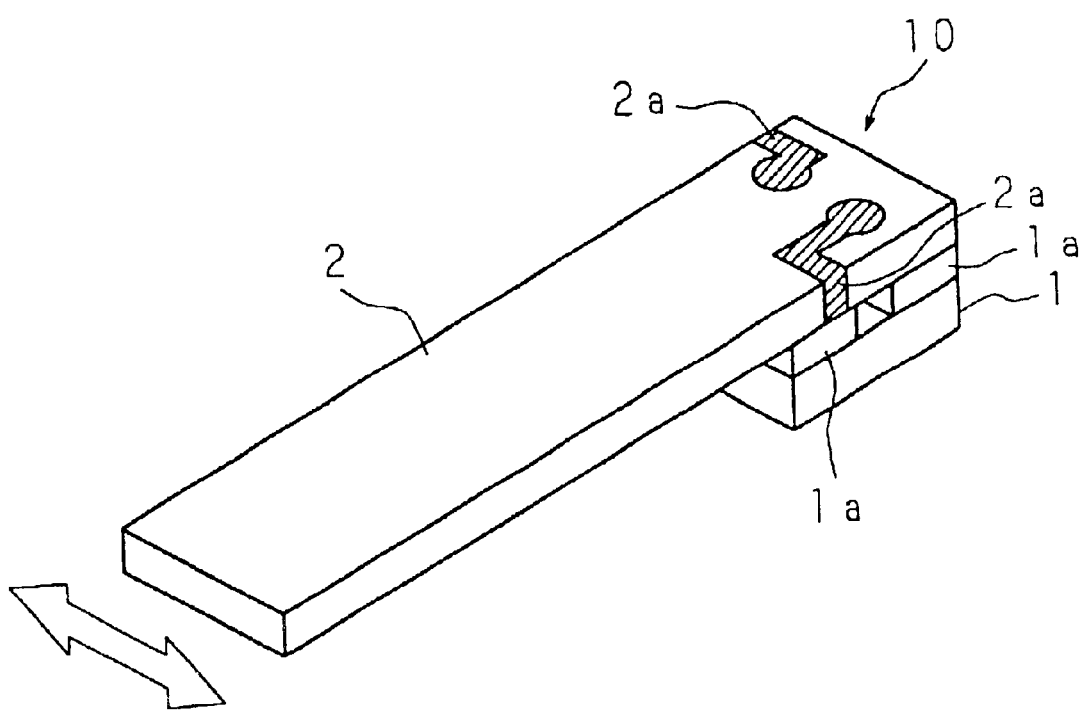
FIG. 2 is a perspective view showing the structure of an acceleration sensor according to the first embodiment.
Figure 3:
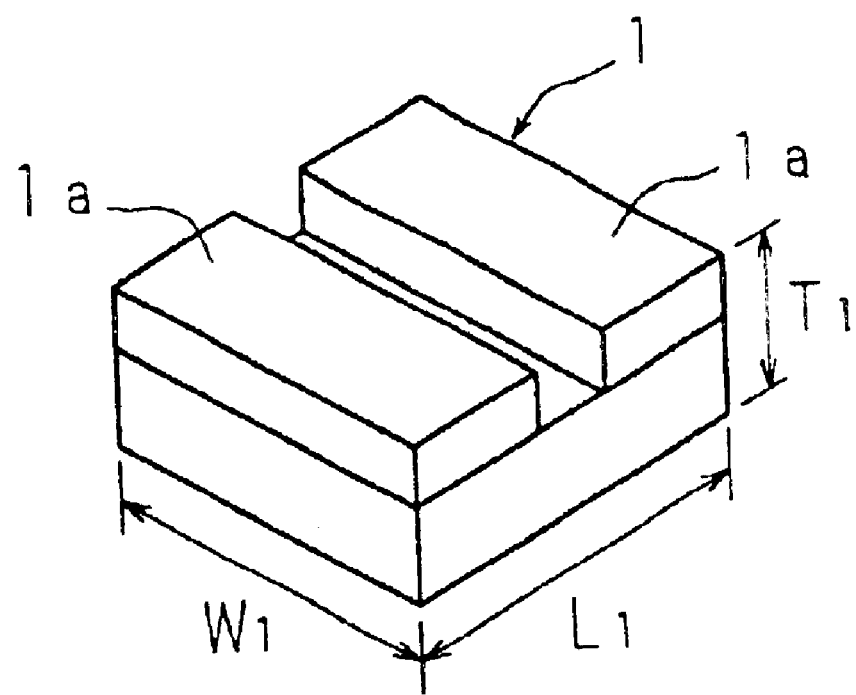
FIG. 3 is a perspective view showing a vibrator of the acceleration sensor according to the first embodiment.
Figure 4:
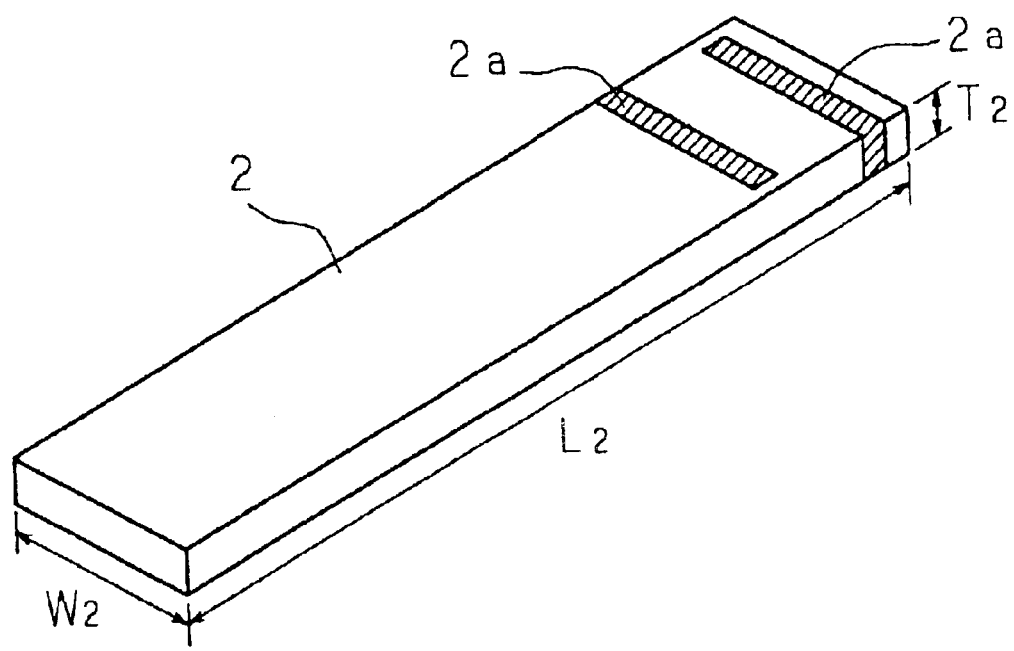
FIG. 4 is a perspective view showing a weight section of the acceleration sensor according to the first embodiment.

FIG. 2 is a perspective view showing the structure of an acceleration sensor 10 according to the first embodiment of the present invention, FIG. 3 is a perspective view of a vibrator 1 of the acceleration sensor 10, and FIG. 4 is a perspective view of a weight section 2 of the acceleration sensor 10. The acceleration sensor 10 includes the rectangular parallelepiped vibrator 1 (length $L_1$: 1.3 mm, width $W_1$: 2.5 mm, thickness $T_1$: 0.5 mm) formed of, for example, a $LiNbO_3$ single crystal piezoelectric element with 165° Y and θ=39°, and the rectangular parallelepiped weight section 2 (length $L_2$: 5.8 mm, width $W_2$: 2.5 mm, thickness $T_2$: 0.5 mm, density ρ: about $7.5 \times 10^3$ kg/m$^3$) made from aluminum.

As shown in FIG. 3, electrodes 1a, 1a are formed by longitudinally dividing an electrode into substantially two equal parts are provided on the front face (a face to be bonded to the weight section 2) of the vibrator 1. Moreover, as shown in FIG. 4, wiring patterns 2a, 2a are provided on the rear face of the weight section 2, at positions facing the electrodes 1a, 1a, in such a manner that the wiring patterns 2a, 2a extend to a region of the front face of the weight section 2.

Figure 5:
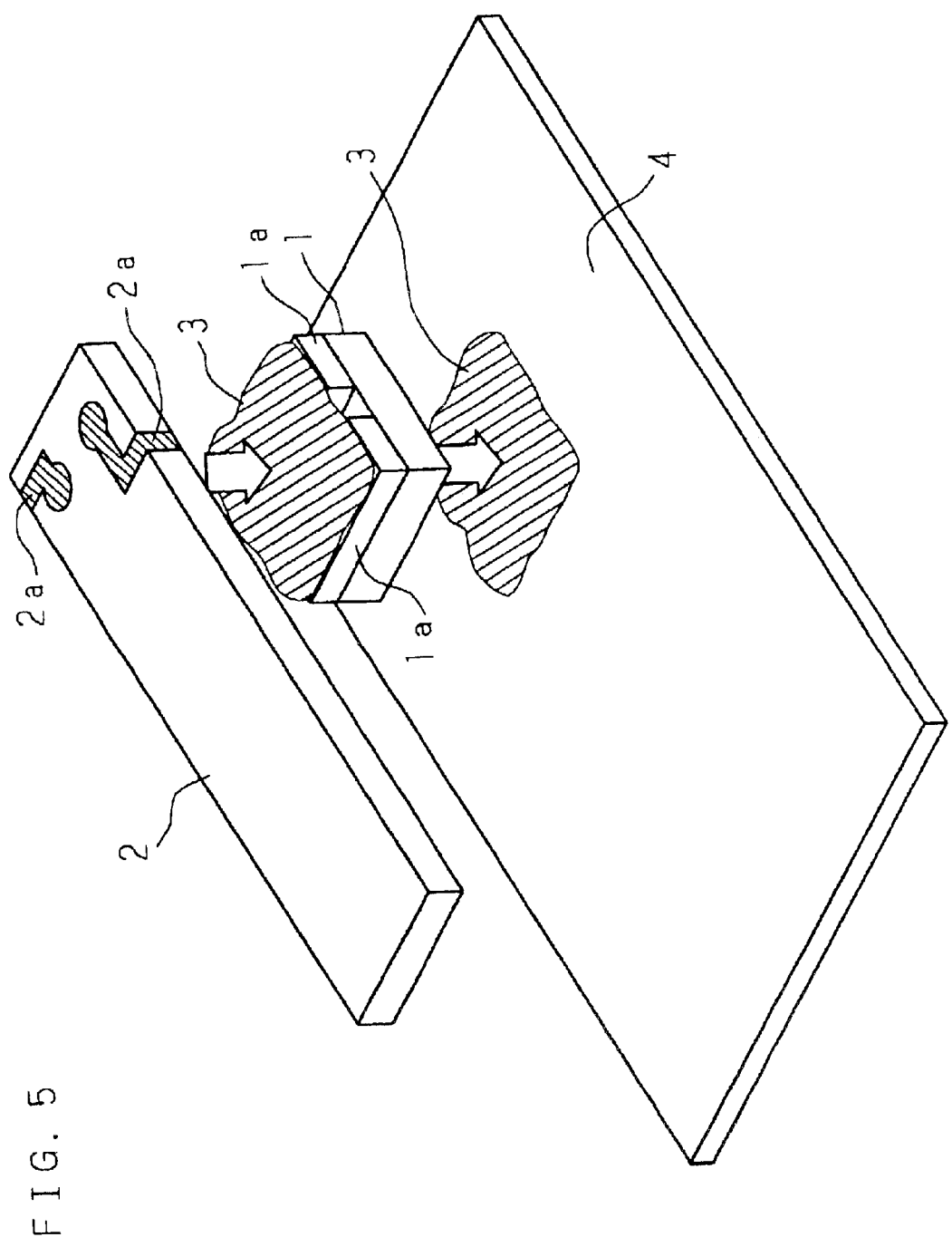
FIG. 5 is a depiction showing a process of bonding the vibrator and weight section and the vibrator and a specimen.

The vibrator 1 is connected to a supported end portion of the weight section 2 in such a manner that the electrodes 1a, 1a and the wiring patterns 2a, 2a are bonded to face each other. FIG. 5 is a depiction showing this bonding process. The electrodes 1a, 1a and wiring patterns 2a, 2a are bonded together with an adhesive 3 so as to form a conducting path, and, as shown in FIG. 5, the rear face of the vibrator 1 is bonded to a specimen 4 to be detected an acceleration with the adhesive 3 when detecting an acceleration. In order to facilitate the electrical connection between the vibrator 1 and weight section 2 and between the vibrator 1 and specimen 4, a conductive adhesive is used as the adhesive 3.

A preferred conductive adhesive is an anisotropic conductive adhesive. The anisotropic conductive adhesive has a conducting property only in one direction, and retains an insulating property in other direction. Therefore, this anisotropic conductive adhesive is used for the acceleration sensor 10 of the present invention so that the conductive property is exhibited only in the thickness direction (the vertical direction in FIG. 5). Accordingly, it is possible to prevent a short circuit connection between the divided electrodes 1a, 1a of the vibrator 1 and to ensure and facilitate the electrical connection between the divided electrodes 1a, 1a and the corresponding wiring patterns 2a, 2a, thereby improving the reliability of the electrical connection. Moreover, since the anisotropic conductive adhesive can be uniformly applied onto the divided electrodes 1a, 1a of the vibrator 1, it is possible to improve the readiness of fabrication and the bonding strength.

Figure 6:
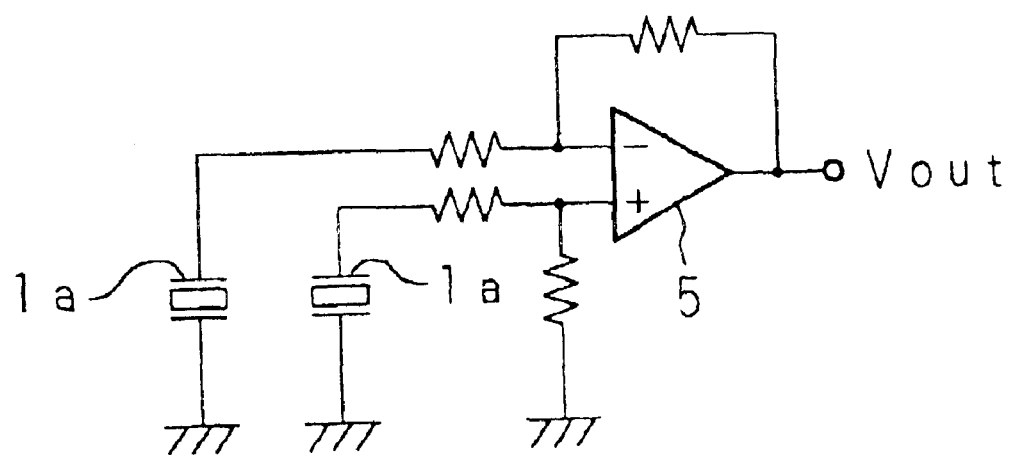
FIG. 6 is an illustration showing one example of a detection circuit of an acceleration sensor of the present invention.

Next, the following description will explain an operation of detecting an acceleration in the acceleration sensor 10 having such a structure. FIG. 6 is an illustration showing one example of a detection circuit. There is provided a differential amplifier 5 whose input terminals are connected to the electrodes 1a, 1a through the wiring patterns 2a, 2a (not shown in FIG. 6).

In the acceleration sensor 10 bonded to the specimen 4, when an acceleration in one direction (the widthwise direction, the void arrow direction in FIG. 2) is applied, an angular moment about the support point is exerted in the weight section 2 by the positional difference between the center of gravity of the weight section 2 and the support point, and sliding vibrations (shearing strains) of different orientation in the widthwise direction are exerted in both of the divided regions of the vibrator 1. Then, by drawing a voltage resulting from this sliding vibration (shearing strain) from both of the electrodes 1a, 1a, amplifying and detecting the potential difference through a differential amplifier 5, an acceleration is detected. The shearing forces on the electrodes 1a, 1a causes shearing strains in them, which results in voltages to measure the acceleration.

In such an acceleration sensor, since the weight section 2 also functions as a signal detecting substrate, it is possible to decrease the cost. Moreover, although the electrodes 1a, 1a of the vibrator 1 are hidden by the weight section 2, since the wiring patterns 2a, 2a connected to the electrodes 1a, 1a are extended to the front face of the weight section 2, the detection signals are easily drawn.

For such an acceleration sensor 10, it is possible to fabricate a number of vibrators 1 at a time. Specifically, after forming a pattern of two lines of electrodes on one piece of piezoelectric single crystal wafer, a plurality of vibrators 1 can be readily cut out from the wafer by, for example, dicing. Incidentally, as a method of forming the electrode pattern, it is possible to use, for example, screen printing, sputtering, plating and etching. As described above, in the first embodiment, the fabrication process is easy and a significant reduction in the cost is achievable.

Further, the above-mentioned example illustrates a case where a face having the divided electrodes 1a, 1a is located on the front face side (the weight section 2 side). However, even if the face having the divided electrodes 1a, 1a is located on the opposite side, i.e., the rear face side, of course the acceleration sensor 10 has the same function and effect and exhibits the same detection characteristics as above.

When an acceleration is applied in a direction (the thickness direction or longitudinal direction of the vibrator 1) other than the direction of an acceleration to be detected (the widthwise direction of the vibrator), an unnecessary output voltage is sometimes generated depending on the degree of distortion of the vibrator 1. This voltage is crosstalk and a major cause of deterioration of the S/N ratio.

In order to improve the S/N ratio by reducing crosstalk, it is preferable to use an X-cut plate of $LiNbO_3$ as the piezoelectric single crystal of the vibrator 1. For example, when an acceleration other than the one to be detected is applied in the thickness direction of the vibrator 1, the major cause of crosstalk is charge produced by an electromechanical coupling in the thickness direction. Since the X-cut plate of $LiNbO_3$ has no electromechanical coupling in the thickness direction, if it is used for the acceleration sensor 10 of the present invention which detects an acceleration in the widthwise direction, it is possible to reduce crosstalk significantly and achieve a satisfactory S/N ratio.

(Second Embodiment)

Figure 7:
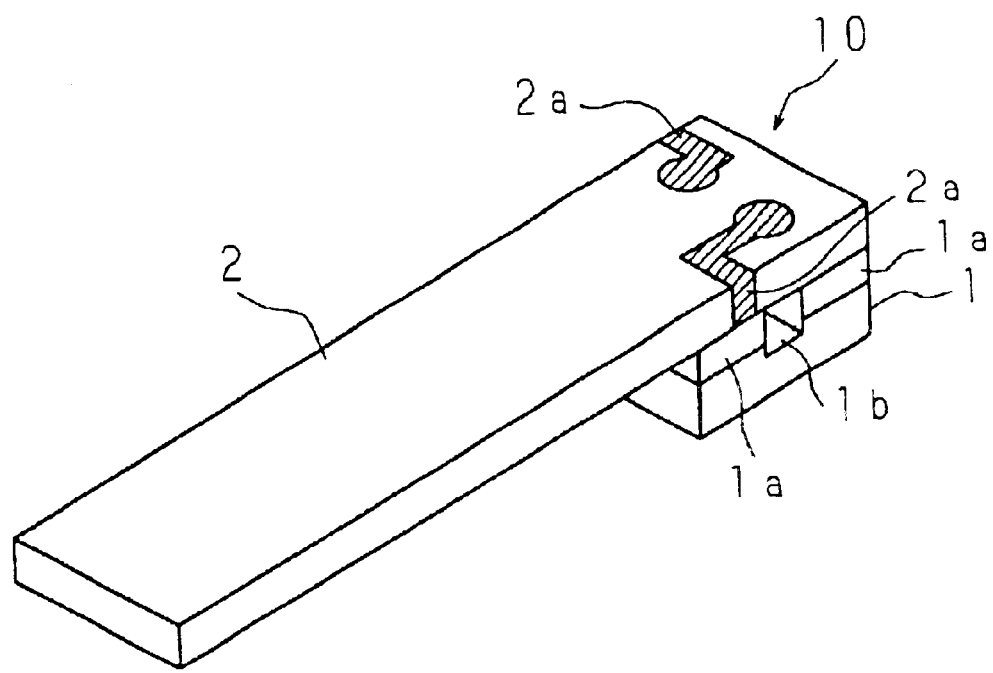
FIG. 7 is a perspective view showing the structure of an acceleration sensor according to the second embodiment.
Figure 8:
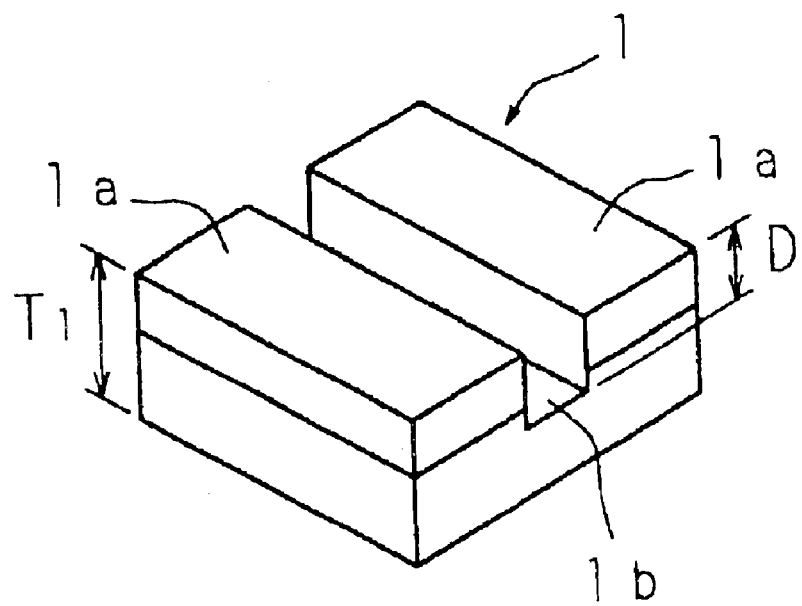
FIG. 8 is a perspective view showing a vibrator of the acceleration sensor according to the second embodiment.

FIG. 7 is a perspective view showing the structure of an acceleration sensor 10 according to the second embodiment of the present invention, and FIG. 8 is a perspective view of the vibrator 1 of the acceleration sensor 10. In the second embodiment, dividing of the detection portion is ensured by not only the divided electrodes 1a, 1a, but also a groove 1b (depth D: 0.05 mm) formed in the vibrator 1. Except for the formation of the groove 1b, the vibrator 1 of the second embodiment is the same in other configurations and material as that of the first embodiment. Besides, the weight section 2 is the same as that of the first embodiment.

Even for such an acceleration sensor 10, it is possible to fabricate a number of vibrators 1 at a time. Specifically after forming a pattern of electrodes over the entire front face of one piece of piezoelectric single crystal wafer by screen printing, sputtering, plating or other method, it is possible to easily fabricate a plurality of vibrators 1 provided with the electrodes 1a, 1a and groove 1b by, for example, dicing, etching, sandblasting, or other method. Here, by programming the cutting of each vibrator 1 and the dividing of the detection portion at the beginning, a number of the vibrators 1 can be completely automatically fabricated, thereby achieving a significant reduction in the cost.

Incidentally, the above-mentioned example illustrates a case where the groove 1b is formed in the front face (the weight section 2 side), However, even if the groove 1b is formed in the opposite side, i.e., the rear face, of course the acceleration sensor 10 has the same function and effect and exhibits the same detection characteristics as above.

Figure 9:
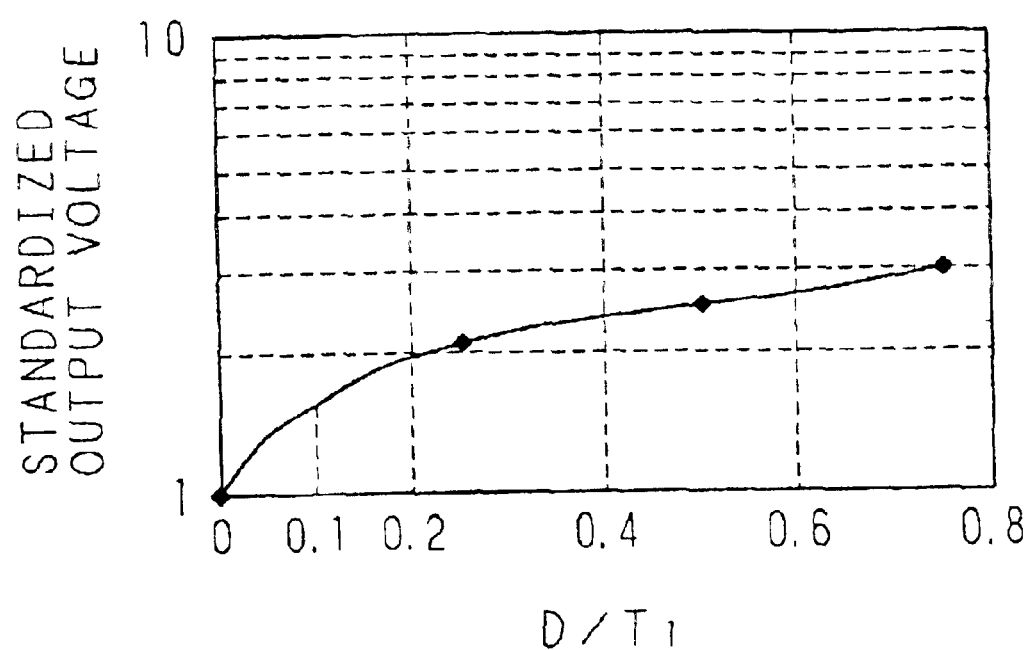
FIG. 9 is a graph showing the relationship between the standardized output voltage and the ratio $D/T_1$ of the depth D of the groove to the thickness $T_1$ of the vibrator.

Next, the relationship between the depth D of the groove 1b and the thickness $T_1$ of the vibrator 1 will be explained. FIG. 9 is a graph showing the relationship between the ratio $D/T_1$ of the depth D of the groove 1b to the thickness $T_1$ of the vibrator 1 (the horizontal axis) and the standardized output voltage (logarithmic scale, the vertical axis). Here, of course, this output voltage is equivalent to the detection sensitivity. It will be appreciated from the results shown in FIG. 9 that the output voltage increases abruptly until the ratio $D/T_1$ reaches "0.1", and then gradually rises with an increase of the ratio $D/T_1$. Therefore, in order to obtain a sufficient detection sensitivity, it is necessary to provide the groove 1b having a depth D that gives the ratio $D/T_1$ of not less than 0.1.

From the view point of the detection sensitivity, it is most effective to provide two piezoelectric vibrators side by side. In this case, however, there is a problem that the fabrication cost increases.

In the second embodiment, by limiting the depth D of the groove 1b as described above (to a value not less than 0.1 times the thickness $T_1$ of the vibrator 1), it is possible to hold a high detection sensitivity similar to that obtained by the two piezoelectric vibrators provided side by side, thereby achieving both of a reduction in the cost and an improvement in the sensitivity.

(Third Embodiment)

Next, the divided position of the detection portion in the first and second embodiments will be reviewed. In the acceleration sensor 10 of the present invention, the sliding directions in the two detection portions are opposite to each other between both sides of the support point (the center of rotation) of the weight section 2. In other words, the generated charges and in turn the output voltages have opposite polarities between the both sides of that point.

Figure 10:
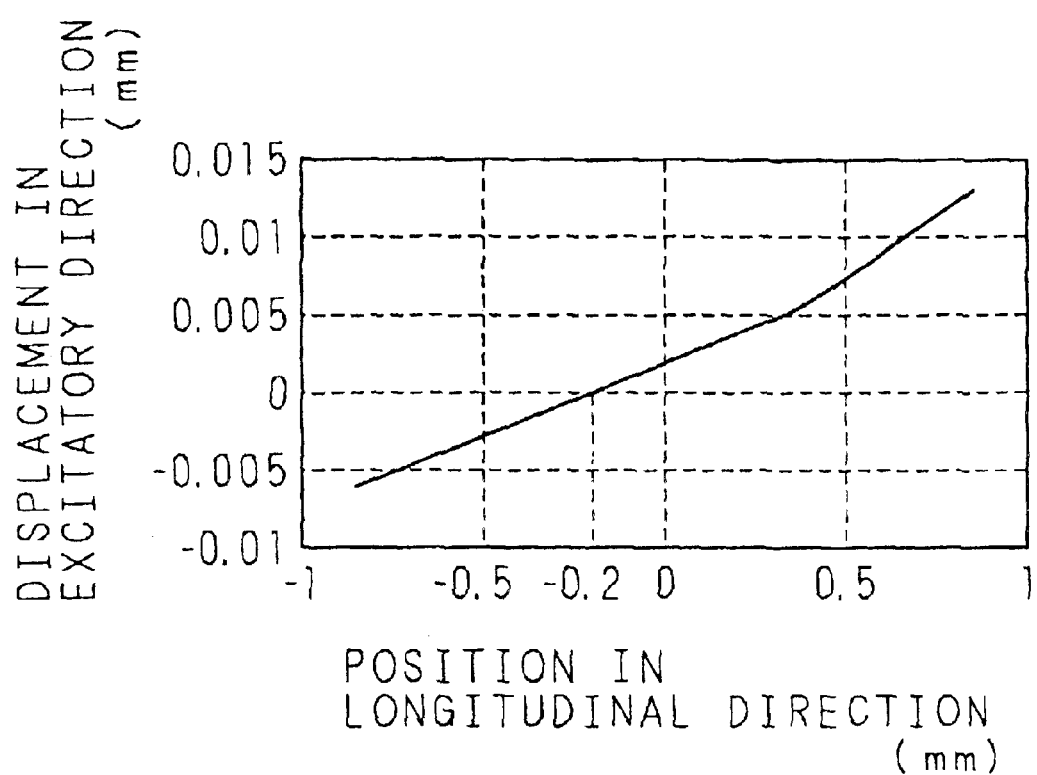
FIG. 10 is a graph showing the relationship between the position in a longitudinal direction of the vibrator and the displacement in an excitatory direction of the vibrator.

FIG. 10 is a graph showing the relationship between the position in a longitudinal direction of the vibrator 1 (the horizontal axis) and the displacement in an excitatory direction of the vibrator 1 (the vertical axis) according to the result of a simulation performed by applying an acceleration in a widthwise direction of the acceleration sensor 10. The vibrator 1 used in this simulation satisfied the conditions that it was formed from $LiNbO_3$ with 165° Y and θ=39° to have 1.3 mm in length $L_1$, 1.0 mm in width $W_1$ and 0.5 mm in thickness $T_1$, while one similar to the weight section 2 of the second embodiment was used as the weight section 2. Incidentally, a value "0" in the horizontal axis of FIG. 10 represents the center in the longitudinal direction, and positions in the longitudinal direction are shown by indicating a direction approaching the center of gravity of the weight section 2 as positive.

It will be appreciated from the result shown in FIG. 10 that the displacements on the front face of the vibrator 1 are not symmetrical about the center (the "0" position) in the longitudinal direction of the vibrator 1. Therefore, when the detection portion is divided at the center in the longitudinal direction of the vibrator 1, the generated charge is canceled and consequently the output voltage is lowered in the negative region in the longitudinal direction. Hence, when the detection portion is divided along a line crossing a point where the displacement is "0", i.e., a point where the angular moment of the weight section 2 is "0", and similarly a point where the generated charge is "0", opposite output voltages are efficiently obtained. As a result, the detection sensitivity is improved.

In the example shown in FIG. 10, since the position in the longitudinal direction where the displacement is "0" is −0.2 mm, it is possible to achieve a high detection sensitivity by dividing the detection portion at this position (the position 0.2 mm off from the center in the longitudinal direction toward the center of gravity of the weight section 2). Incidentally, the value indicating this divided position is one example, and of course the divided position of the vibrator 1 varies when the conditions of the vibrator 1 and weight section 2 are changed.

In the third embodiment, as described above, since the detection portion of the vibrator 1 is divided at a position where the charge distribution is substantially zero, i.e., a position where the angular moment is substantially zero, it is possible to hold a high detection sensitivity and achieve both of a reduction in the cost and an improvement in the sensitivity.

(Fourth Embodiment)

Next, the relationship between the width $W_1$ of the vibrator 1 and the width $W_2$ of the weight section 2 of the acceleration sensor 10 of the present invention will be reviewed.

Figure 11:
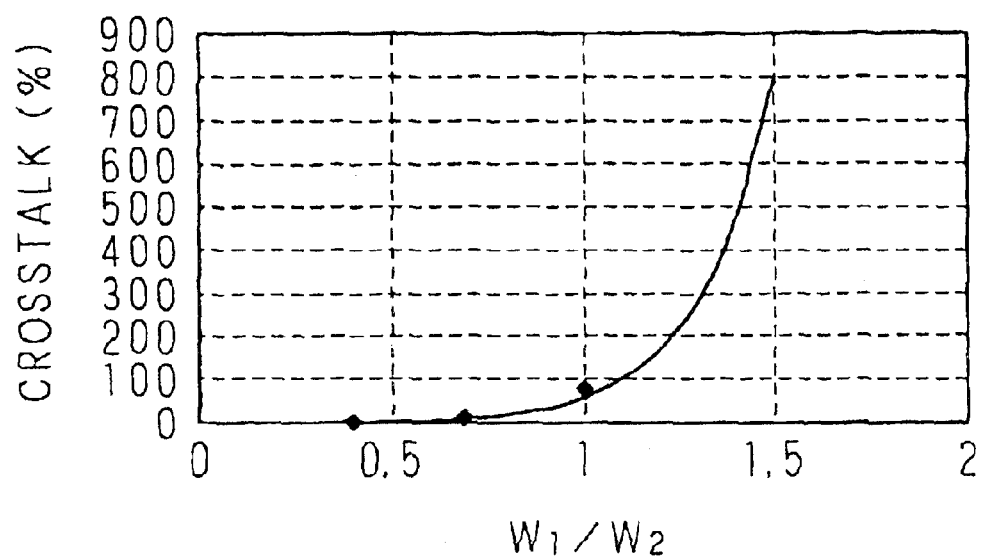
FIG. 11 is a graph showing the relationship between crosstalk and the ratio $W_1/W_2$ of the width $W_1$ of the vibrator to the width $W_2$ of the weight section.

FIG. 11 is a graph showing the relationship between the ratio $W_1/W_2$ of the width $W_1$ of the vibrator 1 to the width $W_2$ of the weight section 2 (the horizontal axis) and crosstalk (the vertical direction) according to the result of a simulation performed by applying an acceleration in a thickness direction which is not a direction of an acceleration to be detected by the acceleration sensor 10. The vibrator 1 used in this simulation satisfied the conditions that it was formed from $LiNbO_3$ with 165° Y and θ=20° to have 1.3 mm in length $L_1$ and 0.5 mm in thickness $T_1$, while one similar to the weight section 2 of the first and second embodiment was used as the weight section 2, and the ratio $W_1/W_2$ was varied by changing the width $W_1$ of the vibrator 1.

It will be appreciated from the result shown in FIG. 11 that crosstalk increases as the ratio $W_1/W_2$ increases, and particularly, crosstalk shows an abrupt increase when the ratio $W_1/W_2$ exceeds "1", i.e., when the width $W_1$ of the vibrator 1 is larger than the width $W_2$ of the weight section 2. Thus, if the width $W_1$ of the vibrator 1 is made larger than the width $W_2$ of the weight section 2, crosstalk becomes greater than a desired detection signal, and consequently an accurate acceleration in the widthwise direction cannot be detected. Therefore, in the acceleration sensor 10 of the fourth embodiment, the width $W_1$ of the vibrator 1 is set less than the width $W_2$ of the weight section 2 so as to reduce crosstalk and achieve a satisfactory S/N ratio.

(Fifth Embodiment)

Figure 12:
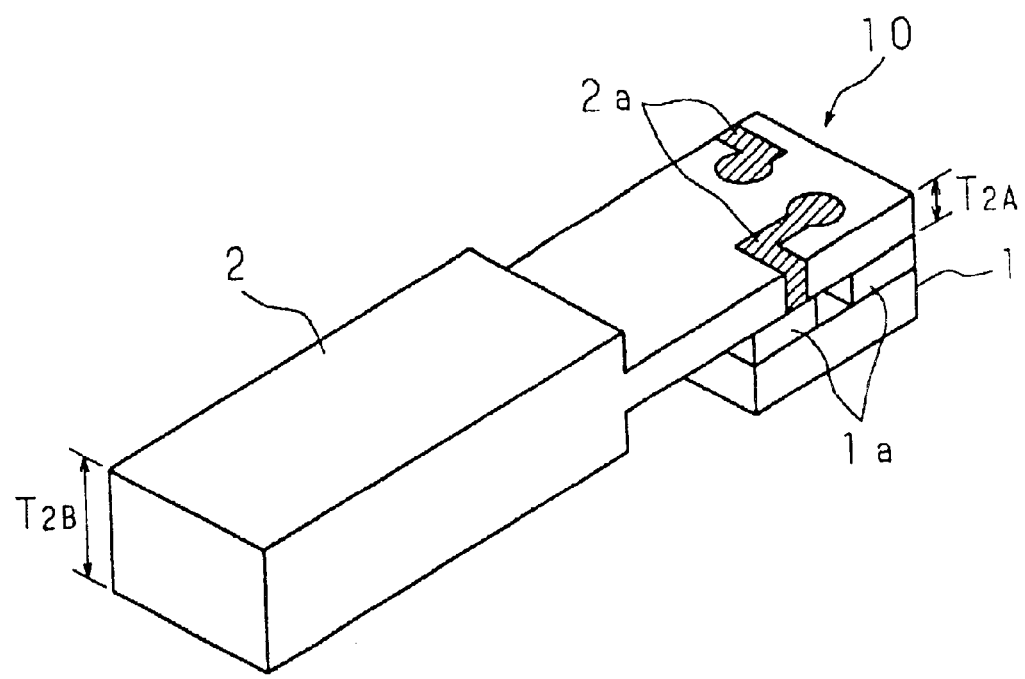
FIG. 12 is a perspective view showing the structure of an acceleration sensor according to the fifth embodiment.

In the acceleration sensor 10 of the present invention, as the length from the support point of the weight section 2 to the center of gravity thereof is increased and as the mass of the weight section 2 is increased, the angular moment of the weight section 2 becomes larger and the detection sensitivity is improved. FIG. 12 is a perspective view showing the structure of an acceleration sensor 10 according to the fifth embodiment of the present invention;

In this acceleration sensor 10, the thickness of the weight section 2 is not uniform, and the thickness ($T_{2A}$: 0.5 mm) of a substantially half portion on the vibrator 1 side (the supported-end side) is thinner than the thickness ($T_{2B}$: 1.5 mm) of the remaining substantially half portion on the opposite side (the free-end side). Thus, by making the thickness of the free-end side portion thicker than that of the supported-end side portion so as to increase the length from the support point to the center of gravity and to increase the entire mass, the detection sensitivity is improved.

Incidentally, in the example shown in FIG. 12, the thickness is increased in both of the directions to the front side and rear side. However, needless to say, it is possible to increase the thickness in either of the directions to the front side and rear side.

Besides, the above example illustrates the case where the thickness of the free-end side portion of the weight section 2 is made thicker. However, even when a weight section 2 in which the width of the free-end side portion is larger than that of the supported-end side portion is used, of course a similar effect is obtained.

(Sixth Embodiment)

In the acceleration sensor 10 of the present invention, as also explained in the fifth embodiment, by increasing the length from the support point of the weight section 2 to the center of gravity thereof and by increasing the mass of the weight section 2, it is possible to increase the angular moment of the weight section 2 that is proportional to the product of the length and mass and to improve the detection sensitivity. Accordingly, in the sixth embodiment, the weight section 2 is constructed by using a plurality of materials of different densities so that a portion on the vibrator 1 side (supported-end side portion) is formed from a material with a low density and the opposite portion (free-end side portion) is formed from a material with a high density. For example, it is possible to form the supported-end side portion from alumina (the density: about $7.5 \times 10^3$ $kg/m^3$) whereby the wiring patterns 2a, 2a are easily formed, and to form the free-end side portion from a material such as molybdenum (the density: about $1.9 \times 10^4$ $kg/m^3$), tungsten (the density: about $1.0 \times 10^4$ $kg/m^3$) or the like which have a high density and are easily molded.

(Sixth Embodiment: First Example)

Figure 13:
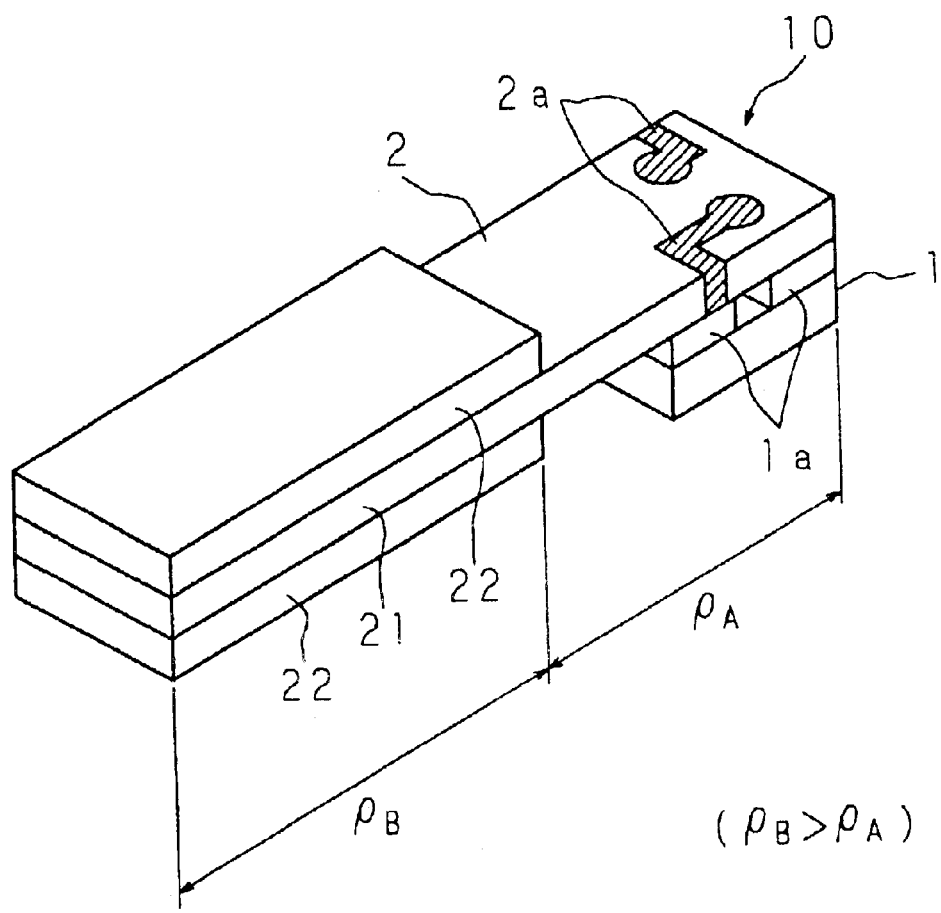
FIG. 13 is a perspective view showing the structure of an acceleration sensor according to the first example of the sixth embodiment.

FIG. 13 is a perspective view showing the structure of an acceleration sensor 10 according to the first example of the sixth embodiment. The weight section 2 of this acceleration sensor 10 is constructed by a first weight 21, which is made from alumina and also functions as a signal detecting substrate like the first and second embodiments, and second weights 22, 22 which are made from molybdenum and attached to the front and rear faces of the free-end side portion of the first weight 21.

By constructing the weight section 2 in this manner, the density ($\rho_B$) of the free-end side portion is greater than the density ($\rho_A$) of the supported-end side portion ($\rho_B > \rho_A$) and the angular moment of the weight section 2 becomes larger, thereby further improving the detection sensitivity.

Incidentally, in the example shown in FIG. 13, the second weight 22 is attached to each of the front and rear faces of the first weight 21. However, needless to say, the second weight 22 may be provided only on the front face or rear face. Moreover, in the example shown in FIG. 13, although the first weight 21 and the second weight 22 have the same width, it is possible to make the width of the second weight 22 larger than that of the first weight 21 so as to further increase the angular moment.

(Sixth Embodiment: Second Example and Third Example)

Figure 14A:
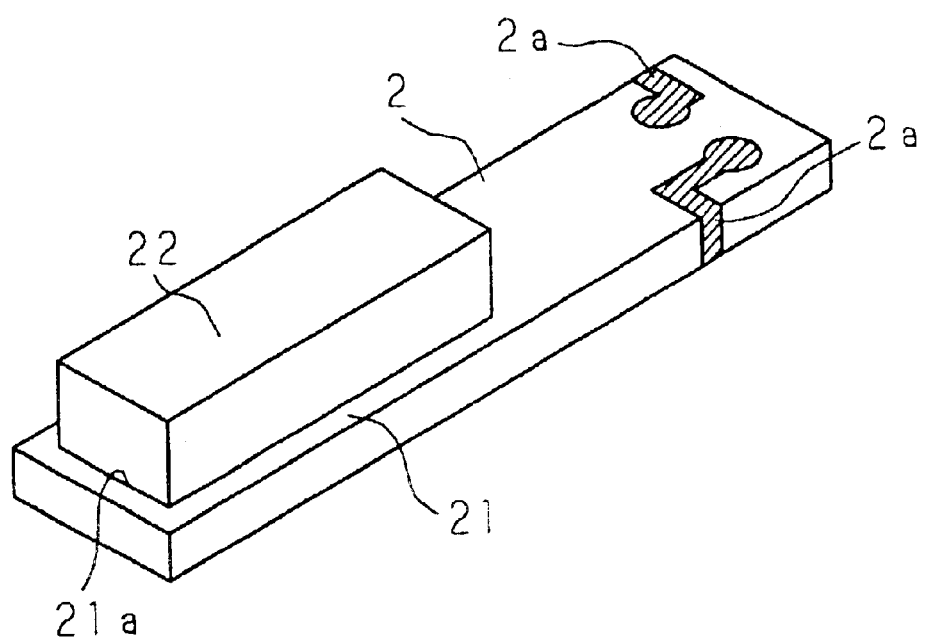
FIG. 14A is a perspective view of a weight section of an acceleration sensor according to the second example of the sixth embodiment.
Figure 14B:
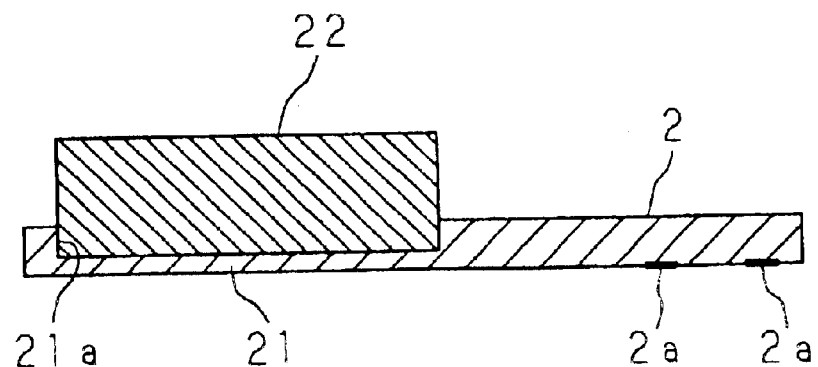
FIG. 14B is a cross sectional view of the weight section of the acceleration sensor according to the second example of the sixth embodiment.
Figure 15A:
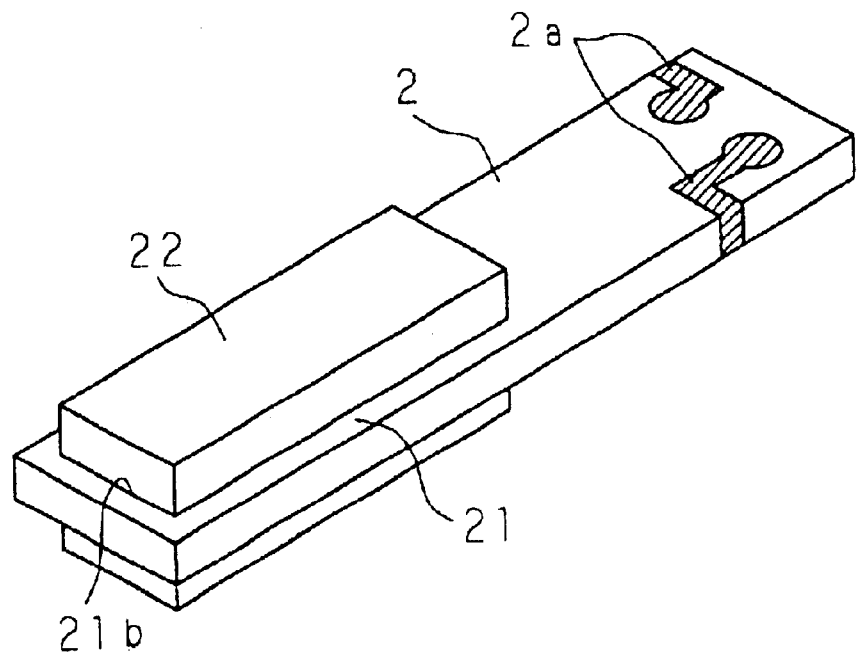
FIG. 15A is a perspective view of a weight section of an acceleration sensor according to the third example of the sixth embodiment.
Figure 15B:
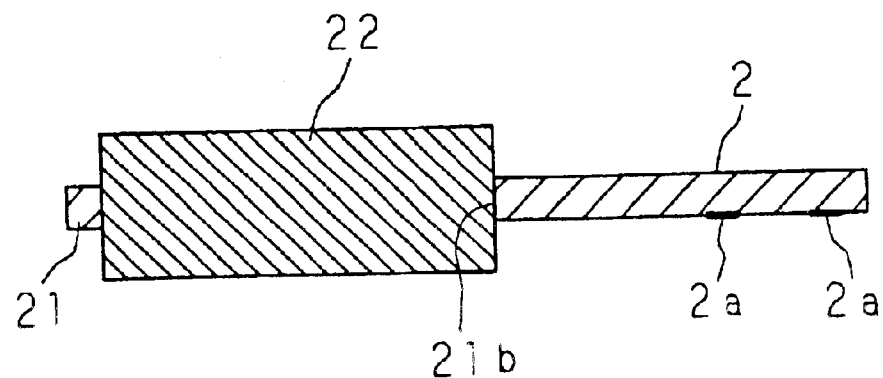
FIG. 15B is a cross sectional view of the weight section of the acceleration sensor according to the third example of the sixth embodiment.

FIGS. 14A and 14B are the perspective view and cross sectional view of the weight section 2 of an acceleration sensor 10 according to the second example of the sixth embodiment, and FIGS. 15A and 15B are the perspective view and cross sectional view of the weight section 2 of an acceleration sensor 10 according to the third example of the sixth embodiment. The second and third examples are constructed so as to make the angular moment of the weight section 2 greater than that of the first example.

In the second example, the weight section 2 is constructed by providing the second weight 22 on the front face of the free-end side portion of the first weight 21 in such a manner that the second weight 22 is partly buried in a groove portion 21a of the first weight 21. Incidentally, in the example shown in FIGS. 14A and 14B, while the second weight 22 is provided on only one of the faces of the first weight 21, it may be provided on both the faces. In the third example, the weight section 2 is constructed by fitting the second weight 22 into a hole 21b formed in the free-end side portion of the first weight 21.

The second example in which the second weight 22 is buried in the first weight 21 and the third example in which the second weight 22 is fitted into the first weight 21 provide excellent resistance to shock and are suitable for use in vehicles having a high possibility to get strong shock.

(Sixth Embodiment: Fourth Example and Fifth Example)

Figure 16A:
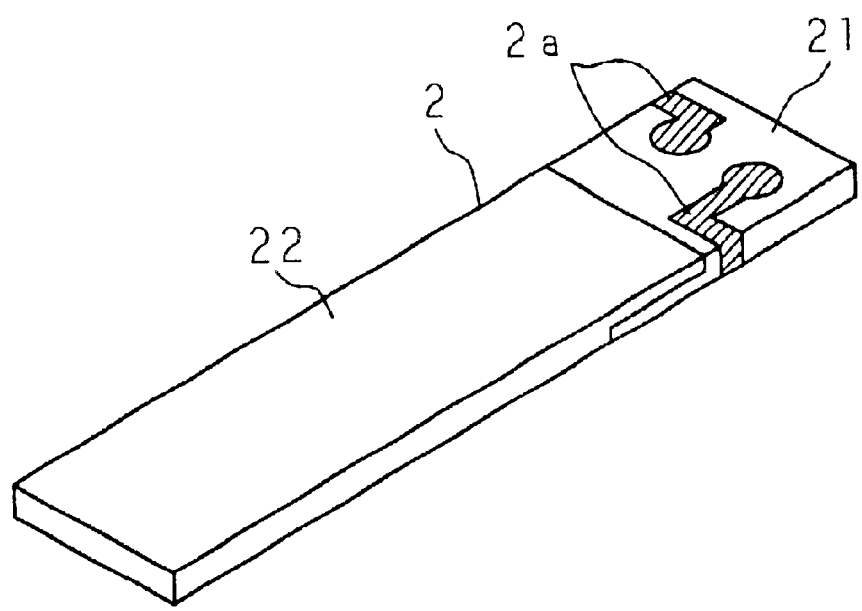
FIG. 16A is a perspective view of a weight section of an acceleration sensor according to the fourth example of the sixth embodiment.
Figure 16B:
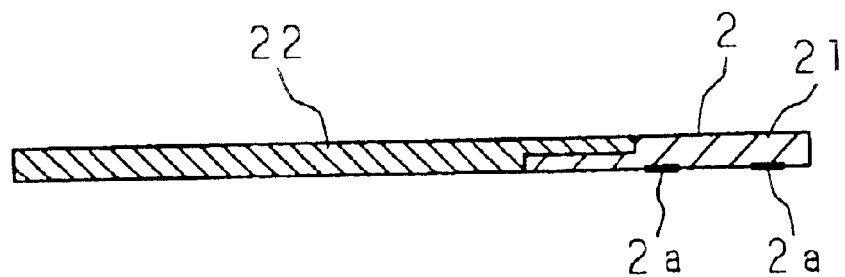
FIG. 16B is a cross sectional view of the weight section of the acceleration sensor according to the fourth example of the sixth embodiment.
Figure 17A:
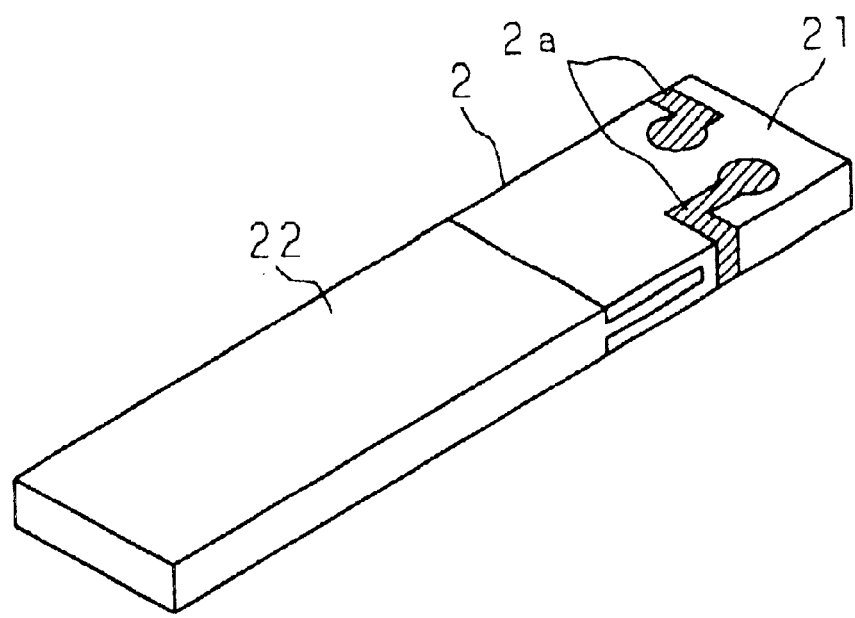
FIG. 17A is a perspective view of a weight section of an acceleration sensor according to the fifth example of the sixth embodiment.
Figure 17B:
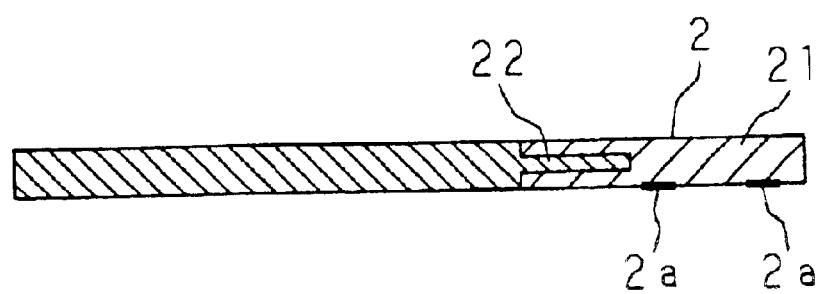
FIG. 17B is a cross sectional view of the weight section of the acceleration sensor according to the fifth example of the sixth embodiment.

FIGS. 16A and 16B are the perspective view and cross sectional view of the weight section 2 of an acceleration sensor 10 according to the fourth example of the sixth embodiment, and FIGS. 17A and 17B are the perspective view and cross sectional view of the weight section 2 of an acceleration sensor 10 according to the fifth example of the sixth embodiment. The weight section 2 of each of the fourth and fifth embodiments is constructed by engaging the first weight 21 on the supported-end side with the weight 22 on the free-end side. In the fourth example, the engaged region has a two-layer structure consisting of the second weight 22 on the front-face side and the first weight 21 on the rear-face side. In the fifth example, the engaged region has a three-layer structure consisting of the first weight 21 on the front-face side and on the rear-face side, and the second weight 22 in the middle.

In the fourth and fifth examples, if the acceleration sensor 10 is constructed so that the center of gravity of the first weight 21 is located on the vibrator 1, there is no possibility that the weight section 21 hangs down due to its own weight in bonding the first weight 21 to the vibrator 1 with an anisotropic conductive adhesive or the like, thereby facilitating the bonding process. Besides, if the acceleration sensor 10 is constructed so that the center of gravity of the second weight 22 is positioned within the engaged region, there is no possibility that the second weight 22 hangs down due to its own weight in bonding the second weight 22 to the first weight 21 with an adhesive, etc., thereby facilitating the bonding process.

(Seventh Embodiment: First Example and Second Example)

Figure 18:
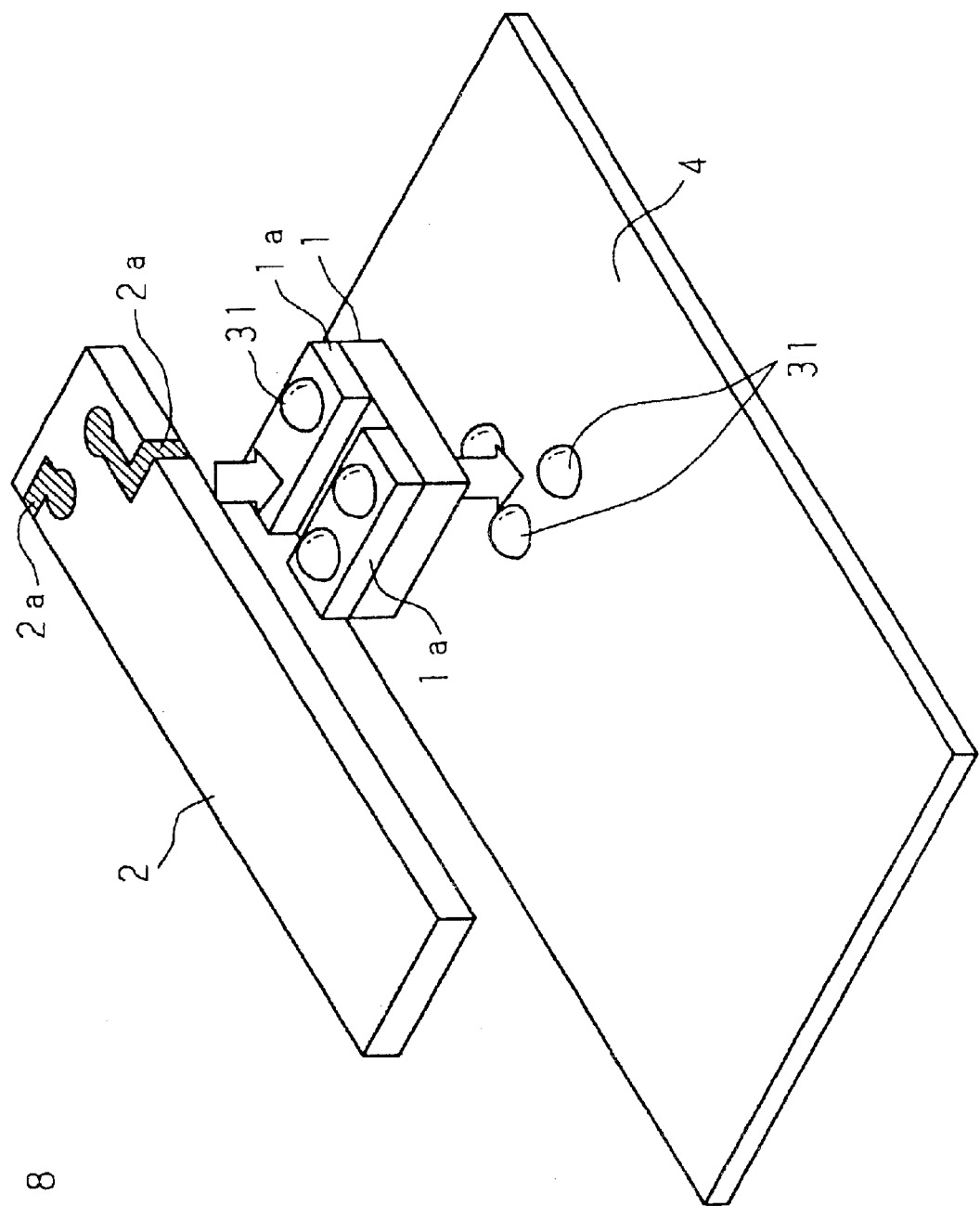
FIG. 18 is a depiction showing a process of connecting the weight section and vibrator and connecting the vibrator and specimen according to the first example of the seventh embodiment.
Figure 19:
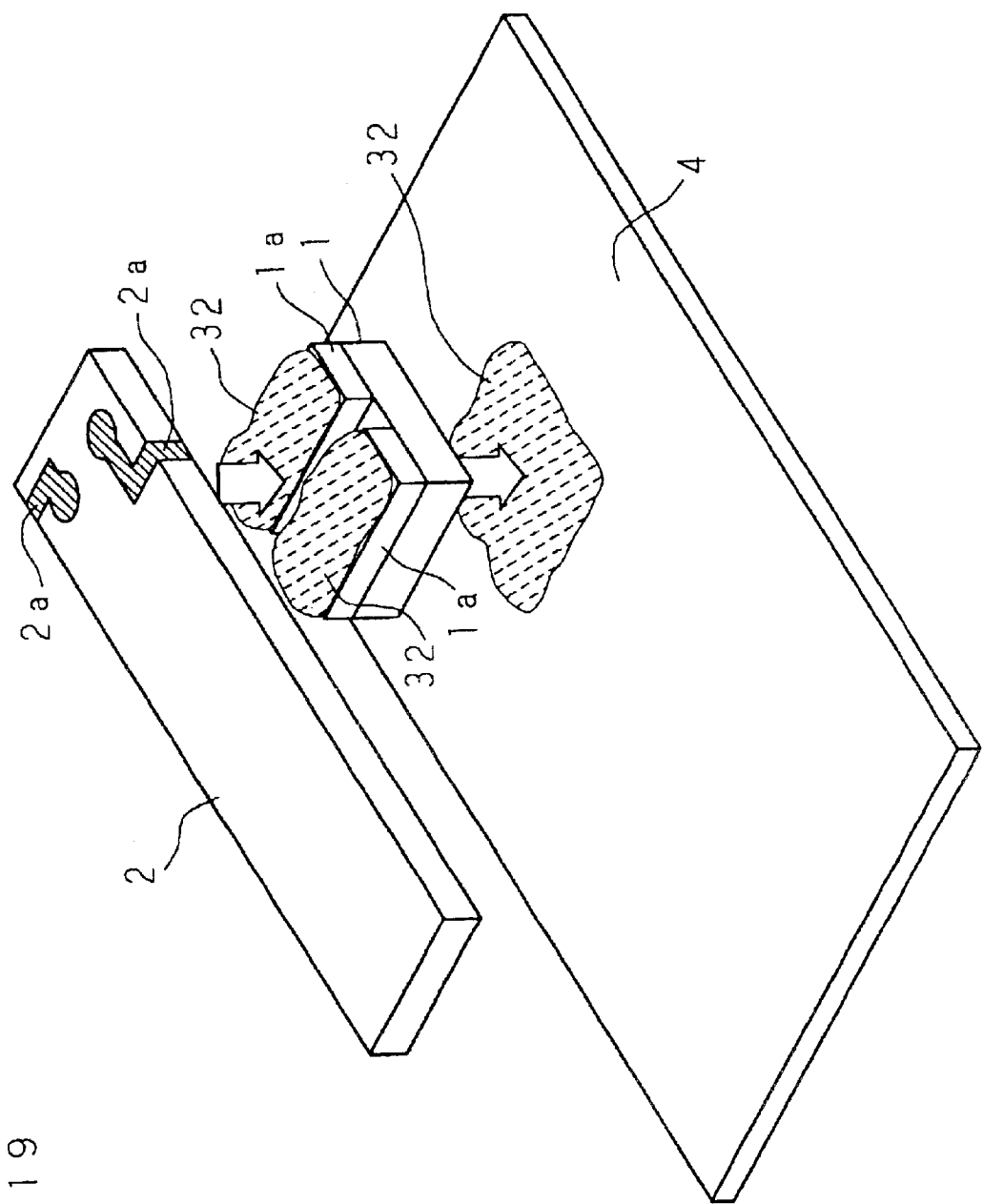
FIG. 19 is a depiction showing a process of connecting the weight section and vibrator and connecting the vibrator and specimen according to the second example of the seventh embodiment.

FIG. 18 is a depiction showing a process of connecting the weight section 2 and vibrator 1 and connecting the vibrator 1 and specimen 4 according to the first example of the seventh embodiment. In the first example, the weight section 2 and vibrator 1, and the vibrator 1 and specimen 4 are electrically connected using bumps 31 of a solder, gold, etc. FIG. 19 is a depiction showing a process of connecting the weight section 2 and vibrator 1 and connecting the vibrator 1 and specimen 4 according to the second example of the seventh embodiment. In the second example, the weight section 2 and vibrator 1, and the vibrator 1 and specimen 4 are electrically connected with a cream of solder 32. In such first and second examples, it is possible to reduce a loss of transmission energy at a resin portion generated by a resin-based adhesive and to improve the readiness of fabrication and the detection sensitivity.

(Eighth Embodiment)

Figure 20:
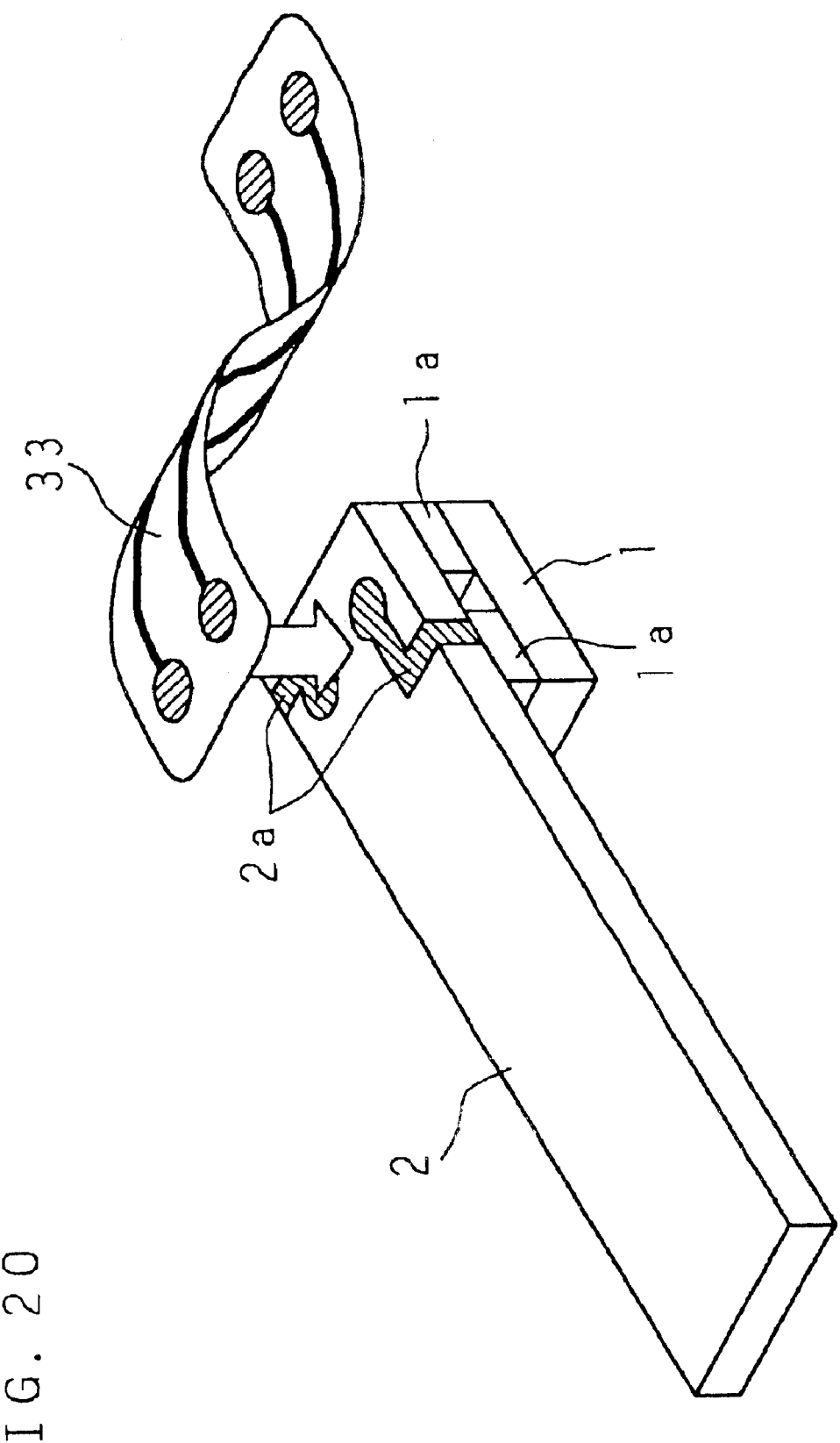
FIG. 20 is a perspective view showing the structure of an acceleration sensor according to the eighth embodiment.

FIG. 20 is a perspective view showing the structure of an acceleration sensor 10 according to the eighth embodiment. In the eighth embodiment, a FPC (flexible print connector) 33 is used to extend the signal lines from the wiring patterns 2a, 2a of the weight section 2 to a signal detection circuit (not shown). With the use of the FPC 33, since the signal lines are readily extended, it is possible to reduce the cost significantly. Alternatively, it is possible to connect lines by bonding, such as a ribbon or a wire, instead of using the FPC 33.

(Ninth Embodiment: First Example and Second Example)

Figure 21:
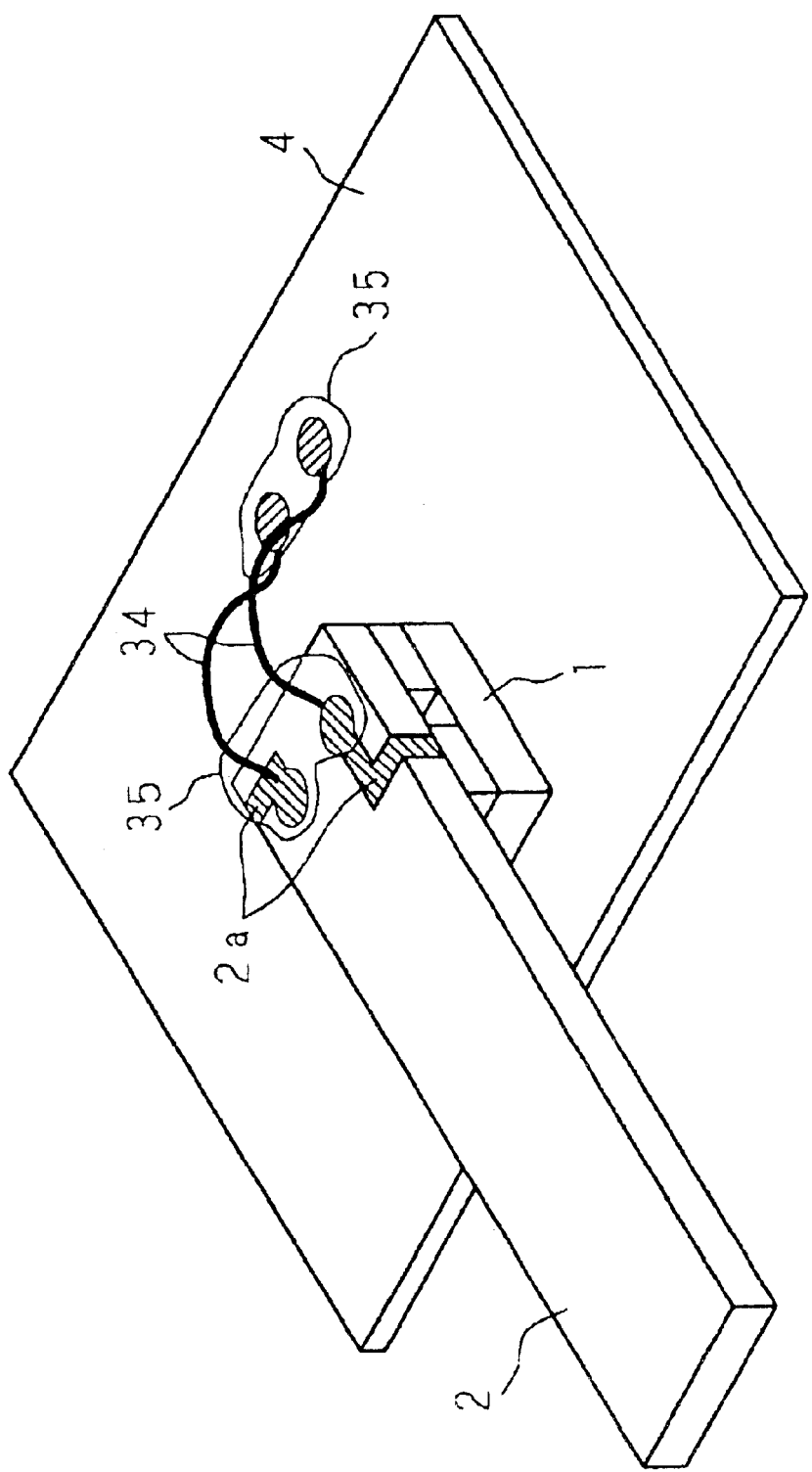
FIG. 21 is an illustration showing the connected state of an acceleration sensor and a detection circuit substrate according to the first example of the ninth embodiment.
Figure 22:
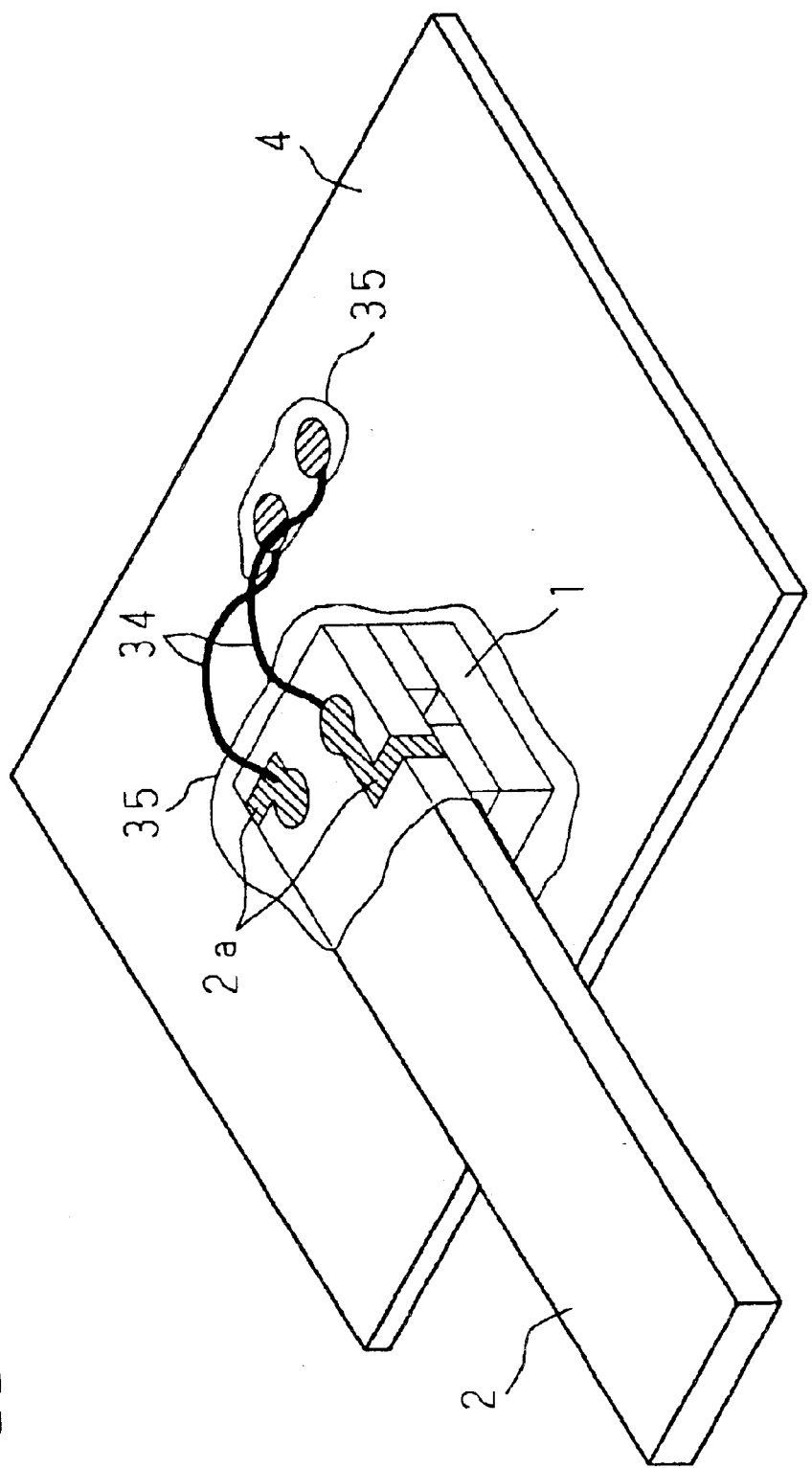
FIG. 22 is an illustration showing the connected state of an acceleration sensor and a detection circuit substrate according to the second example of the ninth embodiment.

FIG. 21 is an illustration showing the connected state of an acceleration sensor 10 and a detection circuit substrate according to the first example of the ninth embodiment. The wiring patterns 2a, 2a of the weight section 2 and the detection circuit substrate are connected by wires 34, 34, and the connected portions are coated with a resin 35 such as silicone. FIG. 22 is an illustration showing the connected state of an acceleration sensor 10 and a detection circuit substrate according to the second example of the ninth embodiment. Not only the connected portions by wires 34, 34 are coated with the resin 35 like the first example, but also the entire supported portion of the weight section 2 as well as the vibrator 1 is coated with the resin 35 such as silicone.

In the ninth embodiment, such a resin coating is used to prevent accidents such as a disconnection of lines due to strong external shock and to improve the reliability. Besides, in the second example, it is possible to prevent a separation between the weight section 2 and vibrator 1 and between the vibrator 1 and specimen 4 without limiting the angular moment. Although the example using wire bonding has been explained, of course, this resin coating is also effective for the cases using ribbon bonding or an FPC.

Figure 23A:
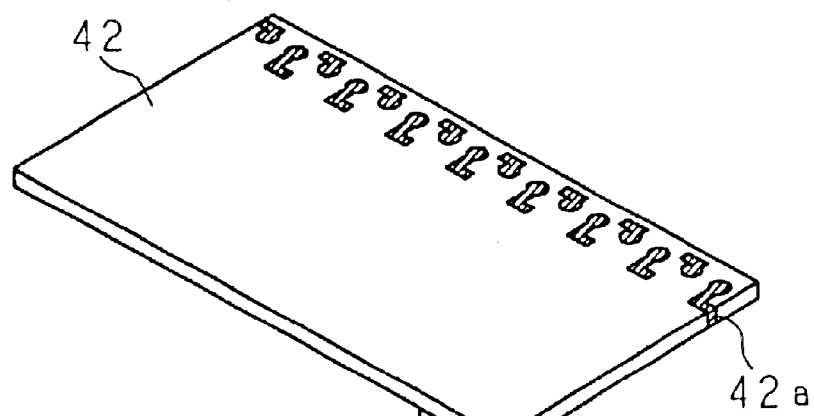
FIGS. 23A through 23C are depictions showing a process of fabricating an acceleration sensor of the present invention.
Figure 23B:
Figure 23C:
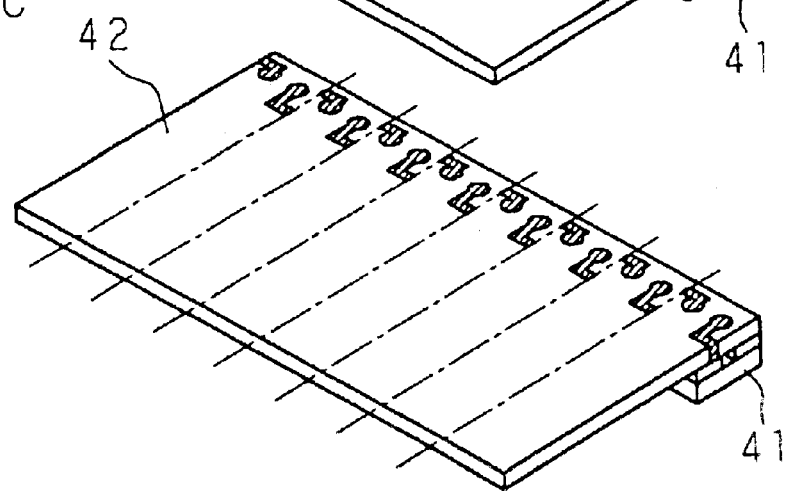

Here, the fabrication process of the acceleration sensor 10 of the present invention is briefly explained. FIGS. 23A through 23C are depictions showing a process of fabricating a plurality of the acceleration sensors 10 of the present invention at a time. An alumina plate 42 whose front and rear faces are provided with a plurality of wiring patterns 42a that are to be the wiring patterns 2a of the weight section 2 is positioned on a long piezoelectric single crystal element 41 whose front face is provided with a pattern of two lines of electrodes 41a, 41a that are to be the divided electrodes 1a, 1a of the vibrator 1 so that the wiring pattern 42a faces the electrodes 41a, 41a (FIG. 23A), and then the piezoelectric single crystal element 41 and alumina plate 42 are bonded together with an anisotropic conductive adhesive (FIG. 23B) Next, this bonded structure is cut into pieces of sensors by dicing or other method to fabricate a plurality of acceleration sensors 10 (FIG. 23C).

With such a fabrication process, it is possible to readily fabricate a number of the acceleration sensors 10 at a time, decrease the number of processing steps significantly, and achieve a reduction in the cost.

(Tenth Embodiment)

Figure 24:
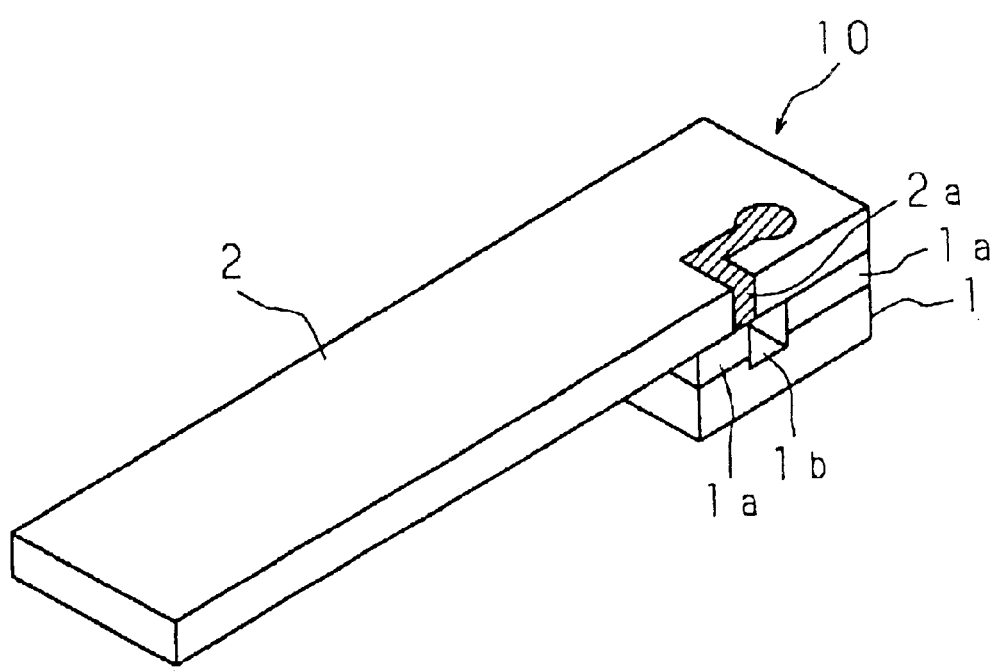
FIG. 24 is a perspective view showing the structure of an acceleration sensor according to the tenth embodiment.
Figure 25:
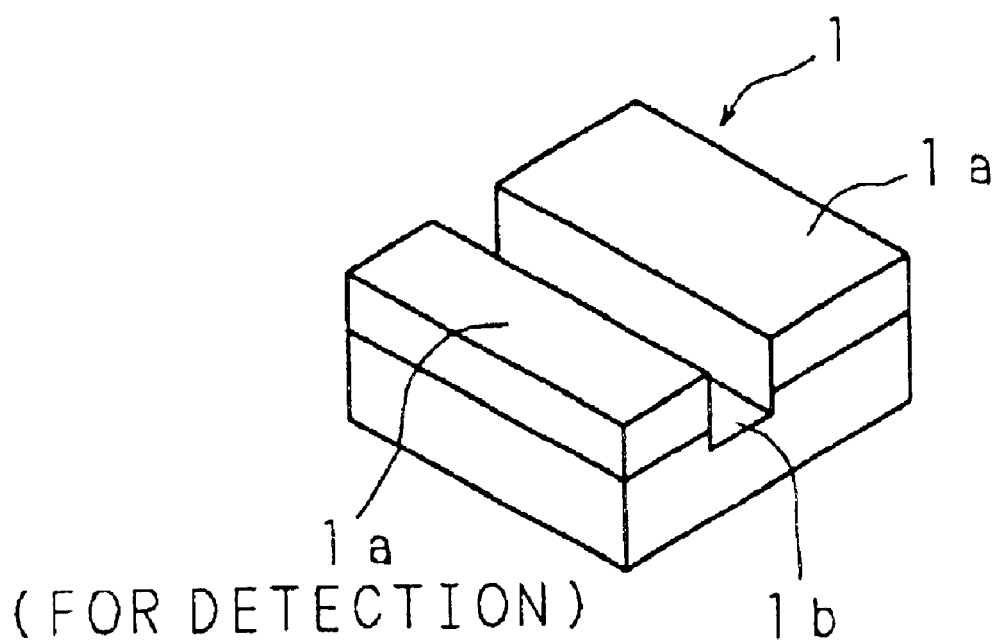
FIG. 25 is a perspective view of a vibrator of the acceleration sensor according to the tenth embodiment.
Figure 26:
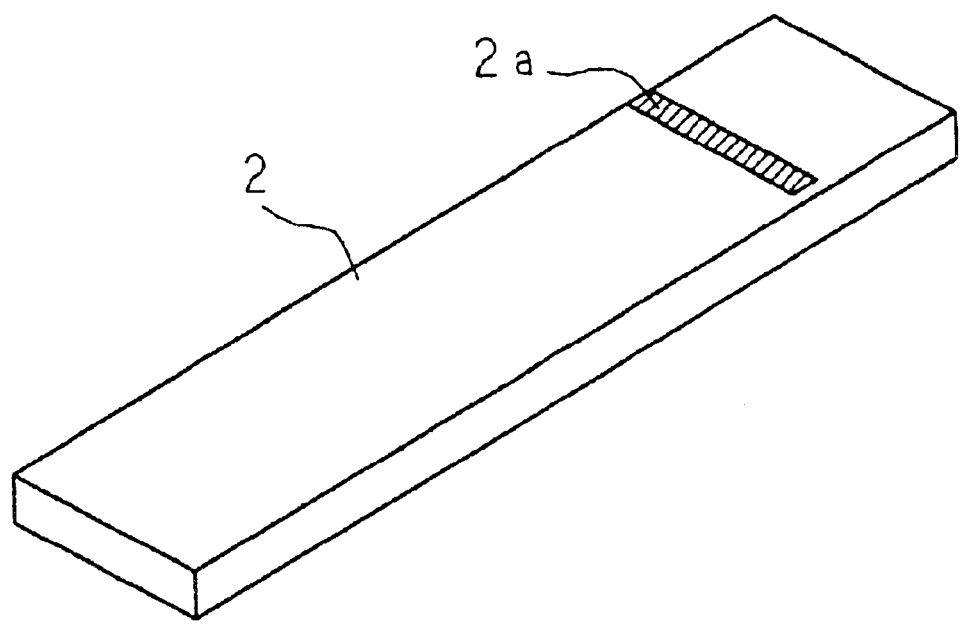
FIG. 26 is a perspective view of a weight section of the acceleration sensor according to the tenth embodiment.

FIG. 24 is a perspective view showing the structure of an acceleration sensor 10 according to the tenth embodiment of the present invention, FIG. 25 is a perspective view of the vibrator 1 of the acceleration sensor 10, and FIG. 26 is a perspective view of the weight section 2 of the acceleration sensor 10. In the tenth embodiment, like the second embodiment, the detection portion of the vibrator 1 is divided by not only the divided electrodes 1a, 1a, but also the groove 1b. Moreover, this divided position is not the center in a longitudinal direction of the vibrator 1 and is slightly off from the center to the free-end side of the weight section 2, and the electrode 1a on the free-end side is shorter in length than the electrode 1a on the supported-end side. Further, the function and effect of this groove 1b are the same as those in the second embodiment.

In the above-described embodiments, the wiring patterns 2a, 2a are provided at two positions on the weight section 2, facing the electrodes 1a, 1a of the vibrator 1, respectively, while in the tenth embodiment, the wiring pattern 2a is provided only at a position facing the electrode 1a on the free-end side in such a manner that it extends to a region of the front face of the weight section 2, and thus the wiring pattern 2a is not provided at a position facing the electrode 1a on the supported-end side.

Figure 27A:
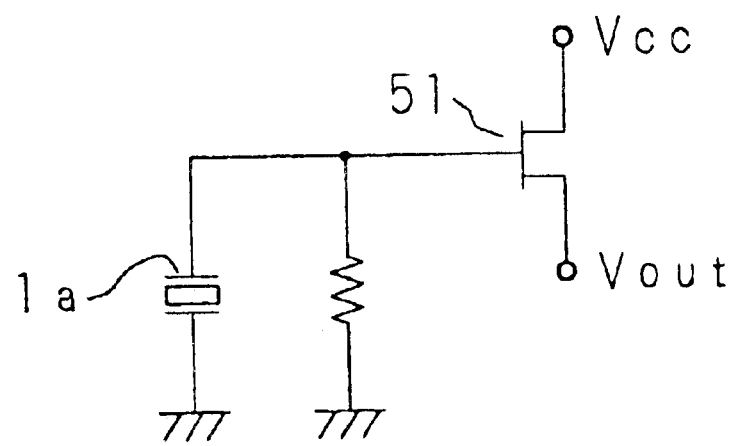
FIGS. 27A and 27B are illustrations showing one example of a detection circuit of the acceleration sensor according to the tenth embodiment.
Figure 27B:
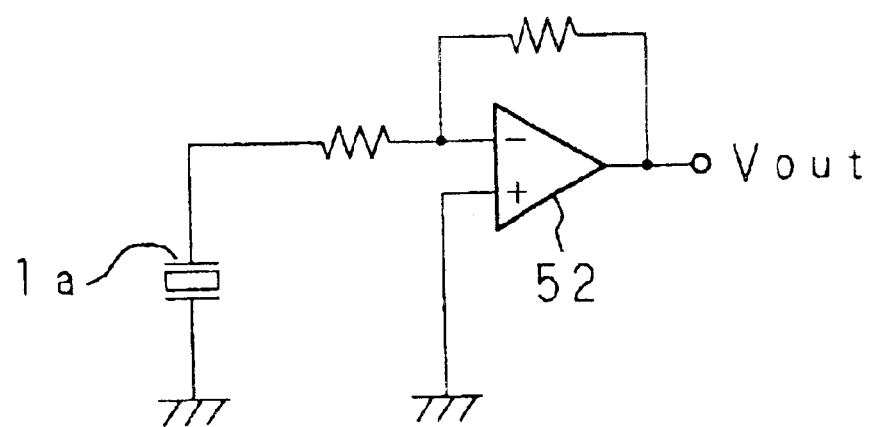

In the above-described embodiments, an acceleration is detected based on the difference between output voltages from both the electrodes 1a, 1a (the differential output). In the tenth embodiment, however, an acceleration is detected based only on an output voltage of the electrode 1a on the free-end side (single output). FIGS. 27A and 27B are illustrations showing one example of a detection circuit according to the tenth embodiment. With the use of an FET 51 and a preamplifier 52, the output voltage of the electrode 1a on the free-end side is amplified and an acceleration is detected.

Figure 28:
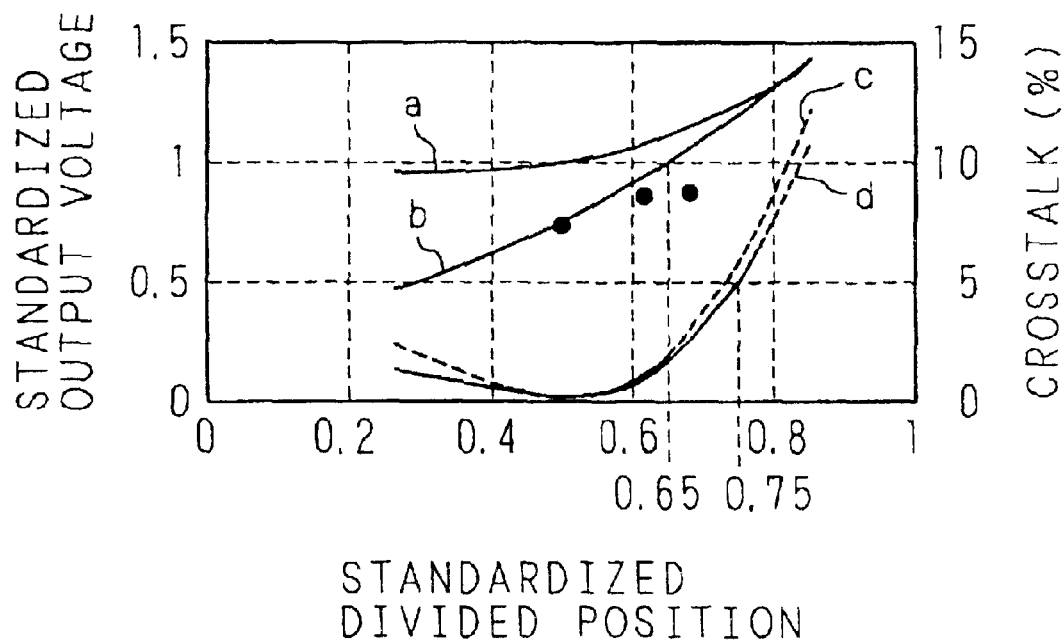
FIG. 28 is a graph showing the relationship between the divided position and standardized output voltage and crosstalk in detection by a differential output and by a single output.

FIG. 28 is a graph showing the relationship between the divided position (the horizontal axis) and the standardized output voltage and crosstalk (the vertical axis) for each type of detection using the differential output or single output, based on the results of simulations and actual measurements. The horizontal axis shows the standardized divided positions with "1" corresponding to the position of the free end of the vibrator 1, "0" the position of the supported end thereof and "0.5" the center in a longitudinal direction of the vibrator 1. The solid lines a and b indicate changes in the standardized output voltage in the detection using the differential output and the detection using single output, respectively. The broken lines c and d show changes in crosstalk in the detection using the differential output and the detection using single output, respectively. ● indicates the actually measured values of the standardized output voltage in the detection using single output.

In both of the detection using the differential output and the detection using single output, crosstalk is minimum when the detection portion of the vibrator 1 is divided into two equal parts (when the standardized divided position is "0.5"). It will be appreciated that, in the case of the detection using single output, as the divided position becomes closer to the position of the free end, the detected output voltage is closer to that obtained in the detection using the differential output and a similar detection sensitivity is obtained. For instance, with the use of single output, in order to obtain a detection sensitivity similar to or higher than that obtained with the use of the differential output when the vibrator 1 is equally divided, the vibrator 1 can be divided at a standardized divided position of not less than "0.65". Moreover, considering crosstalk, when the value of crosstalk is limited to 5% or less, the vibrator 1 can be divided at a standardized divided position of not more than "0.75".

Incidentally, like the second embodiment, the above-described example illustrates the case where the groove 1b is formed in the front face (the weight section 2 side).

Similarly, when the groove 1b is formed in the opposite side (the rear face), needless to say, the detection characteristics are the same as above. Furthermore, like the first embodiment, even when the detection portion is divided by only the electrodes 1a, 1a without forming the groove 1b, of course, it is possible to detect an acceleration by a single output from one electrode 1a on the free-end side.

As described above, in the tenth embodiment, since an acceleration can be detected only by the output voltage from one of the electrodes 1a with the same sensitivity as that in the detection based on the differential output, it is possible to decrease the circuit scale and significantly reduce the cost.

(Eleventh Embodiment: First Example and Second Example)

Figure 29:
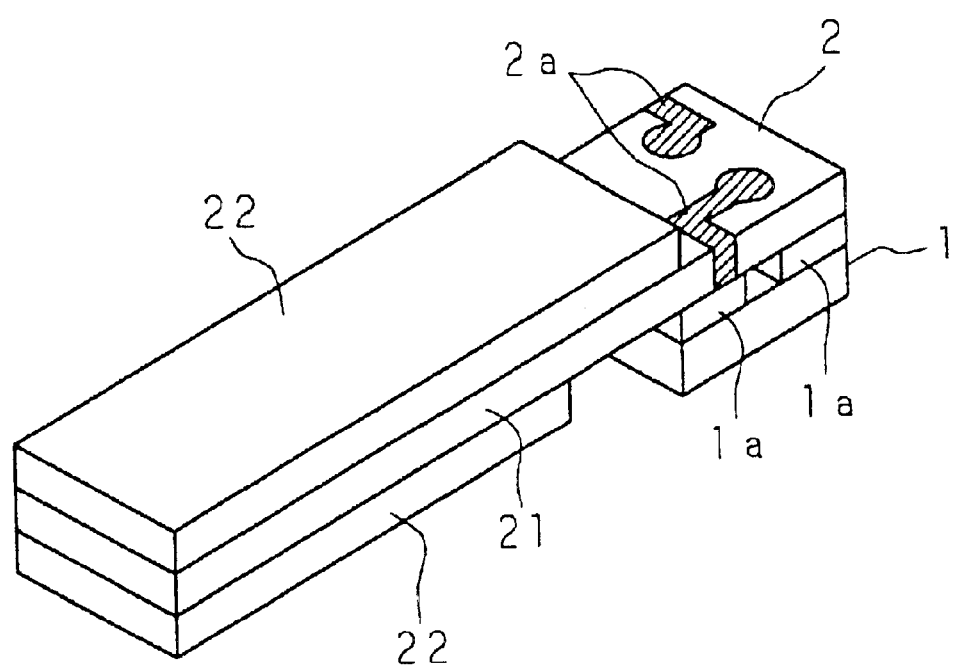
FIG. 29 is a perspective view showing the structure of an acceleration sensor according to the first example of the eleventh embodiment.

FIG. 29 is a perspective view showing the structure of an acceleration sensor 10 according to the first example of the eleventh embodiment of the present invention. Like the sixth embodiment, the weight section 2 of the acceleration sensor 10 of the first example is constructed by a first weight 21 made from alumina and second weights 22, 22 made from molybdenum, One second weight 22 is mounted on the front face of the first weight 21, which also functions as a signal detecting substrate, so that it extends from the free end to a position slightly overlapping the vibrator 1, while the other second weight 22 is mounted on the rear face of the first weight 21 so that it extends from the free end to a position little before the vibrator 1. Alternatively, the second weight 22 on the front face may have a length similar to that of the first weight 21.

Figure 30:
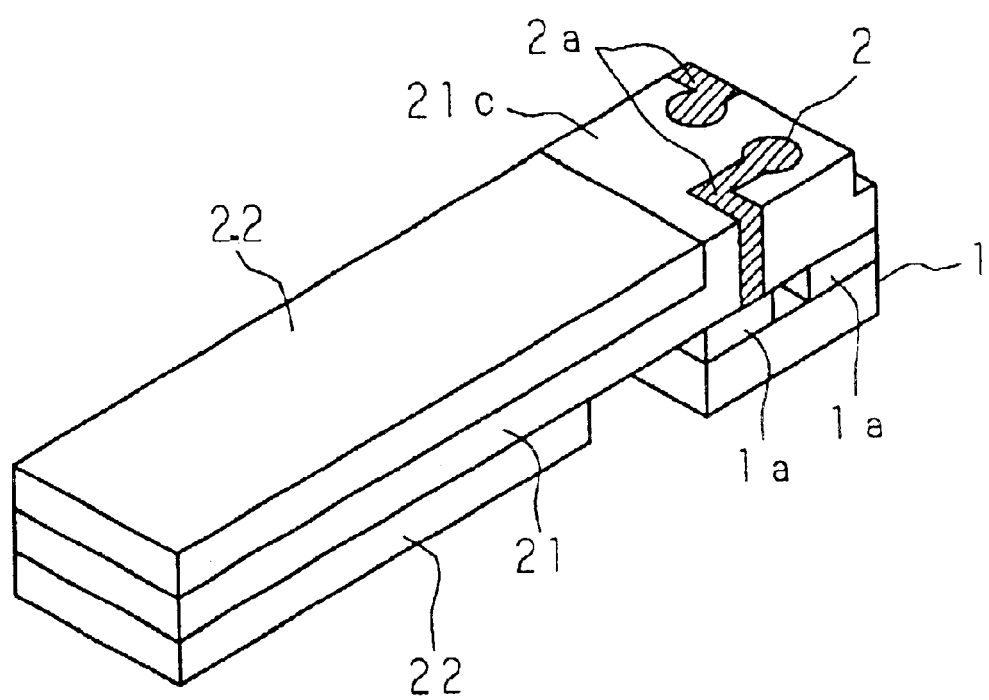
FIG. 30 is a perspective view showing the structure of an acceleration sensor according to the second example of the eleventh embodiment.

FIG. 30 is a perspective view showing the structure of an acceleration sensor according to the second example of the eleventh embodiment of the present invention. Like the sixth embodiment, the weight section 2 of the acceleration sensor 10 of the second example is constructed by a first weight 21 made from alumina which also functions as a signal detecting substrate and second weights 22, 22 made from molybdenum. A portion of the first weight 21 from one end on the vibrator 1 to the center forms a thicker portion 21c thicker than other portion, and one second weight 22 is provided on the front face of the first weight 21 so that it extends from the free end and reaches the thicker portion 21c, while the other second weight 22 is provided on the rear face of the first weight 21 so that it extends from the free end to a position little before the vibrator 1. Alternatively, the thicker portion 21c of the first weight 21 may be formed to extend over the entire area of the vibrator 1.

In both of the first and second examples, the thinnest portion of the weight section 2 is positioned on the vibrator 1. In a structure where the thinnest portion of the weight section 2 is located on one end side which is not on the vibrator 1, when an acceleration in a thickness direction which is not the subject of detection is applied, resonance occurs at the thinnest portion and strong crosstalk results. In contrast, in the eleventh embodiment, since the thinnest portion of the weight section 2 is supported and fixed on the vibrator 1, even if an acceleration in a thickness direction is applied, resonance does not occur and crosstalk is little. It was confirmed by the experiments performed by the present inventors that, when an acceleration in a thickness direction is applied, crosstalk of not less than 50% occurs in the structure where the thinnest portion is not on the vibrator 1, but only crosstalk of not more than 5% occurs in the structure of the eleventh embodiment where the thinnest portion is positioned on the vibrator 1.

Further, the above-described example illustrates the case where the thinnest portion of the weight section 2 is positioned on the vibrator 1. However, since it is only preferred that this thinnest portion is not located on the free-end side from the vibrator 1, even if the weight section 2 is further extended from the vibrator 1 to the supported-end side and the extended portion forms the thinnest portion, the same function and effect as those of the above-described examples are obtained.

(Twelfth Embodiment)

Figure 31:
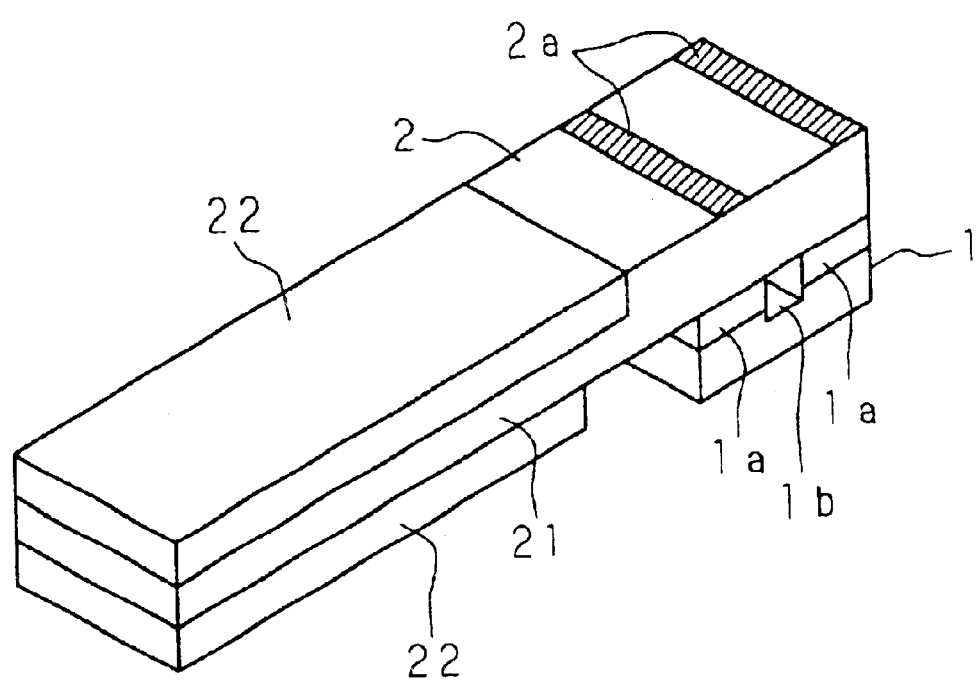
FIG. 31 is a perspective view showing the structure of an acceleration sensor according to the twelfth embodiment.
Figure 32A:
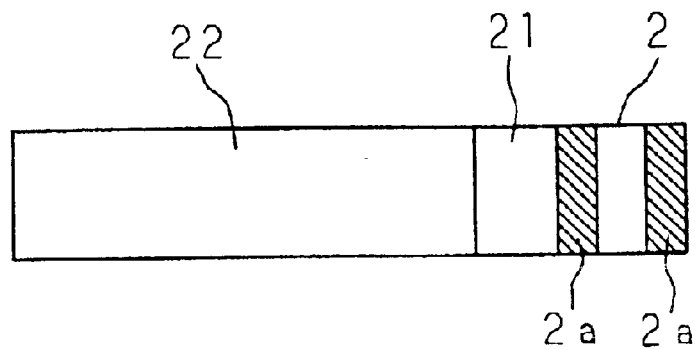
FIG. 32A is a front view of a weight section of the acceleration sensor according to the twelfth embodiment.
Figure 32B:
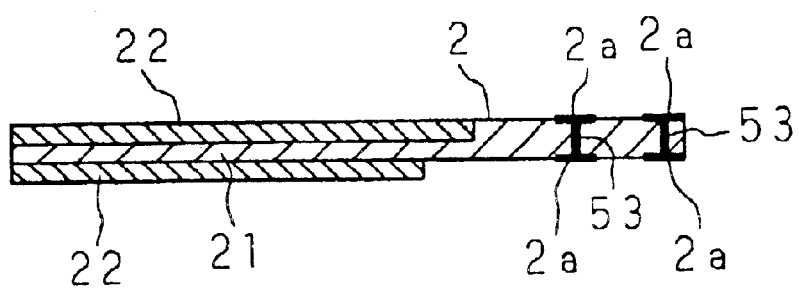
FIG. 32B is a cross sectional view of the weight section of the acceleration sensor according to the twelfth embodiment.
Figure 32C:
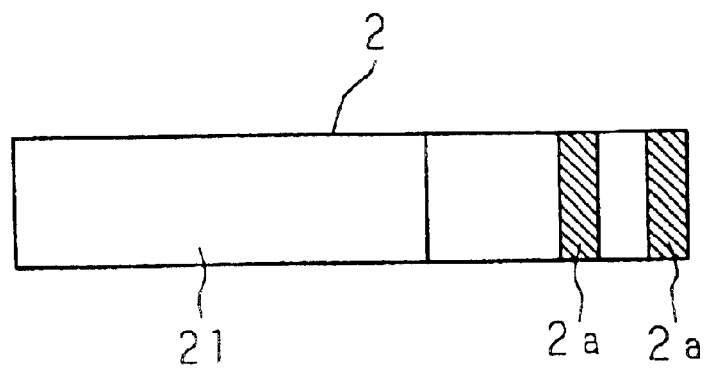
FIG. 32C is a rear view of the weight section of the acceleration sensor according to the twelfth embodiment.

FIG. 31 is a perspective view showing the structure of an acceleration sensor 10 according to the twelfth embodiment of the present invention, FIG. 32A, FIG. 32B and FIG. 32C are the front view, cross sectional view and rear view, respectively, of the weight section 2 of the acceleration sensor 10 according to the twelfth embodiment. In the weight section 2 of the twelfth embodiment, wiring patterns 2a, 2a, 2a, 2a are formed on the front and rear faces at positions corresponding to the electrodes 1a, 1a, and the wiring pattern 2a on the front face and the wiring pattern 2a on the rear face are electrically connected with a through-hole 53. The wiring patterns 2a, 2a on the rear face and the electrodes 1a, 1a are bonded together, so that the output voltages from the electrodes 1a, 1a are drawn through the wiring patterns 2a, 2a on the rear face, the through-hole 53 and the wiring patterns 2a, 2a on the front face.

By the way, in the acceleration sensor of the preset invention as described above, the detection portion for sliding vibration of the vibrator 1 is divided into a plurality of parts, a groove 1b is formed, and the inside of this groove 1b is made a hollow state. The reason for this is that, if a relatively hard object is placed in this groove 1b, reciprocal sliding vibration of the vibrator 1 to be exerted by an applied acceleration is limited, and the detection performance is lowered. As described above, the vibrator 1 and weight section 2 are connected with an adhesive such as an anisotropic conductive adhesive so as to form a conducing path. In this case, however, there is a possibility that the adhesive runs into the groove 1b and the groove 1b is filled with the adhesive. Therefore, in order to maintain the inside of the groove 1b in a hollow state, it is necessary to take some measure. The following description will explain specific examples of the measure (the thirteenth to sixteenth embodiments).

(Thirteenth Embodiment)

Figure 33A:
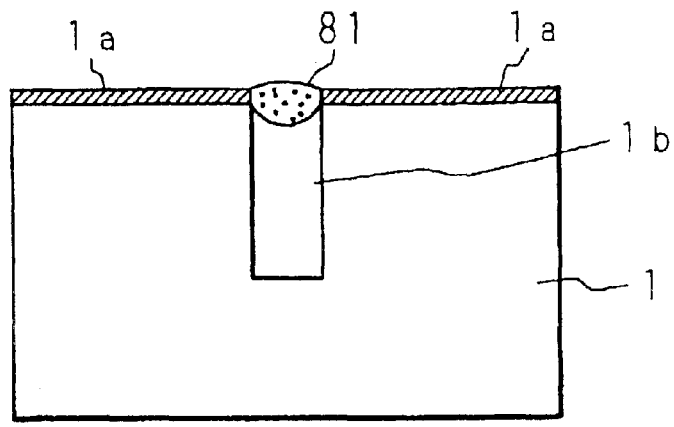
FIGS. 33A through 33C are cross sectional views showing a process of fabricating an acceleration sensor according to the thirteenth embodiment.
Figure 33B:
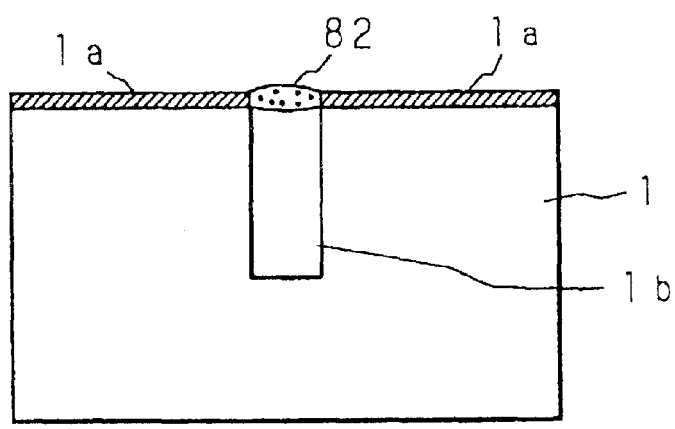
Figure 33C:
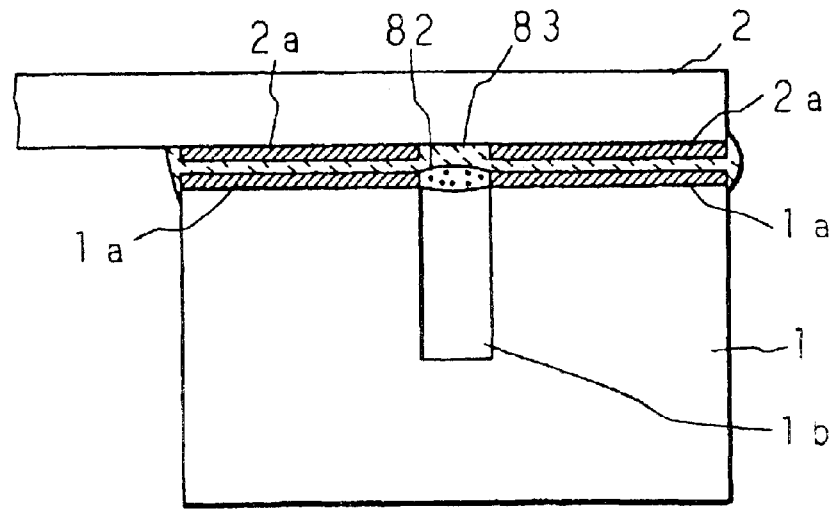

FIGS. 33A through 33C are cross sectional views showing a process of fabricating an acceleration sensor according to the thirteenth embodiment. A material 81 produced by dissolving a powder in a volatile solvent such as alcohol is rubbed into the groove 1b formed in the vibrator 1, with a spatula or squeegee (FIG. 33A). As the powder, it is possible to use a material having a relatively large particle diameter, such as Teflon powder and glass micro-balloon. Thereafter, by drying the material 81 to evaporate the solvent (such as alcohol), a powder layer 82 is formed (FIG. 33B). Then, in order to electrically connect the electrodes 1a and wiring patterns 2a, the vibrator 1 and weight section 2 are bonded together with an adhesive 83 such an anisotropic conductive adhesive (FIG. 33C).

Since the powder layer 82 is formed on the top side (the weight section 2 side) of the groove 1b, it functions as a cap and prevents the adhesive 83 from running into the groove 1b, thereby maintaining the inside of the groove 1b in a hollow state. Accordingly, the sliding vibration of the vibrator 1 is not limited, and a lowering of the detection performance does not occur.

(Fourteenth Embodiment)

Figure 34:
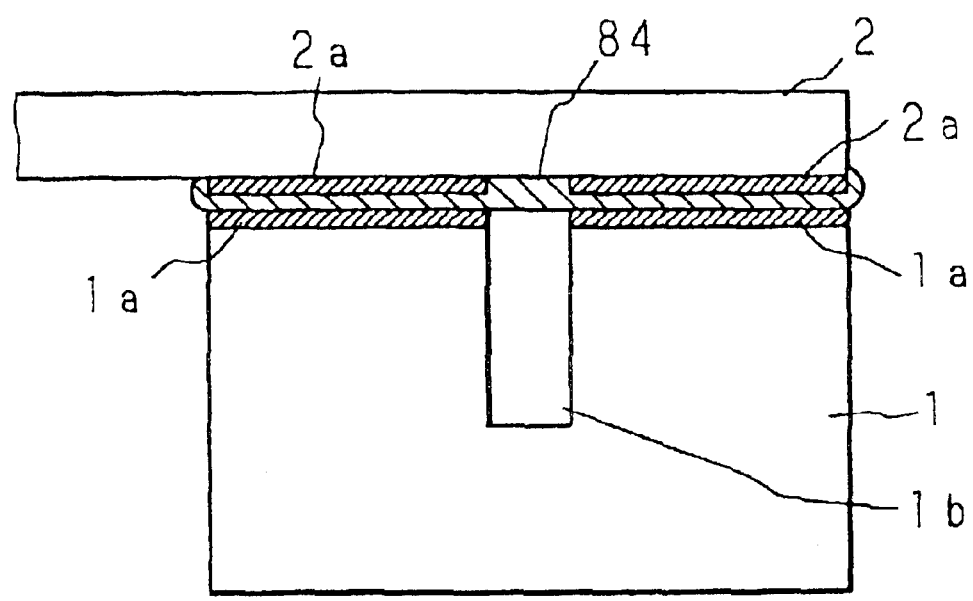
FIG. 34 is a cross sectional view showing the bonded state of a vibrator and a weight section of an acceleration sensor according to the fourteenth embodiment.

FIG. 34 is a cross sectional view showing the bonded state of the vibrator and weight section of an acceleration sensor according to the fourteenth embodiment. In order to electrically connect the electrodes 1a and wiring patterns 2a, the vibrator 1 and weight section 2 are bonded together with an anisotropic conductive film 84. Thus, since no adhesive is used, an adhesive can never run into the groove 1b, the inside of the groove 1b is maintained in a hollow state, the sliding vibration of the vibrator 1 is not limited, and a lowering of the detection performance does not occur. Moreover, since the anisotropic conductive film 84 is used, it is possible to exhibit conductivity only in a thickness direction and ensure high insulation between the electrodes 1a, 1a.

(Fifteenth Embodiment)

Figure 35A:
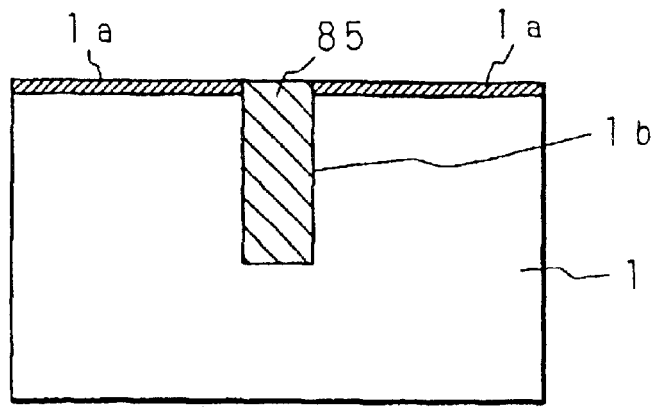
FIGS. 35A through 35C are cross sectional views showing a process of fabricating an acceleration sensor according to the fifteenth embodiment.
Figure 35B:
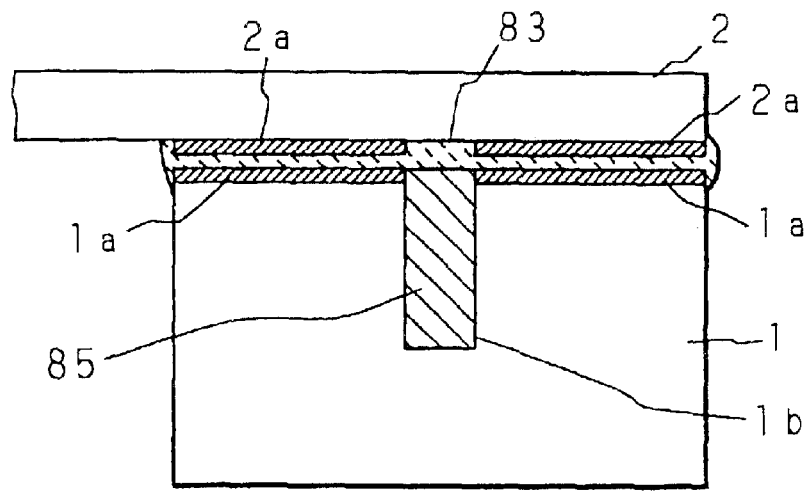
Figure 35C:
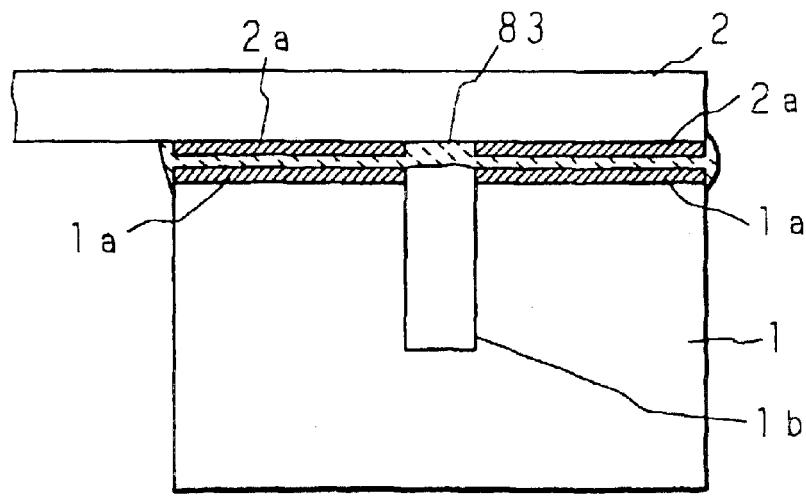

FIGS. 35A through 35C are cross sectional views showing a process of fabricating an acceleration sensor according to the fifteenth embodiment. A dummy structural body 85 is inserted into the groove 1b formed in the vibrator 1 (FIG. 35A). As the structural body 85, it is possible to use a plate material, various kinds of resist material, wax material and thermoplastic resin, such as Teflon, substantially identical with the groove 1b in shape. Next, in order to electrically connect the electrodes 1a and wiring patterns 2a, the vibrator 1 and weight section 2 are bonded together with the adhesive 83 such as an anisotropic conductive adhesive (FIG. 35B). Thereafter, the structural body 85 is removed (FIG. 35C).

In this example, it is also possible to prevent the adhesive 83 from running into the groove 1b and maintain the inside of the groove 1b in a hollow state. Therefore, the sliding vibration of the vibrator 1 is not limited, and a lowering of the detection performance does not occur.

(Sixteenth Embodiment)

Figure 36A:
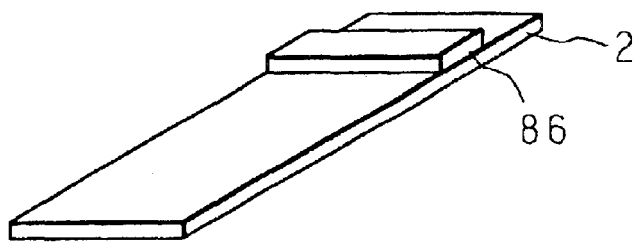
FIGS. 36A through 36D are perspective views and cross sectional views showing a process of fabricating an acceleration sensor according to the sixteenth embodiment.
Figure 36B:
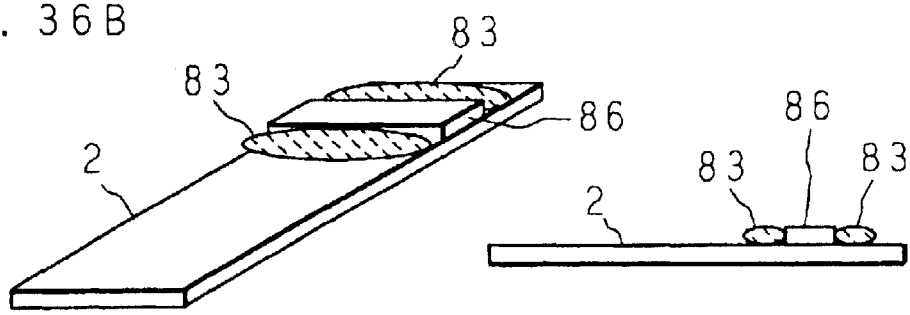
Figure 36C:
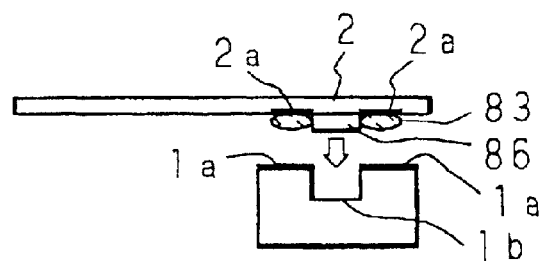
Figure 36D:
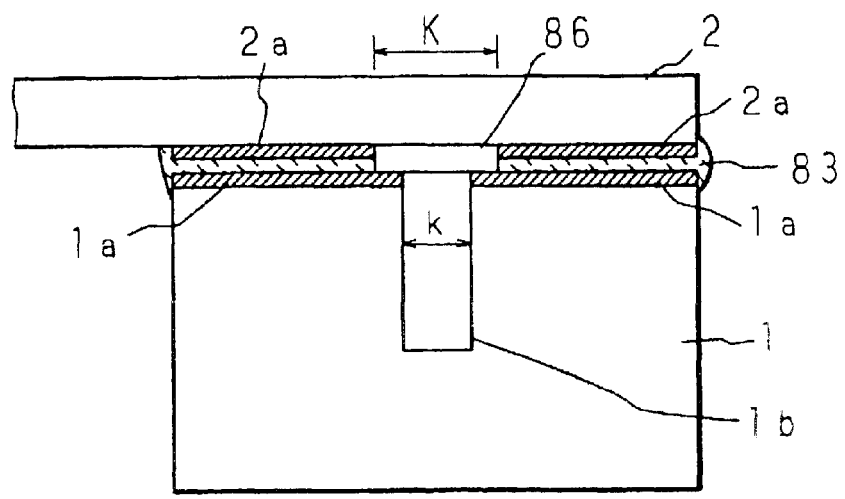

FIGS. 36A through 36D are perspective views and cross sectional views showing a process of fabricating an acceleration sensor according to the sixteenth embodiment. A protruding portion 86 having a width K substantially equal to or larger than a width k of the groove 1b is formed on a face of the weight section 2, to be connected to the vibrator 1, at a position corresponding to the groove 1b (FIG. 36A). As the protruding portion 86, if it comes into contact with the electrodes 1a, 1a, it is possible to use a structural body made from an insulating material such as ceramics, resins, or the like. If the protruding portion 86 does not come into contact with the electrodes 1a, 1a, a conductive adhesive, metal, etc. may be used. The adhesive 83, such as epoxy adhesive and anisotropic conductive adhesive, is applied to both sides of this protruding portion 86 (FIG. 36B). The weight section 2 is placed over the vibrator 1 in such a manner that the protruding portion 86 is positioned on the groove 1b (FIG. 36C), and the vibrator 1 and weight section 2 are bonded together (FIG. 36D) so as to electrically connect the electrodes 1a and wiring patterns 2a.

Since the protruding portion 86 is placed over the top side (the weight section 2 side) of the groove 1b, it functions as a cap, thereby preventing the adhesive 83 from running into the groove 1b and maintaining the inside of the groove 1b in a hollow state. Therefore, sliding vibration of the vibrator 1 is not limited, and a lowering of the detection performance does not occur.

Figure 37A:
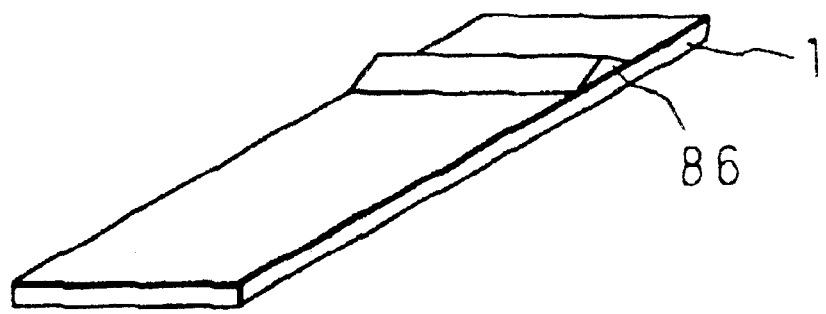
FIGS. 37A and 37B are perspective views showing other examples of the sixteenth embodiment.
Figure 37B:
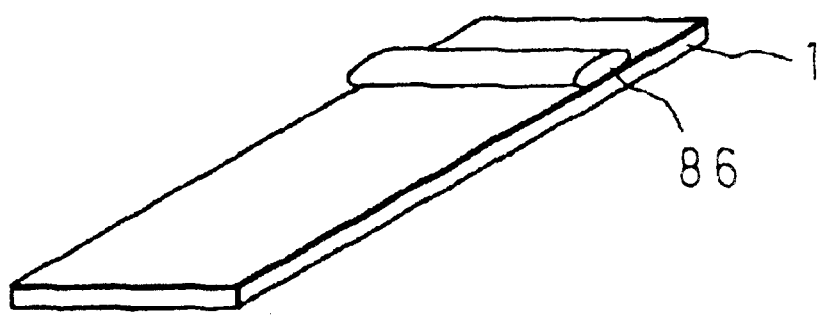

Here, although the protruding portion 86 has an angular shape, it may have other shape. FIGS. 37A and 37B are perspective views showing other examples of the sixteenth embodiment. FIG. 37A shows an example in which a tapered protruding portion 86 is formed, while FIG. 37B illustrates an example in which a rounded protruding portion 86 is formed.

Here, although the formation of the protruding portion 86 on the weight section 2 has been explained, of course, it is possible to fabricate an acceleration sensor in the exactly the same manner by using a weight section 2 whose portion facing the groove 1b is made a protruding portion in advance.

(Seventeenth Embodiment)

Figure 38:
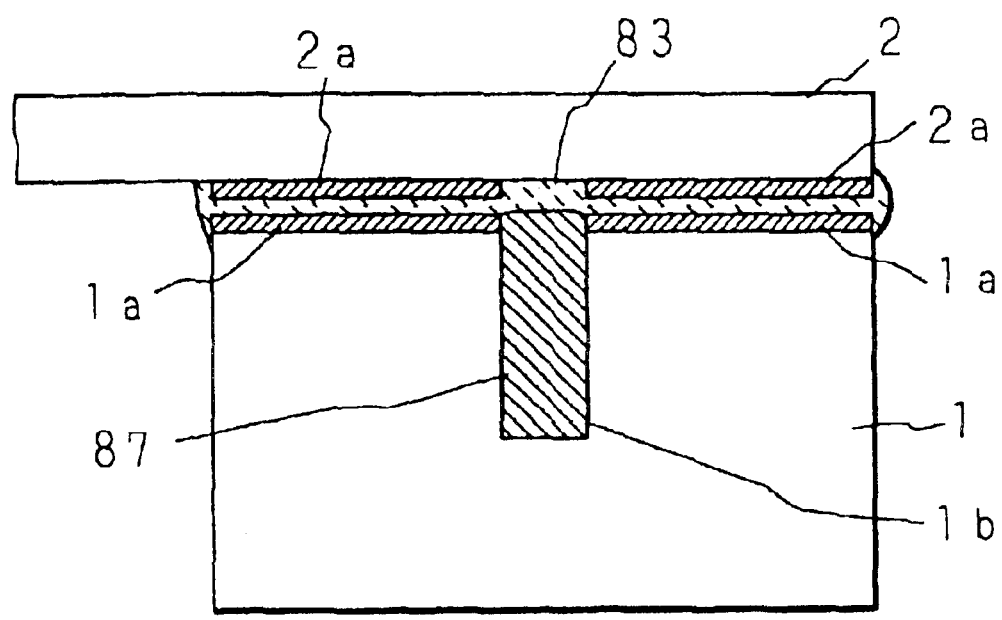
FIG. 38 is a cross sectional view showing the bonded state of a vibrator and a weight section of an acceleration sensor according to the seventeenth embodiment.

FIG. 38 is a cross sectional view showing the bonded state of the vibrator and weight section of an acceleration sensor according to the seventeenth embodiment. The vibrator 1 and weight section 2 are bonded together with the adhesive 83 such as an anisotropic conductive adhesive in such a manner that the electrodes 1a and wiring patterns 2a are electrically connected, and the groove 1b is filled with a filler 87 such as a silicone resin whose Young's modulus is smaller than that of the adhesive 83.

If the inside of the groove 1b is in a hollow state, it is certain that the sliding vibration is not limited. However, it is not always easy to perform the process of connecting the vibrator 1 and weight section 2 with the adhesive 83 while maintaining this hollow state. Even when the groove 1b is filled with some filler, if the hardness of this filler is low, the sliding vibration is hardly limited. Therefore, the groove 1b is filled with the filler 87 whose Young's modulus is smaller than that of the adhesive 83 connecting the vibrator 1 and weight section 2. In such a case, the occurrence of deterioration of the detection performance can be minimized, and the process of connecting the vibrator 1 and weight section 2 with the adhesive 83 is easily performed because the groove 1b is filled with the filler 87.

(Eighteenth Embodiment)

Figure 39A:
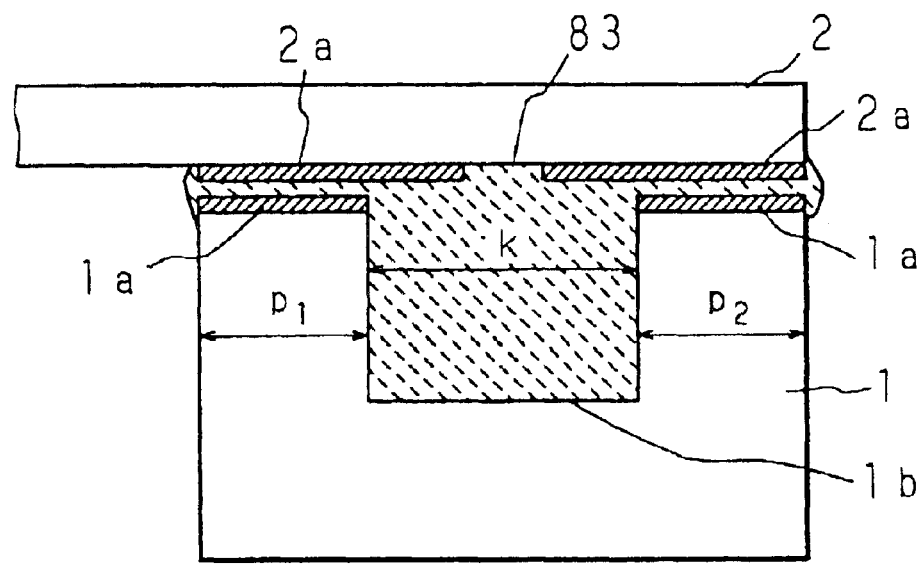
FIGS. 39A and 39B are cross sectional views showing the bonded state of a vibrator and a weight section of an acceleration sensor according to the eighteenth embodiment.
Figure 39B:
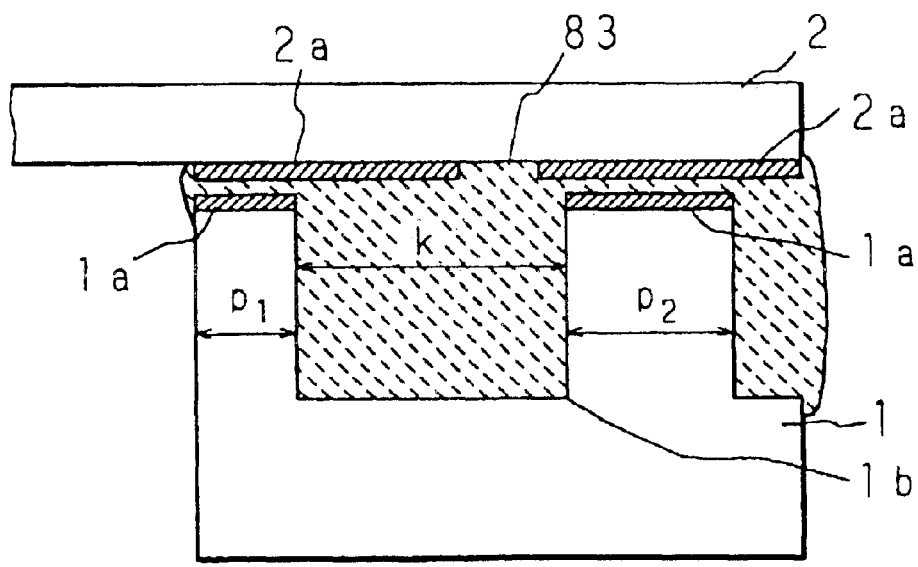

FIGS. 39A and 39B are cross sectional views showing the bonded state of the vibrator and weight section of an acceleration sensor according to the eighteenth embodiment. The eighteenth embodiment is an acceleration sensor suitable for use in such an environment subject to strong shock. The width k of the groove 1b of the vibrator 1 is made wider than the widths $p_1$ and $p_2$ of the respective portions where the electrodes 1a, 1a are formed. Accordingly, since the bonded area between the vibrator 1 and weight section 2 in addition to the bonded area between the electrodes 1a and wiring patterns 2a is significantly increased, it is possible to improve the resistance to shock. Additionally, in this example, the position of the groove 1b and the widths of the respective portions may be made symmetrical (FIG. 39A) or asymmetrical (FIG. 39B).

(Nineteenth Embodiment)

Figure 40A:
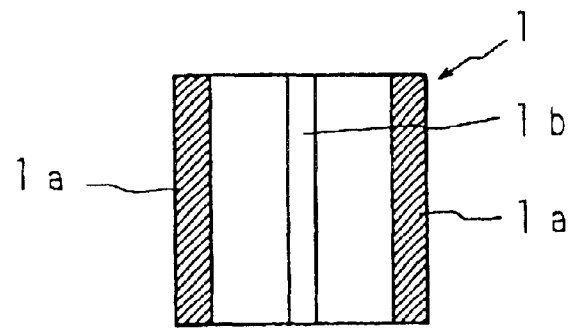
FIG. 40A is a plan view of the weight-section side of a vibrator of an acceleration sensor according to the nineteenth embodiment.
Figure 40B:
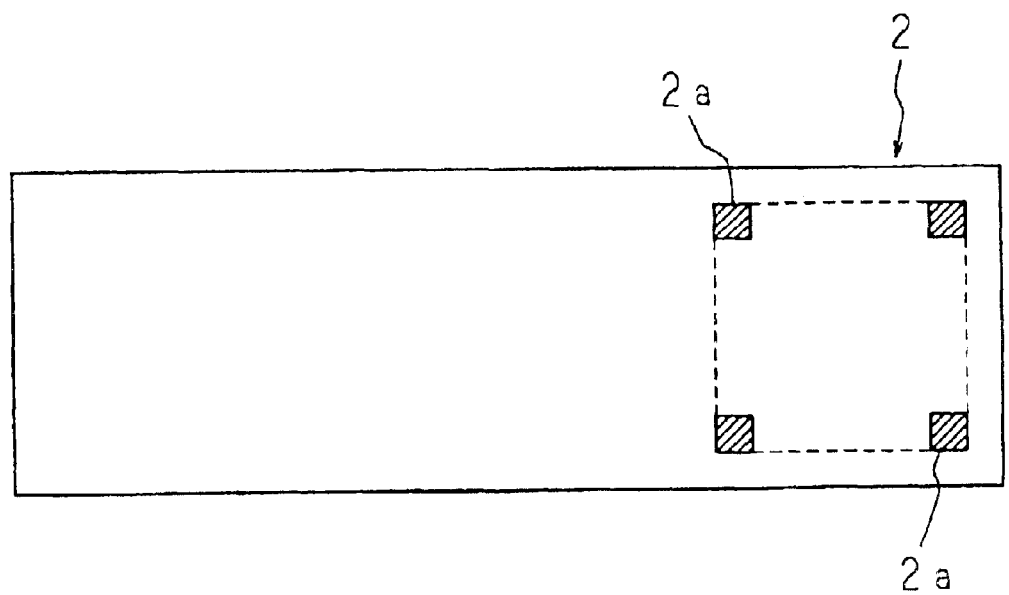
FIG. 40B is a plan view of the vibrator side of a weight section of the acceleration sensor according to the nineteenth embodiment.

FIGS. 40A and 40B are plan views of the weight section 2 side of the vibrator 1 and the vibrator 1 side of the weight section 2 of an acceleration sensor according to the nineteenth embodiment. An area enclosed by the broken line in FIG. 40B is a region where the vibrator 1 is to be bonded. The area of the electrodes 1a of the vibrator 1 and the wiring patterns 2a of the weight section 2 is smaller than the bonded area between the vibrator 1 and weight section 2.

For instance, considering the problem of oxidation or corrosion, it is supposed to use gold as the material of the electrode 1a and wiring pattern 2a. In this case, there is a problem that the adhesive used for connecting the vibrator 1 and weight section 2 does not easily stick to gold, which would cause a lowering of the bonding strength, an increase in the transmission loss of energy which results in deterioration of the detection performance, and a lowering of the resistance to shock. Therefore, in the nineteenth embodiment, the area of the electrodes 1a and wiring patterns 2a is made smaller than the bonded area so as to obtain a sufficient bonding strength in other region. Accordingly, even when the electrodes 1a and wiring patterns 2a do not easily stick to the adhesive, it is possible to increase the bonding strength between the vibrator 1 and weight section 2.

Figure 41A:
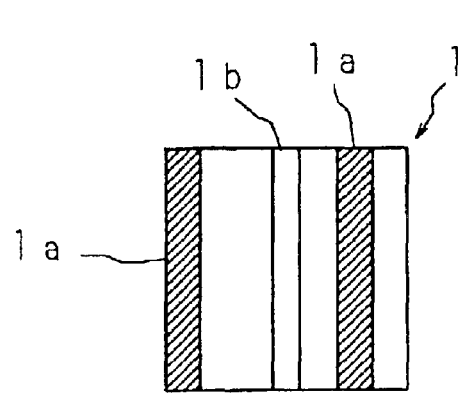
FIGS. 41A and 41B are plan views of the weight-section side of the vibrator of the acceleration sensor according to the nineteenth embodiment.
Figure 41B:
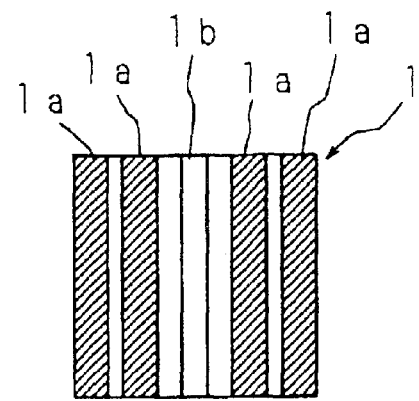
Figure 41C:
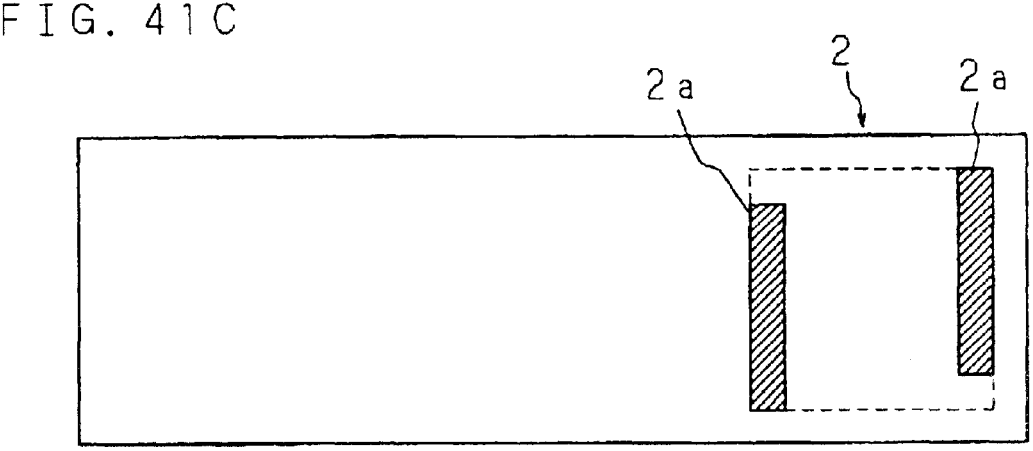
FIGS. 41C and 41D are plan views of the vibrator side of the weight section of the acceleration sensor according to the nineteenth embodiment.
Figure 41D:
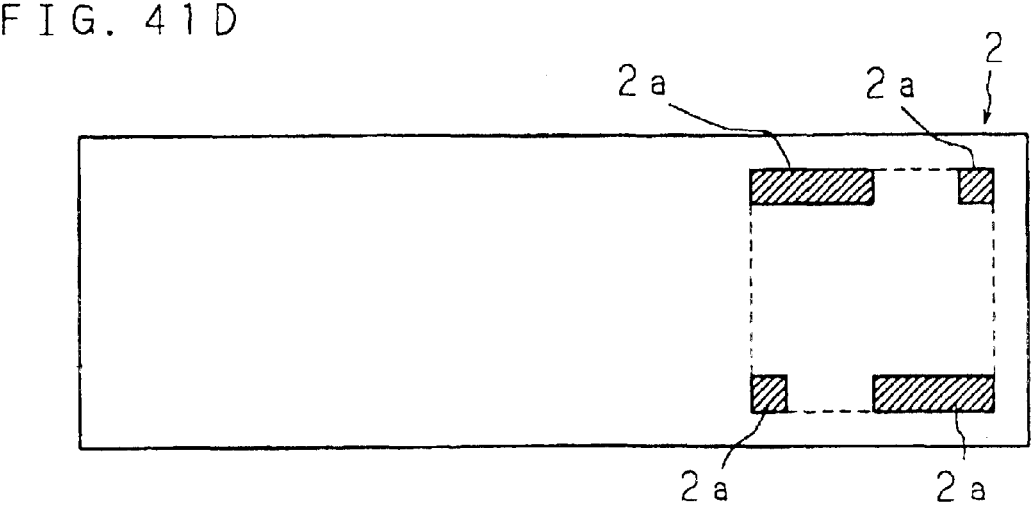

Further, in the case where the area of the electrodes 1a and wiring patterns 2a is smaller than the bonded area, the electrodes 1a and wiring patterns 2a may have an arbitrary shape. FIGS. 41A and 41B are plan views of the weight section 2 side of the vibrator 1 of the acceleration sensor according to the nineteenth embodiment, and FIGS. 41C and 41D are plan views of the vibrator 1 side of the weight section 2 of the same. In order to increase the degree of adhesion between the vibrator 1 and weight section 2, it is more preferable to arrange the electrodes 1a and wiring patterns 2a so that they are symmetrical about a line, symmetrical about a point and supported at three points.

(Twentieth Embodiment)

When the free-end side portion of the weight section 2 is made thicker (the fifth embodiment) or when the free-end side portion is formed from a high-dense material (the sixth embodiment) so as to improve the detection sensitivity, the supported-end side portion of the weight section 2 to be bonded to the vibrator 1 is made of a thin or low-dense material. Therefore, there is a problem that the weight portion 2 may be twisted when an acceleration is applied and crosstalk may increase. Besides, since the supported-end side portion is thinner, the bonded area between the free-end side portion and supported-end side portion of the weight section 2 is smaller, causing a problem that the resistance to shock is low. The twentieth embodiment was devised to solve such problems.

(Twentieth Embodiment: First Example)

Figure 42A:
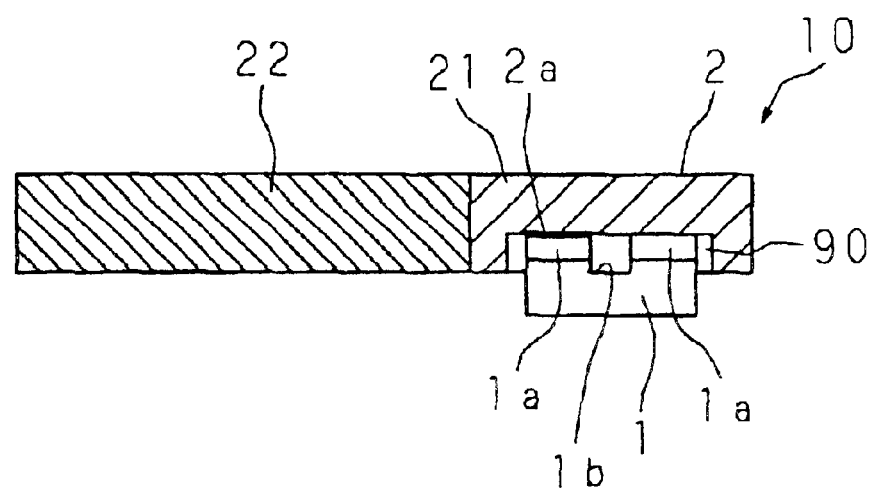
FIG. 42A is a cross sectional view showing the structure of an acceleration sensor according to the first example of the twentieth embodiment.
Figure 42B:
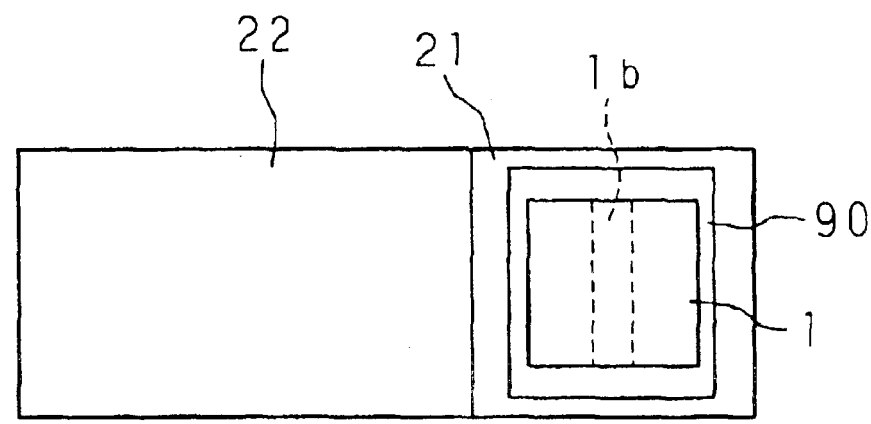
FIG. 42B is a bottom view showing the structure of the acceleration sensor according to the first example of the twentieth embodiment.

FIGS. 42A and 42B are the cross sectional view and bottom view showing the structure of an acceleration sensor 10 according to the first example of the twentieth embodiment. The weight section 2 of this acceleration sensor 10 is constructed by bonding a first weight 21 on the supported-end side made from alumina to a second weight 22 on the free-end side made from tungsten. A cavity 90 is formed on the lower side of the first weight 21 on the supported-end side. The depth of this cavity 90 is substantially the same as the depth of the division that divides the detection portion of the vibrator 1, one of the electrodes 1a of the vibrator 1 and the wiring pattern 2a of the weight section 2 formed on the cavity 90 are bonded together, and the upper side of the vibrator 1 is partly stored in the cavity 90.

As described above, since the cavity 90 is provided on the supported-end side of the weight section 2 to be bonded to the vibrator 1, even when the supported-end side portion is made thinner, it is reinforced by the wall of the cavity 90. Therefore, even when an acceleration is applied, the weight section 2 is not twisted, thereby enabling a reduction of crosstalk and accurate detection of the acceleration. Moreover, even when the thickness of the portion of the weight section 2 to be bonded to the vibrator 1 is made thinner, since the bonded area between the first weight 21 and second weight 22 of the weight section 2 can be increased, it is possible to improve the resistance to shock. Furthermore, since the free-end side portion of the weight 2 can be made thicker than the supported-end side portion thereof without increasing the height of the acceleration sensor 10, it is possible to improve the detection sensitivity without increasing the size of the structure.

(Twentieth Embodiment: Second Example)

Figure 43:
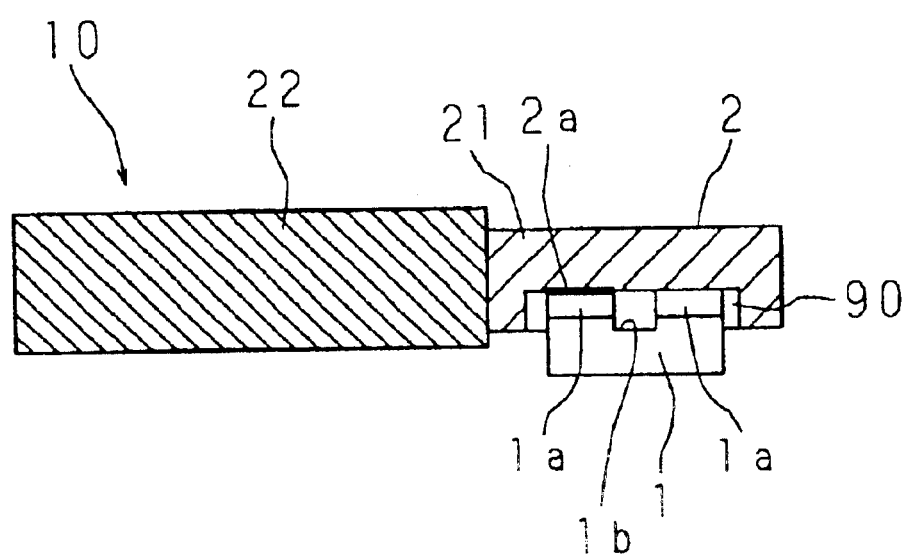
FIG. 43 is a cross sectional view showing the structure of an acceleration sensor according to the second example of the twentieth embodiment.

FIG. 43 is a cross sectional view showing the structure of an acceleration sensor 10 according to the second example of the twentieth embodiment. The second example illustrate a case where the second weight 22 on the free-end side is made thicker than the first weight 21 on the supported-end side so as to further increase the angular moment of the weight section 2 compared with the first example and to further improve the detection sensitivity.

Next, the following description will explain an embodiment of an acceleration sensor device constructed by storing an acceleration sensor 10 of the present invention as described above in a package. The acceleration sensor device packaging the acceleration sensor 10 therein has such an advantage that it is more easily handled, for example, more easily mounted on a specimen, compared with a unit acceleration sensor.

For the acceleration sensor, whether it is certainly fastened to the specimen is one of the important elements to improve the detection sensitivity. When an acceleration sensor using a deflection of a piezoelectric single crystal explained as a prior art example is stored in a package, even if the end of the vibrator is firmly fastened, characteristic deterioration does not occur. However, in the case of the acceleration sensor 10 of the present invention, since the sliding vibration of the vibrator 1 resulting from the angular moment of the weight portion 2 is used instead of deflection, if the vibrator is strongly fastened or the fastened position or fastened length is set inappropriately, there is a possibility that the angular moment is limited and characteristic deterioration occurs.

Therefore, an acceleration sensor device of the present invention explained below is arranged so as to efficiently exert sliding vibration of the vibrator 1 due to the angular moment of the weight section 2 and prevent characteristic deterioration even when the acceleration sensor 10 is stored in a package. Moreover, the easiness of the packaging process is one of the important elements for such an acceleration sensor device. In the acceleration sensor device of the present invention explained below, the acceleration sensor is simply packaged.

In the acceleration sensor device of the present invention, wiring patterns are formed on the weight section 2 connected to the vibrator 1, and on a package including a base section and a cap section. The weight section 2, or the weight section 2 and vibrator 1 is sandwiched by the package. Furthermore, the sandwiched length of the weight section 2 or vibrator 1 by the package is optimized. Therefore, it is possible to prevent characteristic deterioration of the stored acceleration sensor and to facilitate the packaging process.

(Twenty First Embodiment)

Figure 44:
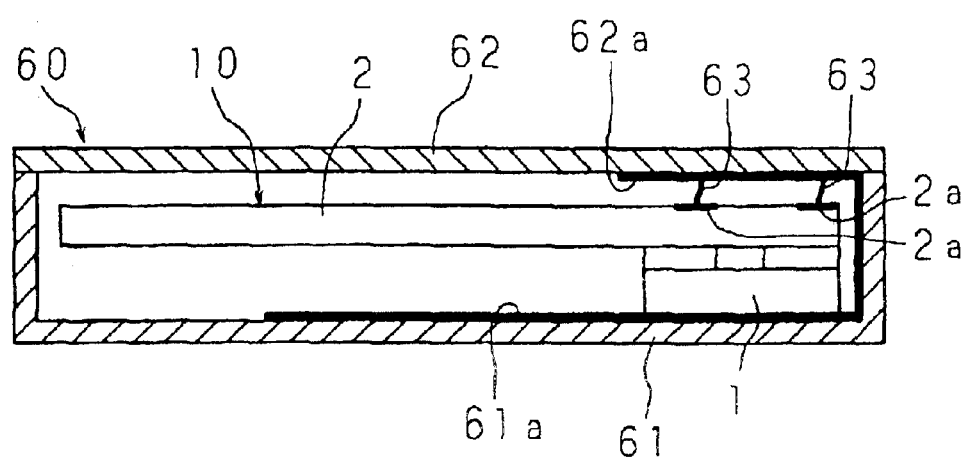
FIG. 44 is a cross sectional view showing the structure of an acceleration sensor device according to the twenty first embodiment.

FIG. 44 is a cross sectional view showing the structure of an acceleration sensor device according to the twenty first embodiment of the present invention. For instance, the acceleration sensor 10 explained in the first embodiment is stored in a ceramic package 60. The package 60 includes a ceramic base section 61 having a cross section substantially in the shape of a square bracket and a ceramic cap section 62 in the shape of a flat plate provided to cover the base section 61. The base section 61 and cap section 62 are provided with wiring patterns 61a and 62a, respectively, and the wiring patterns 2a, 2a of the weight section 2 and the wiring pattern 62a of the cap section 62 are connected, for example, with wires 63. The output voltages from the electrodes 1a, 1a are drawn to an external differential amplifier (not shown) through the wiring patterns 2a, 2a of the weight section 2, the wiring pattern 62a of the cap section 62 and the wiring pattern 61a of the base section 61.

(Twenty Second Embodiment)

Figure 45:
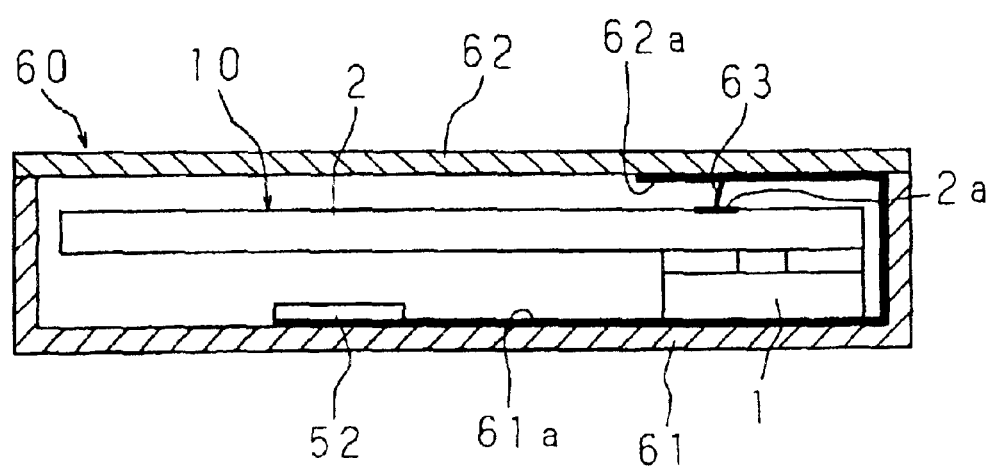
FIG. 45 is a cross sectional view showing the structure of an acceleration sensor device according to the twenty second embodiment.

FIG. 45 is a cross sectional view showing the structure of an acceleration sensor device according to the twenty second embodiment of the present invention. For instance, the single-output type acceleration sensor 10 explained in the tenth embodiment is stored in the same package 60 as in the twenty first embodiment. Further, a preamplifier 52 is stored in the package 60 in such a manner that the preamplifier 52 is installed on the base section 61. The wiring pattern 2a of the weight section 2 and the wiring pattern 62a of the cap section 62 are connected, for example, by a wire 63. The output voltage from the electrode 1a on the free-end side is input to the preamplifier 52 through the wiring pattern 2a of the weight section 2, the wiring pattern 62a of the cap section 62 and the wiring pattern 61a of the base section 61, and the resulting amplified signal is input to an external signal processing circuit (not shown).

(Twenty Third Embodiment)

Figure 46A:
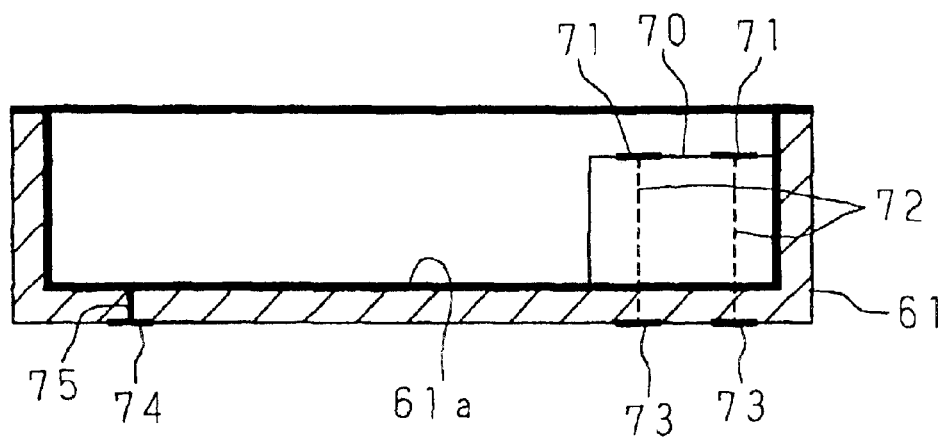
FIG. 46A is a cross sectional view of a base section of a package of an acceleration sensor device according to the twenty third embodiment.
Figure 46B:
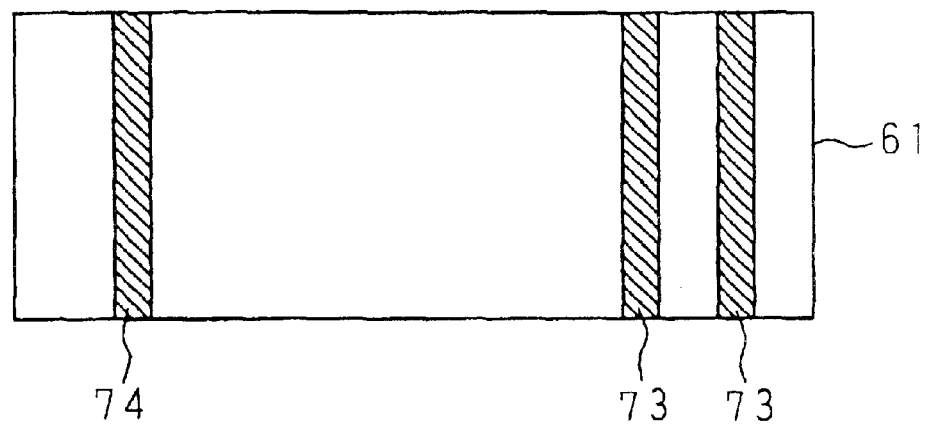
FIG. 46B is a bottom view of the base section of the package of the acceleration sensor device according to the twenty third embodiment.
Figure 47A:
FIG. 47A is a cross sectional view of a cap section of the package of the acceleration sensor device according to the twenty third embodiment.
Figure 47B:
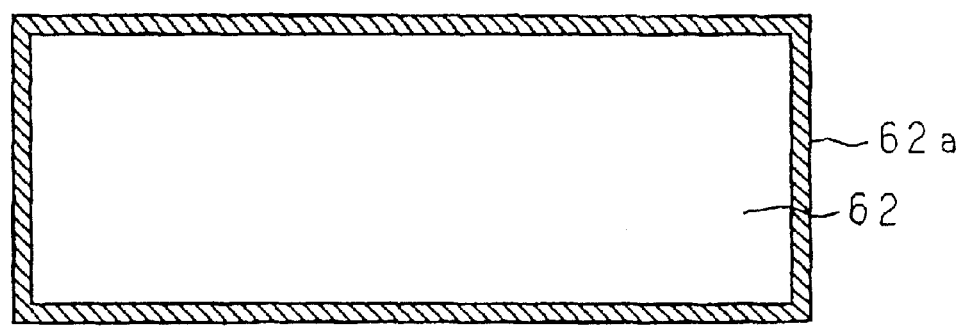
FIG. 47B is a bottom view of the cap section of the package of the acceleration sensor device according to the twenty third embodiment.

FIGS. 46A and 46B are the cross sectional view and bottom view of the ceramic base section 61, with a cross section substantially in the shape of a square bracket, of the package 60 of an acceleration sensor device according to the twenty third embodiment of the present invention, and FIGS. 47A and 47B are the cross sectional view and bottom view of the ceramic cap section 62 in the shape of a flat plate of the same package 60. In the cross sectional view of FIG. 46A, a signal detection section 70 provided in the base section 61 is illustrated.

Electrodes 71, 71 of the signal detection section 70 are connected via through-holes 72, 72 to electrodes 73, 73 for drawing signals out of the package 60, formed on the lower face of the base section 61. Moreover, a wiring pattern 61a formed on the inner face of the base section 61 and an electrode 74 for connection to the ground, formed on the lower face of the base section 61, are connected via a through-hole 75. The cap 62 is provided with a wiring pattern 62a which forms a conducting path over the entire top face, and the wiring pattern 62a is bent to cover a certain region on the rear face of the wiring pattern 62a so as to increase the shielding effect. In the example shown in FIGS. 46A and 46B, while the entire inner face of the base section 61 is shielded, the entire outer face thereof may be shielded. Moreover, the base section 61 may be formed in a layered structure, and a signal line and ground line may be arranged between the respective layers.

Figure 48:
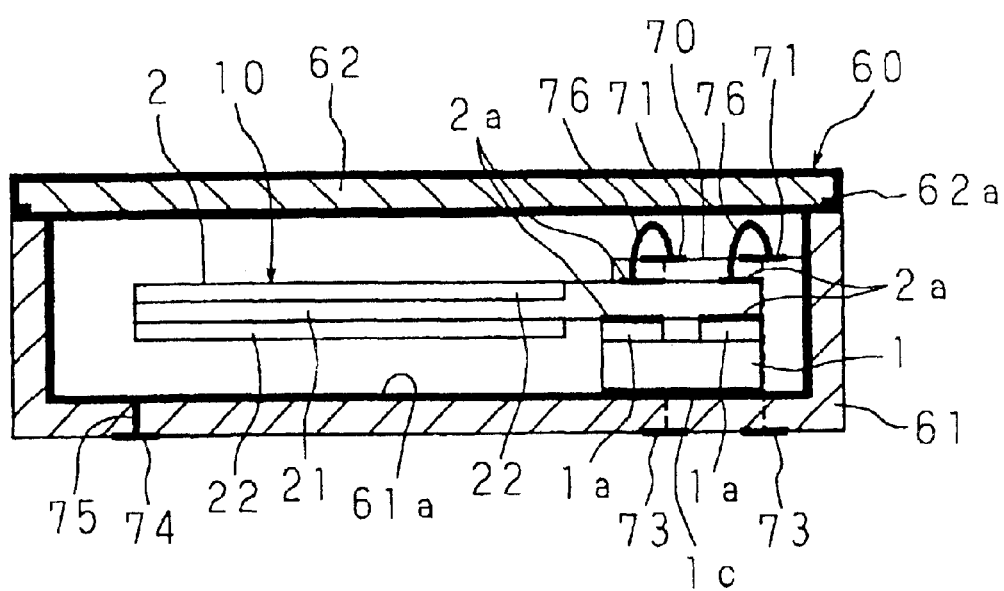
FIG. 48 is a cross sectional view showing the structure of the acceleration sensor device according to the twenty third embodiment.

FIG. 48 is a cross sectional view showing the structure of an acceleration sensor device according to the twenty third embodiment of the present invention. For instance, an acceleration sensor 10 as explained in the second example of the eleventh embodiment is stored in the package 60 composed of the base section 61 and cap section 62 shown in FIGS. 46A, 46B and FIGS. 47A and 47B, respectively. The wiring patterns 2a, 2a of the weight section 2 and the electrodes 71, 71 of the signal detection section 70 are bonded together by connecting members 76, 76 such as thermo-compression ribbon bonding, ultrasonic bonding and FPC. An electrode 1c for connection to the ground, formed on the bottom face of the vibrator 1, and the wiring pattern 61a of the base section 61 are bonded together with a conductive adhesive, cream of solder, bump, etc. Further, the wiring pattern 61a of the base section 61 and the wiring pattern 62a of the cap section 62 are connected.

According to the twenty third embodiment as described above, it is possible to package an acceleration sensor by a simple process, readily assemble an acceleration sensor device, and reduce the cost.

Further, it is possible to construct the acceleration sensor device so that the orientation of the vibrator 1 is opposite to that shown in FIG. 48, i.e., the electrode 74 for connection to the ground and the weight section 2 are connected and the signal detection section 70 and the package 60 are connected. In this case, however, it is necessary to join the vibrator 1 and package 60 so as to exert sliding vibration of the vibrator 1.

(Twenty Fourth Embodiment: First Example and Second Example)

Figure 49:
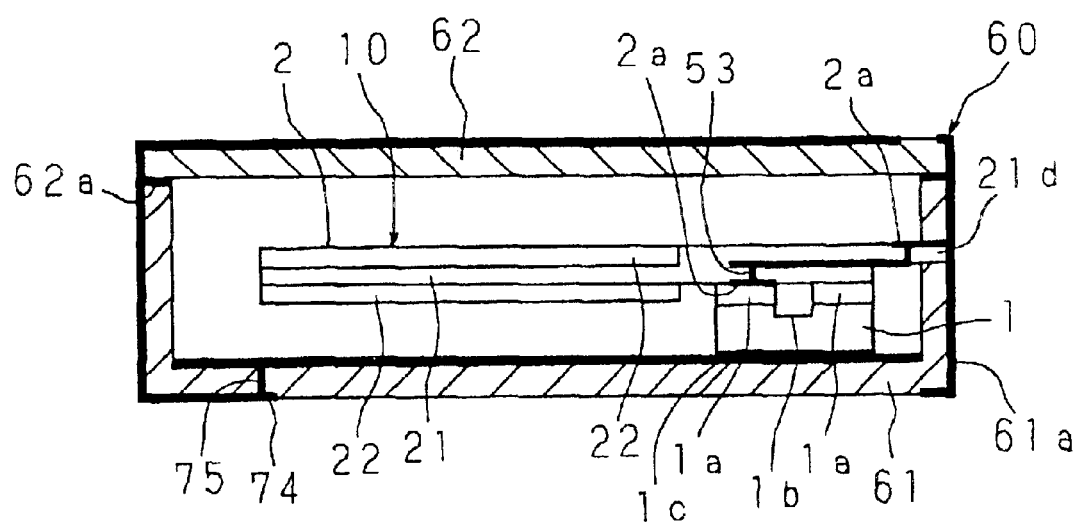
FIG. 49 is a cross sectional view showing the structure of an acceleration sensor device according to the first example of the twenty fourth embodiment.

FIG. 49 is a cross sectional view showing the structure of an acceleration sensor device according to the first example of the twenty fourth embodiment of the present invention. For instance, stored in the package 60 is an acceleration sensor 10 having the characteristics of the second embodiment, the sixth or eleventh embodiment, the tenth embodiment and the twelfth embodiment all together, i.e., an acceleration sensor 10 in which the vibrator 1 is divided by the formation of the groove 1b, the weight section 2 has a three-layer structure consisting of the first weight 21 and the second weights 22, 22, detection is made based on a single output from only one of the electrodes 1a, and the wiring patterns 2a, 2a on the front and rear faces are connected with the through-hole 53.

Moreover, the first weight 21 is further extended from the top of the vibrator 1, and the extended end portion 21d is sandwiched by the package 60. Besides, the wiring pattern 2a formed on the upper face of the extended end portion 21d and the wiring pattern 61a for signal detection of the base section 61 of the package 60 are bonded together with a conductive adhesive. The package 60 has a structure where the wiring pattern 61a for shielding is formed on the inner front face of the package 60.

Figure 50:
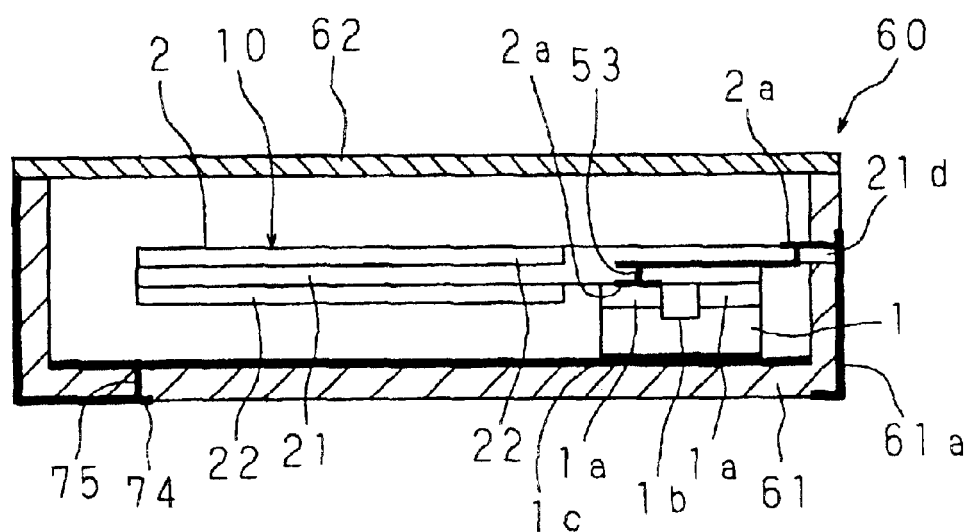
FIG. 50 is a cross sectional view showing the structure of an acceleration sensor device according to the second example of the twenty fourth embodiment.

FIG. 50 is a cross sectional view showing the structure of an acceleration sensor device according to the second example of the twenty fourth embodiment of the present invention. In the second example, a metal is used as the material of the cap section 62. Other configurations are the same as those of the first example shown in FIG. 49.

Since an applied acceleration acts on the center of gravity of the weight section 2, in the twenty fourth embodiment, a part of the weight section 2, located on one side of the position of the vibrator 1 opposite to the other side including the position of the center of gravity, is sandwiched by the package 60 so as to prevent deterioration of the detection characteristics. The weight section 2 rotates about the support point on the vibrator 1. Therefore, like the twenty fourth embodiment, even when a portion of the weight section 2, located on one side of the position of the vibrator 1 opposite to the other side including the position of the center of gravity, is sandwiched by the package 60, the angular moment of the weight section 2 is not limited and deterioration of the detection characteristics does not occur.

Figure 51A:
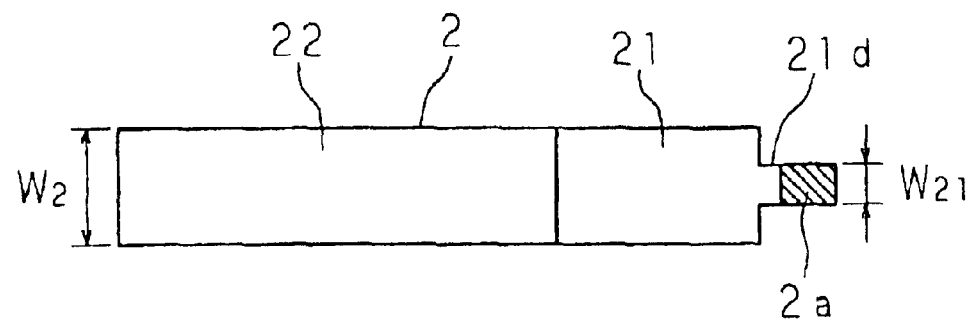
FIG. 51A is a plan view of a weight section of an acceleration sensor device according to the twenty fourth embodiment.
Figure 51B:
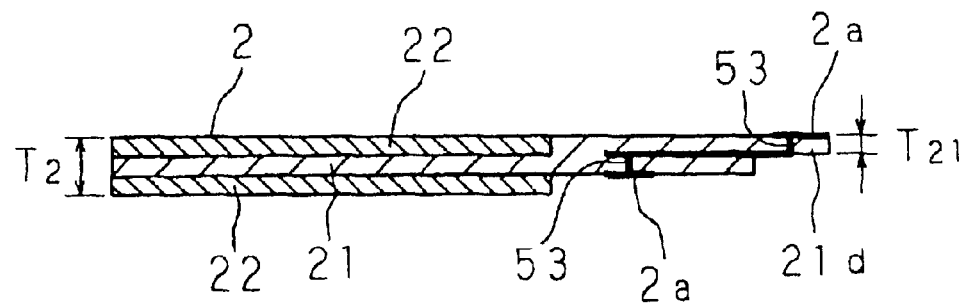
FIG. 51B is a cross sectional view of the weight section of the acceleration sensor device according to the twenty fourth embodiment.

FIGS. 51A and 51B are the plan view and cross sectional view of the weight section 2 of the acceleration sensor device according to the twenty fourth embodiment. In these figures, $W_2$ and $T_2$ represent the entire width and entire thickness of the weight section 2, respectively. Besides, $W_{21}$ and $T_{21}$ represent the width and thickness of the sandwiched extended end portion 21d, respectively. The present inventors found that, in the twenty fourth embodiment in which a part of the weight section 2 is sandwiched by the package 60, the ratio of the size (width $W_{21}$, thickness $T_{21}$) of the sandwiched extended end portion 21d to the entire size (width $W_2$, thickness $T_2$) of the weight section 2 greatly affects the detection characteristics.

Figure 52:
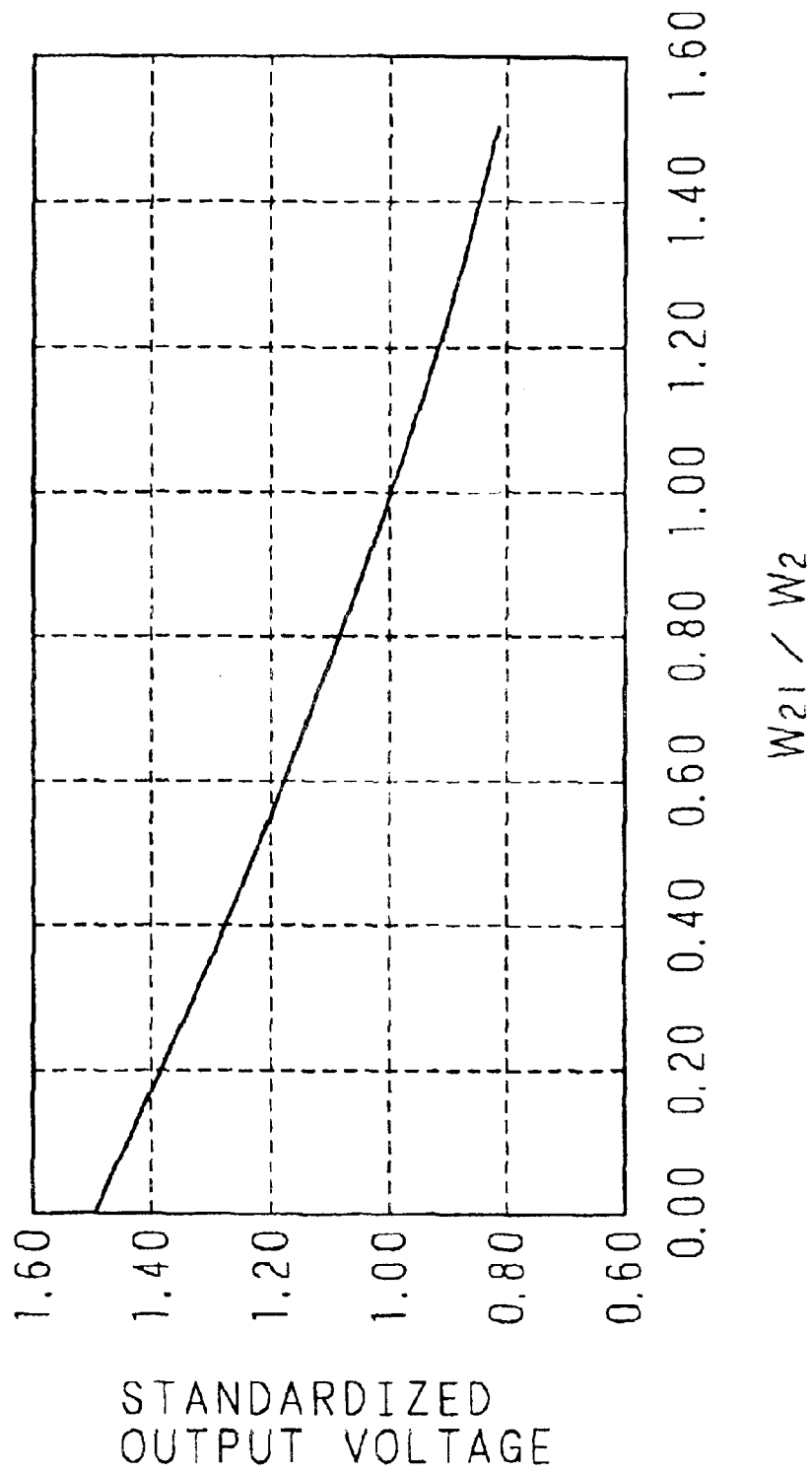
FIG. 52 is a graph showing the relationship between the standardized output voltage and the ratio $W_{21}/W_2$ of the width $W_{21}$ of an extended end portion to the entire width $W_2$ of the weight section.

FIG. 52 is a graph showing the relationship between the ratio $W_{21}/W_2$ of the width $W_2$, of the extended end portion 21d to the entire width $W_2$ of the weight section 2 (the horizontal axis) and the standardized output voltage (the vertical axis). It will be understood from the result shown in FIG. 52 that as the ratio $W_{21}/W_2$ increases, i.e., as the width $W_{21}$ of the sandwiched extended end portion 21d becomes wider, the output voltage is lowered. In particular, when the ratio $W_{21}/W_2$ is not less than 1, since the lowering of the output voltage is noticeable, it is preferable to make the width $W_{21}$ of the extended end portion 21d narrower than the entire width $W_2$ of the weight section 2 so as to prevent the deterioration of the detection characteristics.

Additionally, it was verified from the result of a simulation that the thickness $T_{21}$ of the extended end portion 21d and the entire thickness $T_2$ of the weight section 2 have a relationship similar to the above-described relationship about the width, and thus it is preferable to make the thickness $T_{21}$ of the extended end portion 21d thinner than the entire thickness $T_2$ of the weight section 2 so as to prevent the deterioration of the detection characteristics.

According to the twenty fourth embodiment, by making the width of the portion sandwiched by the package 60 narrower than the entire width of the weight section 2 and/or making the thickness of the sandwiched portion thinner than the entire thickness of the weight section 2, it is possible to achieve a structure which does not limit the angular moment of the weight section 2, thereby maintaining high detection characteristics.

(Twenty Fifth Embodiment)

Figure 53:
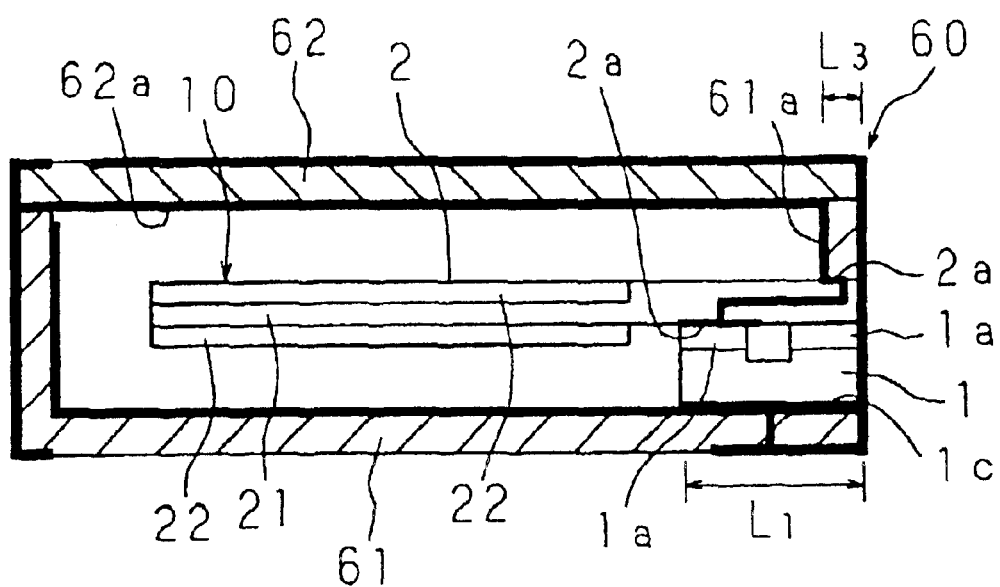
FIG. 53 is a cross sectional view showing the structure of an acceleration sensor device according to the twenty fifth embodiment.

FIG. 53 is a cross sectional view showing the structure of an acceleration sensor device according to the twenty fifth embodiment of the present invention. For instance, like the twenty fourth embodiment, stored in the package 60 is the acceleration sensor 10 having the characteristics of the second embodiment, the sixth or eleventh embodiment, the tenth embodiment and the twelfth embodiment all together. However, unlike the twenty fourth embodiment, the supported end of the first weight 21 and the supported end of the vibrator 1 are flush with each other, and the supported-end portion of the first weight 21 and the supported-end portion of the vibrator 1 are sandwiched by the package 60. The characteristic of the twenty fifth embodiment is that it can achieve a smaller size in comparison with the twenty fourth embodiment. In FIG. 53, $L_3$ represents the length of the sandwiched portion, and $L_1$ is the entire length of the vibrator 1.

Figure 54:
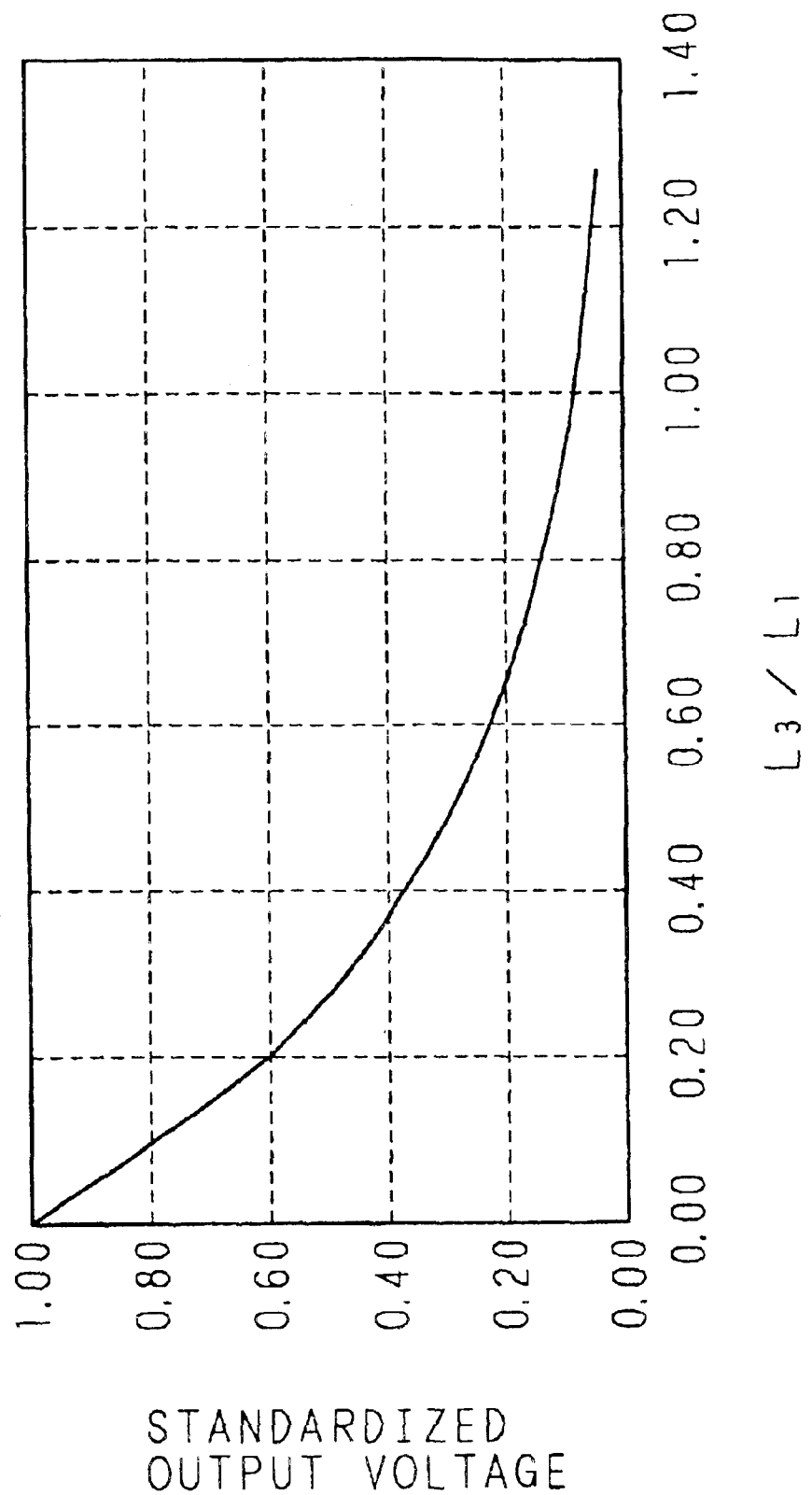
FIG. 54 is a graph showing the relationship between the standardized output voltage and the ratio $L_3/L_1$ of the length $L_3$ of a sandwiched portion to the entire length $L_1$ of the vibrator.

The present inventors found that, in the twenty fifth embodiment in which the vibrator 1 and weight section 2 are partly sandwiched by the package 60, the ratio of the length $L_3$ of the sandwiched portion to the entire length $L_1$ of the vibrator 1 greatly affects the detection characteristics. FIG. 54 is a graph showing the relationship between the ratio $L_3/L_1$ of the length $L_3$ of the sandwiched portion to the entire length $L_1$ of the vibrator 1 (the horizontal axis) and the standardized output voltage (the vertical axis).

It will be understood from the result shown in FIG. 54 that as the ratio $L_3/L_1$ increases, i.e., as the length $L_3$ of the sandwiched portion becomes longer, the output voltage is lowered. In particular, when the ratio $L_3/L_1$ is not less than 1, since the output voltage is extremely low, it is preferable to make the length $L_3$ of the sandwiched portion shorter than the entire length $L_1$ of the vibrator 1 so as to prevent the deterioration of the detection characteristics.

By the way, in the twenty fifth embodiment, as shown in FIG. 53, one of the divided electrodes 1a, which is located on the supported-end side and does not participate in the detection of a voltage, and the electrode 1c for connection to the ground formed on the bottom face of the vibrator 1 are made the same electric potential through the wiring pattern 61a of the base section 61. If the output voltage of an acceleration sensor device in which the electrode 1a of the detection portion and the electrode 1c for connection to the ground are not of the same electric potential is "1", the output voltage of the twenty fifth embodiment in which the electrodes 1a and 1c are of the same electric potential is "1.01". Hence, it will be understood that such a structure does not affect the detection characteristics at all. With a structure as illustrated in the twenty fifth embodiment, it is possible to simplify the wiring patterns in the weight section 2 and package 60 and to provide a more simple fabrication process.

(Twenty Sixth Embodiment: First Example and Second Example)

Figure 55:
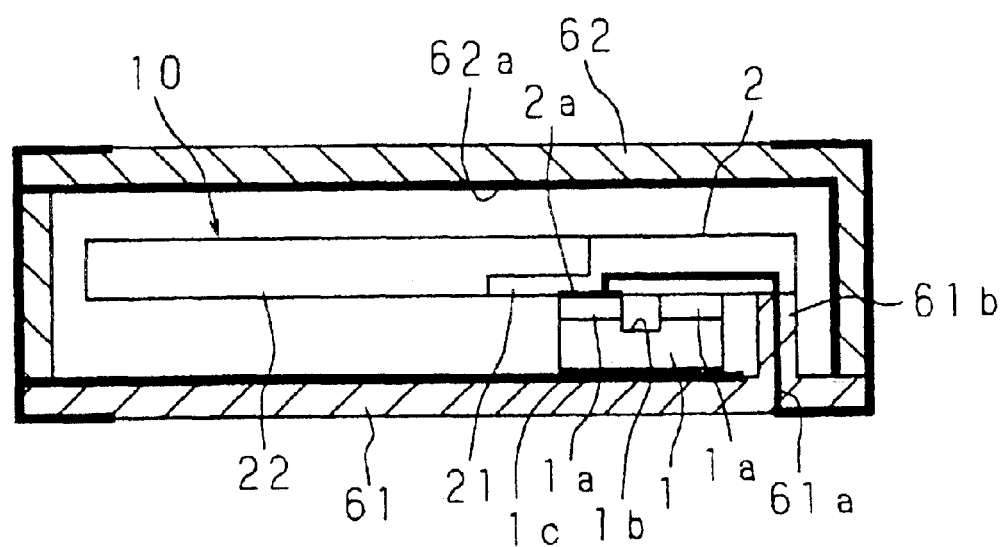
FIG. 55 is a cross sectional view showing the structure of an acceleration sensor device according to the first example of the twenty sixth embodiment.

FIG. 55 is a cross sectional view showing the structure of an acceleration sensor device according to the first example of the twenty sixth embodiment of the present invention. For instance, stored in a package 60 composed of a base section 61 in the shape of a flat plate and a cap section 62 having a cross section in the shape of a square bracket is an acceleration sensor 10 having the characteristics of the fourth example of the sixth embodiment and the tenth embodiment all together, i.e., an acceleration sensor 10 which has a weight section 2 constructed by engaging a first weight 21 on the supported-end side with a second weight 22 on the free-end side and performs single-output type detection using only the output from one of the electrodes 1a.

Moreover, the first weight 21 is further extended from the top of the vibrator 1. The base section 61 has a protruding portion 61b at a position corresponding to the position of the extended portion. The extended portion of the first weight 21 is placed on this protruding portion 61b, and a wiring pattern 2a of the first weight 21 and a wiring pattern 61a formed on the protruding portion 61b are connected. In this case, the wiring pattern 61a of the protruding portion 61b just needs to be electrically connected, it is possible to use, for example, a silver paste.

Figure 56:
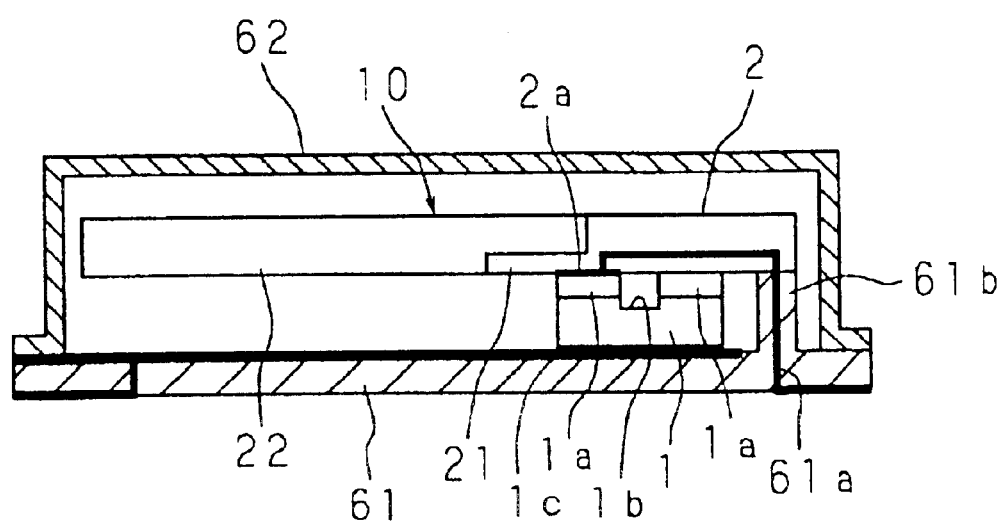
FIG. 56 is a cross sectional view showing the structure of an acceleration sensor device according to the second example of the twenty sixth embodiment.

FIG. 56 is a cross sectional view showing the structure of an acceleration sensor device according to the second example of the twenty sixth embodiment of the present invention. In the second example, a metal is used as the material of the cap section 62. Other configurations are the same as those of the first example shown in FIG. 55. In comparison with the first example using the ceramic cap section 62, the second example can make the cap section 62 thinner, thereby enabling a reduction in the height of the device. Alternatively, if a resin cap section 62 is used, it is possible to reduce the cost.

According to the structure of the twenty sixth embodiment, for example, if the height of the protruding portion 61b is formed to a negative tolerance with respect to the thickness of the vibrator 1, it is not necessary to particularly specify the thickness of the vibrator 1 and weight section 2. Besides, it is necessary to simply place the vibrator 1 and weight section 2 sequentially on the base section 61 in the shape of a flat plate and to finally put the cap section 62 thereon, and thus handling of the vibrator 1 and weight section 2 is easier and the fabrication process is simplified.

Incidentally, while the above description explains a structure in which the base section 61 in the shape of a flat plate is provided with the protruding portion 61b, needless to say, the same effect is also obtained by a structure including a protruding portion or a structure equivalent to the protruding portion in the weight section 2.

(Twenty Seventh Embodiment)

Figure 57A:
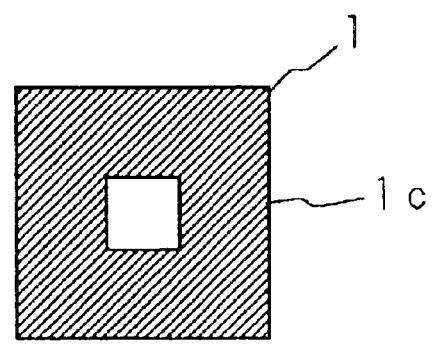
FIG. 57A is a plan view of the package side of a vibrator of an acceleration sensor device according to the twenty seventh embodiment.
Figure 57B:
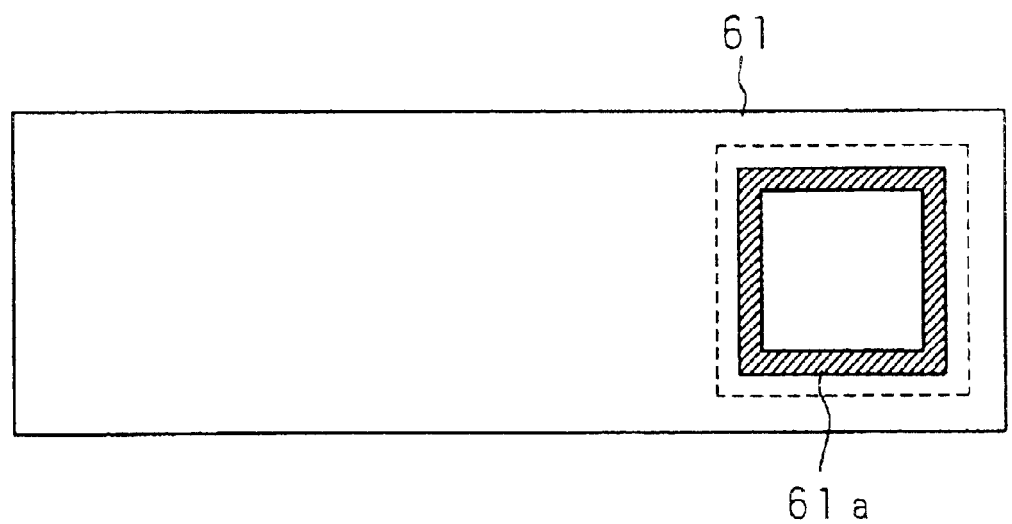
FIG. 57B is a plan view of the vibrator side of a base section of the package of the acceleration sensor device according to the twenty seventh embodiment.

FIGS. 57A and 57B are plan views of the package 60 side of the vibrator 1 and the vibrator 1 side of the base section 61 of the package 60 of an acceleration sensor device according to the twenty seventh embodiment. The twenty seventh embodiment is configured by applying the bonding relationship between the vibrator 1 and the weight section 2 of the above-mentioned nineteenth embodiment to the bonding relationship between the vibrator 1 and the package 60 (the base section 61). An area enclosed by the broken line in FIG. 57B is a region where the vibrator 1 is to be bonded. The area of the electrode 1c of the vibrator 1 and the wiring pattern 61a of the base section 61 is smaller than the bonded area between the vibrator 1 and the package 60 (the base section 61).

When gold is used for the electrode 1c and wiring pattern 61a, there is a possibility that the detection performance deteriorates for the same reasons as in the nineteenth embodiment. Therefore, in the twenty seventh embodiment, the area of the electrode 1c and wiring pattern 61a is made smaller than the bonded area so as to obtain a sufficient bonding strength in other region. Accordingly, even when the electrode 1c and wiring pattern 61a do not easily stick to the adhesive, it is possible to increase the bonding strength between the vibrator 1 and the package 60 (the base section 61).

Figure 58A:
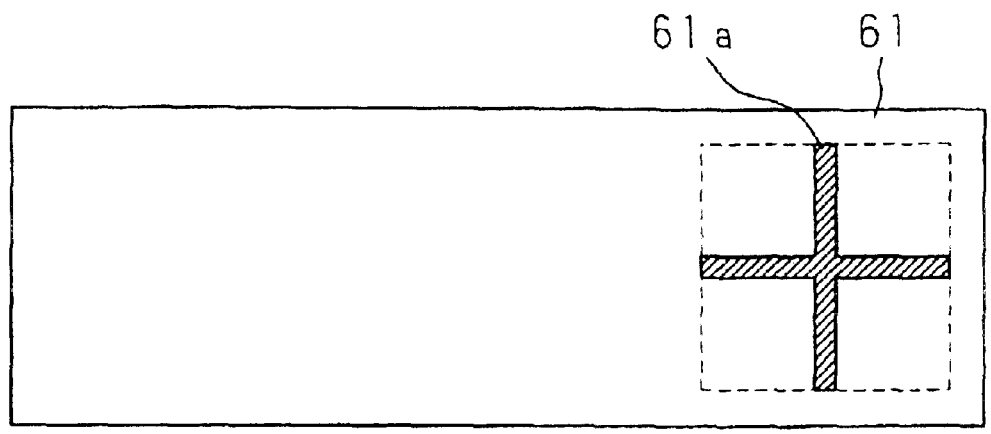
FIGS. 58A and 58B are plan views of the vibrator side of the base section of the package of the acceleration sensor device according to the twenty seventh embodiment.
Figure 58B:
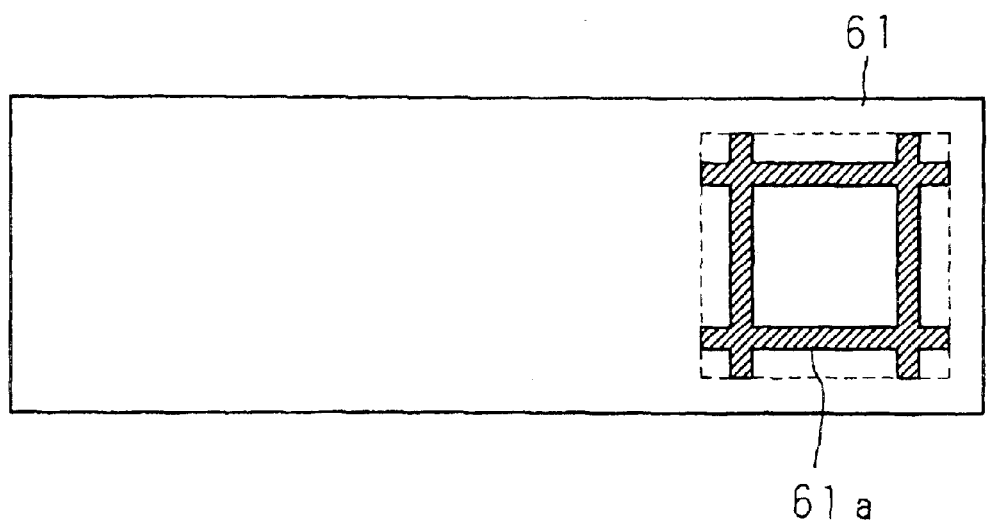

Further, in the case where the area of the electrode 1c and wiring pattern 61a is smaller than the bonded area, the electrode 1c and wiring pattern 61a may have an arbitrary shape. FIGS. 58A and 58B are plan views of the vibrator 1 side of the base section 61 of the acceleration sensor device according to the twenty seventh embodiment. Besides, in order to increase the degree of adhesion between the vibrator 1 and the package 60 (the base section 61), it is preferable to arrange the electrode 1c and wiring pattern 61a so that they are symmetrical about a line, symmetrical about a point and supported at three points.

(Twenty Eighth Embodiment)

Figure 59:
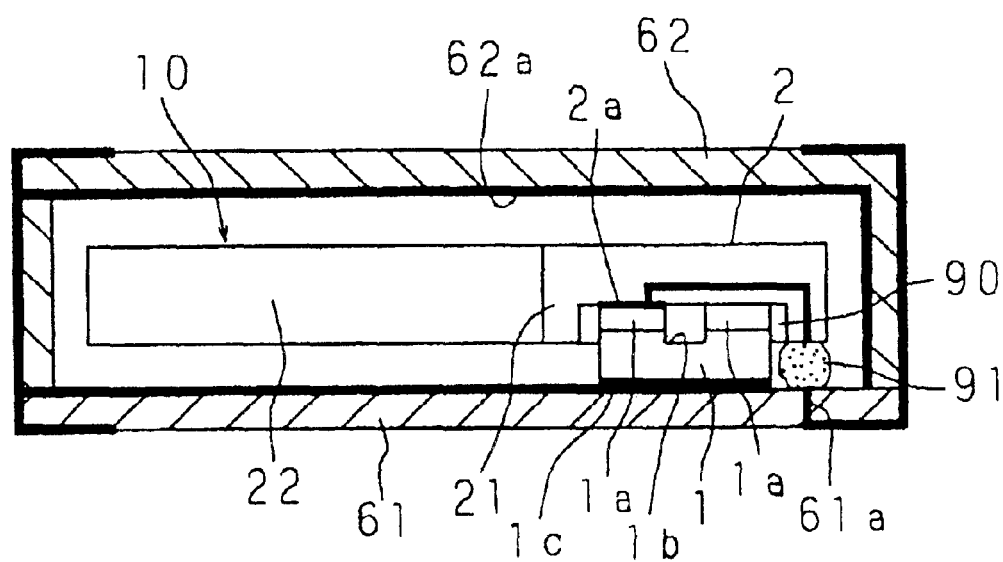
FIG. 59 is a cross sectional view showing the structure of an acceleration sensor device according to the twenty eighth embodiment.

FIG. 59 is a cross sectional view showing the structure of an acceleration sensor device according to the twenty eighth embodiment of the present invention. Stored in a package 60 having substantially the same structure as that of the above-described twenty sixth embodiment is an acceleration sensor 10 having the characteristic of the above-described twentieth embodiment, i.e., an acceleration sensor 10 in which the supported-end side of the weight section 2 has a cavity structure.

The wiring pattern 2a of the first weight 21 and the wiring pattern 61a of the base section 61 are connected with a conductive paste 91 made of, for example, a silver paste. Thus, even though the acceleration sensor 10 has the cavity 90, the readiness of drawing a detection signal to an external device is not impaired.

Incidentally, while this example is constructed such that the detection signal is drawn to an external device through the conductive paste 91, the wiring patterns 2a and 61a may be connected by wire bonding as another method satisfying the conditions for not limiting sliding vibration during the application of an acceleration and the detection signal may be drawn to an external device through the wire bonding.

Further, in each of the acceleration sensor devices explained above, the structure of the acceleration sensor stored in the package 60 is only an example and, needless to say, an acceleration sensor having other structure explained by the present invention can be stored in the same manner.

By the way, if a positioning structure for mounting the vibrator 1 on the weight section 2, package 60 or specimen 4 is provided, the positioning of the mutual members can be easily and accurately performed, thereby facilitating the fabrication process and reducing variations in the detection characteristics.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An acceleration sensor device comprising:

an acceleration sensor including a piezoelectric element provided with a respective electrode and subject to a shearing strains, and a weight section connected to said piezoelectric element and supported at a support point different from a position of a center of gravity of an assembly of said piezoelectric element and weight section, wherein said weight section is provided with a wiring pattern connected to each said electrode, wherein said piezoelectric element detects an angular moment about the support point as shearing strains, the angular moment being exerted in said weight section when an acceleration is applied, and electrical signals corresponding to said acceleration are output from each said electrode through said wiring pattern; and a package including a base provided with said wiring pattern and a cap covering said base, for storing said acceleration sensor therein.

2. The acceleration sensor device as set forth in claim 1, wherein said package has a detection circuit for detecting an acceleration based on said electrical signal.

3. The acceleration sensor device as set forth in claim 1, wherein a part of said weight section is sandwiched by said package.

4. The acceleration sensor device as set forth in claim 1, wherein a part of said weight section and a part of said piezoelectric element are sandwiched by said package.

5. The acceleration sensor device as set forth in claim 3, wherein the part of said weight section sandwiched by said package is a portion located on one side of the position of said piezoelectric element opposite to the other side including the position of said center of gravity.

6. The acceleration sensor device as set forth in claim 3, wherein a length of the part of said weight section sandwiched by said package is not more than a length of said piezoelectric element.

7. The acceleration sensor device as set forth in claim 1, wherein said piezoelectric element has a package-side electrode, said package is provided with a wiring pattern connected to said package-side electrode, said piezoelectric element and package are bonded together with an adhesive, and an area of their bonded face is larger than an area of said package-side electrode and/or said wiring pattern.

* * * * *